(12) United States Patent
Robb et al.

(10) Patent No.: US 11,749,825 B2
(45) Date of Patent: Sep. 5, 2023

(54) SOLID STATE ION CONDUCTION IN ZNPS3

(71) Applicant: California Institute of Technology, Pasadena, CA (US)

(72) Inventors: Kimberly A. Robb, Pasadena, CA (US); Andrew J. Martinolich, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 515 days.

(21) Appl. No.: 16/740,035

(22) Filed: Jan. 10, 2020

(65) Prior Publication Data
US 2020/0227765 A1      Jul. 16, 2020

Related U.S. Application Data

(60) Provisional application No. 62/791,197, filed on Jan. 11, 2019.

(51) Int. Cl.
*H01M 8/124* (2016.01)
*H01M 12/02* (2006.01)
(Continued)

(52) U.S. Cl.
CPC ........... *H01M 8/124* (2013.01); *H01M 12/02* (2013.01); *H01M 4/86* (2013.01); *H01M 2004/027* (2013.01); *H01M 2004/028* (2013.01)

(58) Field of Classification Search
CPC ............... H01M 10/26; H01M 10/056; H01M 10/0562; H01M 10/054
See application file for complete search history.

(56) References Cited

U.S. PATENT DOCUMENTS

| | | | |
|---|---|---|---|
| 4,267,157 A | 5/1981 | Maas et al. | |
| 4,579,724 A | 4/1986 | Foot et al. | |
| 2013/0260258 A1* | 10/2013 | Tsuchida | H01M 10/0562 429/304 |

FOREIGN PATENT DOCUMENTS

WO      2018/111191 A1      6/2018

OTHER PUBLICATIONS

Fengmei Wang et al., New Frontiers on van der Waals Layered Metal Phosphorous Trichalcogenidea, 2018, Adv. Funct. Mater., 28, 1-24 (Year: 2018).*

(Continued)

*Primary Examiner* — Ula C Ruddock
*Assistant Examiner* — Armindo Carvalho, Jr.
(74) *Attorney, Agent, or Firm* — Leydig, Voit & Mayer, Ltd.

(57) ABSTRACT

In an aspect, an electrochemical cell comprises: a positive electrode; a negative electrode; and a solid state electrolyte in ionic communication with the positive electrode and the negative electrode; wherein: the electrolyte is characterized by formula (FX1): $MPS_3$ (FX1); wherein M is one or more metal cations and optionally metal cation vacancies; and wherein at least one of said one or more metal cations is a divalent cation; the electrolyte is characterized by a divalent ion conductivity; and the electrolyte is electrically insulating. The solid state electrolyte is optionally not an electrocatalyst material or does not function as an electrocatalyst in the electrochemical cell during operation (e.g., charging and/or discharging) of the electrochemical cell. The solid state electrolyte is optionally not an electrode or does not function as an electrode in the electrochemical cell during operation (e.g., charging and/or discharging) of the electrochemical cell.

21 Claims, 23 Drawing Sheets

(51) Int. Cl.
H01M 4/86 (2006.01)
H01M 4/02 (2006.01)

(56) References Cited

OTHER PUBLICATIONS

D. Ruiz-Leon, Insertion of trivalent cation in the layered MPS3 (Mn, Cd) materials, 2002, Materials Research Bulletin, 37, 981-989 (Year: 2002).*
R Brec, Intercalation in Layered Materials, 1986, 93-124 (Year: 1986).*
Adolphi et al. (1992) "The 31P NMR spectra of Cd3P2 and Zn3P2" J. Phys. Chem. Solids, 53: pp. 1275-1278.
Aubrey et al. (2013) "Metal-organic framewworks as solid magnesium electrolytes" Energy & Environmental Science, 7: pp. 667-671.
Aurbach et al. (2000) "Prototype systems for rechargeable magnesium batteries." Nature, 407: pp. 724-727.
Bonnick et al. (2018) "Insights into Mg2+ Intercalation in a Zero-Strain Material: Thiospinel MgxZr2S4." Chem. Mater., 30: pp. 4683-4693.
Bonnick et al. (2017) "Monovalent versus Divalent Cation Diffusion in Thiospinel Ti$_2$S$_4$." J. Phys. Chem. Lett., 8: pp. 2253-2257.
Boucher et al. (1994) "Second-order Jahn-Teller effect in CdPS3 and ZnPS3 demonstrated by a non-harmonic behaviour of Cd2+ and Zn2+ d10 ions." J. Alloy Compd., 215: pp. 63-70.
Bourdon et al. (1999) "31P MAS NMR Study of the Ferrielectric-Paraelectric Transition in Layered CuInP2S6." Chem. Mater., 11: pp. 2680-2686.
Brec, R. (1986) "Review on Structural and Chemical Properties of Transition Metal Phosphorous Trisulfides MPS3." Solid State Ionics, 22: pp. 3-30.
Brodd, R. J. (1999) "Recent developments in batteries for portable consumer electronics applications." Interface, 8: pp. 20-23.
Canepa et al. (2017) "Odyssey of Multivalent Cathode Materials: Open Questions and Future Challenges." Chem. Rev., 117: pp. 4287-4341.
Canepa et al. (2017) "High magnesium mobility in ternary spinel chalcogenides." Nat. Commun., 8: pp. 1759.
Culver et al. (2018) "Designing ionic conductors: the interplay between structural phenomena and interfaces in thiophosphate-based solid-state batteries." Chem. Mater., 30: pp. 4179-4192.
Dietrich et al. (2016) "Local Structural Investigations, Defect Formation, and Ionic Conductivity of the Lithium Ionic Conductor Li4P2S6." Chem. Mater. 28: pp. 8764-8773.
Eckert et al. (1989) "Phosphorus-31 magic angle spinning NMR of crystalline phosphorus sulfides: correlation of phosphorus-31 chemical shielding tensors with local environments." J. Phys. Chem. 93, pp. 452-457.
Farrington et al. (1982) "Divalent Beta-Aluminas: High Conductivity Solid Electrolytes for Divalent Cations." Solid State Ionics, 7, pp. 267-281.
Foot et al. (1987) "Properties of NiPS3 and ZnPS3 prepared at ambient temperature" J. Chem. Soc., Chem. Commun., pp. 380-381.
Gautam et al. (2016) "Impacts of intermediate sites on bulk diffusion barriers: Mg intercalation in Mg2Mo3O8." J. Mater. Chem. A., 4, pp. 17643-17648.
Haines et al. (2018) "Pressure-Induced Electronic and Structural Phase Evolution in the van der Waals Compound FePS3." Phys. Rev. Lett. 121, No. 266801.
Han et al. (2017) "Mechanism of Zn insertion into nano-structured δ-MnO2: a nonaqueous rechargeable Zn metal battery." Chem. Mater., 29: pp. 4874-4884.
Han et al. (2016) "Origin of Electrochemical, Structural, and Transport Properties in Nonaqueous Zinc Electrolytes." ACS Appl. Mater. Interfaces, 8, pp. 3021-3031.
Higashi et al. (2013) "A novel inorganic solid state ion conductor for rechargeable Mg batteries" Chem. Commun., 2014,50, pp. 1320-1322.
Ichimura et al. (1991) Electrical conductivity of layered transition-metal phosphorus trisulfide crystals. Synth. Met. 45, pp. 203-211.
Ikeda et al. (1987) "Solid electrolytes with multivalent cation conduction. 1. Conducting species in Mg-Zr-PO4 system." Solid State Ionics 23, pp. 125-129.
Ikeda et al. (1990) "Solid electrolytes with multivalent cation conduction (2) zinc ion conduction in Zn-Zr-PO4 system." Solid State Ionics 40, pp. 79-82.
Inaguma et al. (2006) "M/Li+ (M= Mg2+, Zn2+, and Mn2+) ion-exchange on lithium ion-conducting perovskite-type oxides and their properties." Solid State Ionics, 177, pp. 2705-2709.
Kawamura et al. (2001) "High temperature 31P NMR study on Mg2+ ion conductors." Solid State Commun. 2001, 120, pp. 295-298.
Klingen et al. (1970) "Über Hexachalkogeno-hypodiphosphate vom Typ M2P2X6." Naturwissenschaften 57, 88.
Krauskopf et al. (2018) "Bottleneck of Diffusion and Inductive Effects in Li10Ge1-xSnxP2S12."Chem. Mater. 30, pp. 1791-1798.
Lee et al. (2019) Synthesis and characterization of divalent ion conductors with NASICON-type structures, Journal of Asian Ceramic Societies, 7(2): pp. 221-227.
Lee et al. (2011) "Metal-air batteries with high energy density: Li-air versus Zn-air." Adv. Energy Mater. 1, pp. 34-50.
Li et al. (2014) "Recent advances in zinc-air batteries." Chem. Soc. Rev. 43, pp. 5257-5275.
Lim et al. (1977) "Zinc-bromine secondary battery." J. Electrochem. Soc. 124, pp. 1154-1157.
Liu et al. (2016) "Evaluation of sulfur spinel compounds for multivalent battery cathode applications." Energy Environ. Sci. 9,pp. 3201-3209.
Manjuladevi et al. (2017) "Mg-ion conducting blend polymer electrolyte based on poly(vinyl alcohol)-poly (acrylonitrile) with magnesium perchlorate" Solid State Ionics, 308(1), pp. 90-100.
Martinolich et al. (2019) "Solid-State Divalent Ion Conduction in ZnPS3" Chemistry of Materials, 31, pp. 3652-3661.
Mathey et al. (1980) "Vibrational study of layered MPX3 compounds and of some intercalates with Co(η5-C5H5)2+ or Cr(η6-C6H6)2+." Inorg. Chem. 19, pp. 2773-2779.
Muldoon et al. (2014) "Quest for Nonaqueous Multivalent Secondary Batteries: Magnesium and Beyond." Chem. Rev. 114, pp. 11683-11720.
Muy et al. (2018) "Tuning mobility and stability of lithium ion conductors based on lattice dynamics." Energy Environ. Sci. 11, pp. 850-859.
Pan et al. (2017) "ZnAlxCo2-xO4 Spinels as Cathode Materials for Non-Aqueous Zn Batteries with an Open Circuit Voltage of ≤2 V." Chem. Mater. 29, pp. 9351-9359.
Pan et al. (2018) "ZnNixMnxCo2-2xO4 Spinel as a High-Voltage and High-Capacity Cathode Material for Nonaqueous Zn-Ion Batteries." Adv. Energy Mater. 8, No. 1800589.
Park et al. (2017) "Single-Ion Li+, Na+, and Mg2+ Solid Electrolytes Supported by a Mesoporous Anionic Cu-Azolate Metal-Organic Framework" J. Am. Chem. Soc. 139(38): pp. 13260-13263.
Patrick et al. (1986), "Novel solid state polymeric batteries" Solid State Ionics 18-19(2): pp. 1063-1067.
Prouzet et al. (1986) "Structure determination of ZnPS3." Mater. Res. Bull. 21, pp. 195-200.
Rakov et al. (2018) "Insight into Mn and Ni doping of Ni 1-x Mn x PS 3 and Mn 1-x Ni x PS 3 nanosheets on electrocatalytic hydrogen and oxygen evolution activity" J. Alloys and Compounds, 769: pp. 532-538.
Ren et al. (2015) "Direct observation of lithium dendrites inside garnet-type lithium-ion solid electrolyte. Electrochem." Commun. 57, pp. 27-30.
Roedern et al. (2017) "Magnesium Ethylenediamine Borohydride as Solid-State Electrolyte for Magnesium Batteries." Sci. Rep. 7, No. 46189.
Rohrer et al. (1990) "Electrical conductivity in Pb (II)-and Na (I)-Pb (II)-β-alumina." J. Solid State Chem. 85, pp. 299-314.

(56) References Cited

OTHER PUBLICATIONS

Rong et al. (2015). "Materials design rules for multivalent ion mobility in intercalation structures." Chem. Mater. 27, pp. 6016-6021.

Sourisseau et al. (1983) "Vibrational study of layered ZnPS3 compounds intercalated with [Co (η5-(C5H5)2)+] and [Cr (η6-(C6H6)2)+] Cations." J. Phys. Chem. Solids 44, pp. 119-124.

Sun et al. (2016) "A high capacity thiospinel cathode for Mg batteries." Energy Environ. Sci. 9, pp. 2273-2277.

Vinckevičiūtė; et al. (2016) "Stacking Sequence Changes and Na Ordering in Layered Intercalation Materials." Chem. Mater. 28, pp. 8640-8650.

Wang et al. (2018) "Plating and stripping calcium in an organic electrolyte." Nat. Mater. 2018, 17, 16.

Wang et al. (2019) "MgSc2Se4—a magnesium solid ionic conductor for all-solid-state Mg batteries?", ChemSusChem 10.1002/cssc.201900225.

Wu et al. (2017) "Gallium-Doped $Li_7La_3Zr_2O_{12}$ Garnet-Type Electrolytes with High Lithium-Ion Conductivity." ACS Appl. Mater. Interfaces, 9: pp. 1542-1552.

Xu et al. (2012). "Energetic Zinc Ion Chemistry: the Rechargeable Zinc Ion Battery." Angew. Chem. 124: pp. 957-959.

Yelon et al. (1990) "Microscopic explanation of the compensation (Meyer-Neldel) rule." Phys. Rev. Lett. 65, pp. 618.

Zhang et al. (1992) "Glass formation and structure in non-oxide chalcogenide systems. The short range order of silver sulfide (Ag2S)-phosphorus sulfide (P2S5) glasses studied by phosphorus-31 MAS-NMR and dipolar NMR techniques." J. Am. Chem. Soc. 114: pp. 5775-5784.

Baroni et al. (2001) "Phonons and related crystal properties from density-functional perturbation theory." Rev. Mod. Phys., 73: pp. 515-562.

Blöchl, P. E. (1994) "Projector augmented-wave method." Phys. Rev. B, 50, 17953.

Brec, et al. (1979) "Physical properties of lithium intercalation compounds of the layered transition-metal chalcogenophosphites," Inorg. Chem. 18(7): pp. 1814-1818.

Buannic, et al. (2017) "Dual substitution strategy to enhance Li+ ionic conductivity in $Li_7La_3Zr_2O_{12}$ solid electrolyte." Chem. Mater. 29: pp. 1769-1778.

Cussen, E. J. (2006) "The structure of lithium garnets: cation disorder and clustering in a new family of fast Li+ conductors." Chem. Commun. pp. 412-413.

Donne, et al. (1997) "Redox Processes at the Manganese Dioxide Electrode II. Slow-Scan Cyclic Voltammetry." J. Electrochem. Soc. 144: pp. 2954-2961.

El Shinawi, et al. (2013) "Stabilization of cubic lithium-stuffed garnets of the type "$Li_7La_3Zr_2O_{12}$" by addition of gallium." J. Power Sources 225, pp. 13-19.

Foot et al. (1983) "Amine Intercalates of Lamellar Compounds $NiPS_3$ and $CdPS_3$," Mat. Res. Bull., vol. 18, pp. 173-180.

Giannozzi, et al. (2009) "Quantum Espresso: a modular and open-source software project for quantum simulations of materials." J. Phys.: Condens. Matter 21, No. 395502.

Grimme, S. (2006) "Semiempirical GGA-type density functional constructed with a long-range dispersion correction." J. Comput. Chem. 27, pp. 1787-1799.

Hamann, et al. (2013) "Optimized norm-conserving Vanderbilt pseudopotentials." Phys. Rev. B, 88, 085117.

Henkelman, et al. (2000) "Climbing image nudged elastic band method for finding saddle points and minimum energy paths." J. Chem. Phys. 113, 9901-9904.

Henkelman, et al. (2000) "Improved tangent estimate in the nudged elastic band method for finding minimum energy paths and saddle points." J. Chem. Phys., 113, 9978-9985.

Hodge, et al. (1976) "Impedance and modulus spectroscopy of polycrystalline solid electrolytes" J. Electroanal. Chem. Interfacial Electrochem. 74, 125-143.

Irvine, et al. (1990) "Electroceramics: characterization by impedance spectroscopy." Adv. Mater. 2, 132-138.

Kresse, et al. (1996) "Efficient iterative schemes for ab initio total-energy calculations using a plane-wave basis set." Phys. Rev. B, 54, No. 11169.

Kresse, et al. (1999) "From ultrasoft pseudopotentials to the projector augmented-wave method." Phys. Rev. B, 59, 1758.

Larson, et al. (2004) "General Structure Analysis System (GSAS)" Report LAUR 86-748; Los Alamos National Laboratory.

Lazzeri, et al. (2003) "First-Principles Calculation of Vibrational Raman Spectra in Large Systems: Signature of Small Rings in Crystalline $SiO_2$." Phys. Rev. Lett. 90, No. 036401.

Lock, et al. (2001) "Solid-state $^{29}Si$, $^{113}Cd$, $^{119}Sn$, and $^{31}P$ NMR Studies of II-IV-$P_2$ Semiconductors." Solid State Nucl. Magn. Reson. 20, pp. 118-129.

Martinolich, et al. (Mar. 2019) "Supplemental Materials for Solid-State Divalent Ion Conduction in $ZnPS_3$" Chemistry of Materials, 31, pp. 3652-3661.

Matsui (2011) "Study on electrochemically deposited Mg metal," Jounal of Power Sources 196, 7048-7055.

Momma, et al. (2011) "VESTA 3 for three-dimensional visualization of crystal, volumetric and morphology data." J. Appl. Crystallogr. 44, pp. 1272-1276.

Perdew, et al. (1981) "Self-interaction correction to density-functional approximations for many-electron systems." Phys. Rev. B 23, pp. 5048-5079.

Perdew, et al. (1996) "Generalized Gradient Approximation Made Simple." Phys. Rev. Lett. 77, pp. 3865-3868.

Sai Gautam, et al. (2017) "Influence of inversion on Mg mobility and electrochemistry in spinels." Chem. Mater. 29, pp. 7918-7930.

Shannon, et al. (1969) "Effective ionic radii in oxides and fluorides." Acta Crystallogr., Sect. B: Struct. Crystallogr. Cryst. Chem. 25, pp. 925-946.

Shannon, R. D. (1976) "Revised effective ionic radii and systematic studies of interatomic distances in halides and chalcogenides." Acta Cryst. A, 32, 751-767.

Toby, B. H. (2001) "EXPGUI, a graphical user interface for GSAS." J. Appl. Crystallogr. 34, 210-213.

Wahl, et al. (2008) "$SrTiO_3$ and $BaTiO_3$ revisited using the projector augmented wave method: Performance of hybrid and semilocal functionals." Phys. Rev. B 78, 104116.

Wang, et al. (2008) "A dedicated powder diffraction beamline at the Advanced Photon Source: Commissioning and early operational results." Rev. Sci. Instrum. 79, 085105.

Zhang et al. (2018) "New horizons for inorganic solid state ion conductors" Energy & Environmental Science, 11: pp. 1945-1976.

\* cited by examiner initial

● path a

● path b

◆ path c

FIG. 10A
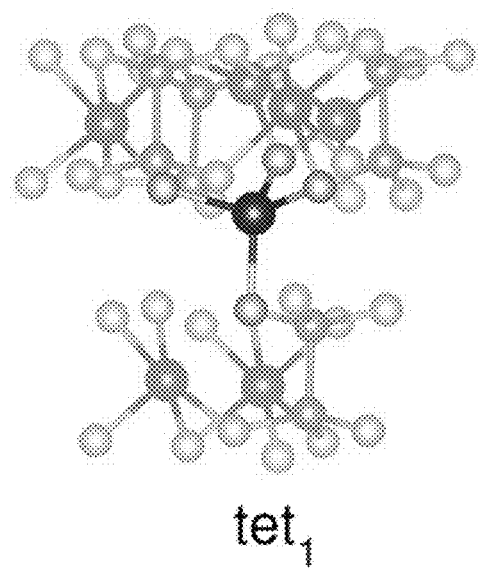
tet₁
FIG. 10B
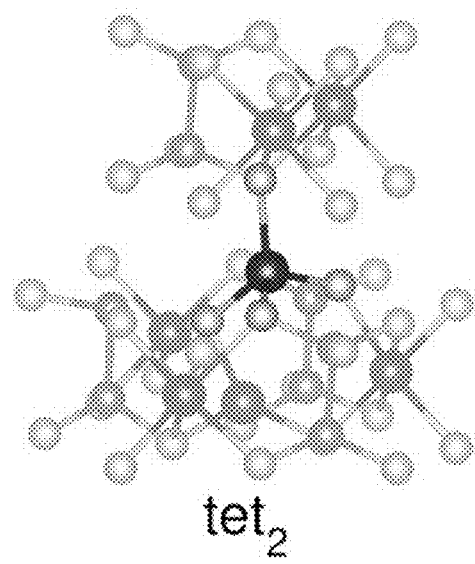
tet₂
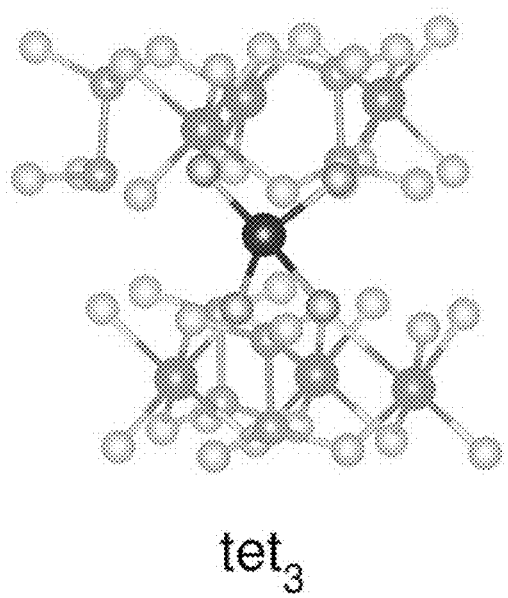
tet₃
FIG. 10C
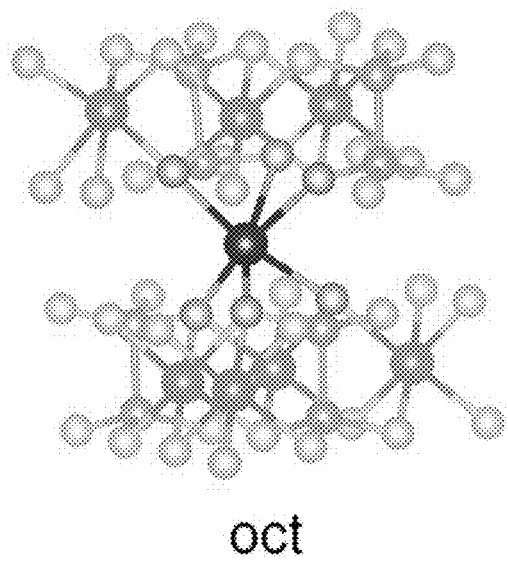
oct
FIG. 10D

SOLID STATE ION CONDUCTION IN ZNPS3

CROSS-REFERENCE TO RELATED APPLICATIONS

This application claims the benefit of priority to U.S. Provisional Patent Application No. 62/791,197, filed Jan. 11, 2019, which is hereby incorporated by reference in its entirety.

STATEMENT REGARDING FEDERALLY SPONSORED RESEARCH OR DEVELOPMENT

None.

BACKGROUND OF INVENTION

Divalent cation-based batteries are possible alternatives to the ubiquitous Li-based batteries. The divalent nature of the cations, such as $Mg^{2+}$ and $Zn^{2+}$, enables two-electron redox processes for energy storage that help offset the gravimetric capacity loss incurred by the heavier atom. Additionally, reversible metal plating and stripping have been demonstrated with $Mg^{2+}$, $Ca^{2+}$, and $Zn^{2+}$, thereby significantly enhancing the volumetric and gravimetric capacities afforded by the anode compared to conventional Li-intercalated graphite anodes. Reversible Li metal plating and stripping are yet to be realized with Li-based electrodes due to the safety risks imposed by Li dendrites formed during repeated electrodeposition.

Replacing monovalent $Li^+$ with $M^{2+}$ affects the redox and mass transfer processes during discharge and charge. Reversible redox and efficient charge transfer require an understanding of how these fundamental processes are affected by the high charge density of the divalent cation. For example, solid-state ionic conductivity of $M^{2+}$ is expected to be more difficult compared to that of $M^+$ due to the increase in both mass and charge density. Solid-state ion conduction is an important process in rechargeable batteries as it occurs in both the active material when intercalation mechanisms are at play and, in some cases, the electrolyte in all-solid-state batteries. Furthermore, ion conduction is also required through solid-state layers formed at the interface of the active material and liquid electrolytes, the canonical example being $Li^+$ diffusion through the solid electrolyte interphase on graphite. Monovalent $Li^+$ conduction in the solid state is relatively facile due to its small size and low formal charge. Various strategies have been implemented to maximize the conductivity of $Li^+$ in the solid state, such as metal substitution and lattice softening. However, although certain divalent ions exhibit a similar ionic radius to $Li^+$ (r=0.76 Å in octahedral environments), similar approaches may not be successful due to the difference in charge density between $Li^+$ and $M^{2+}$, suggesting that new structure-property relationships need to be developed for $M^{2+}$.

Understanding the design principles that influence $M^{2+}$ conductivity is therefore a key cornerstone to developing batteries based on multivalent working ions. To that end, $Mg^{2+}$-based systems have been the most studied divalent so far with a focus on intercalation materials as active cathodes. Notable intercalation cathodes include the Chevrel phase reported by Aurbach, et al. (Aurbach, et al., "Prototype systems for rechargeable magnesium batteries", Nature 2000, 407, 724-727) and the $TiS_2$ thiospinel reported by Nazar, et al. (Sun, et al. "A high capacity thiospinel cathode for Mg batteries," Energy Environ. Sci. 2016, 9, 2273-2277). Nazar hypothesizes that electronic conductivity facilitates $Mg^{2+}$ ion conduction in these systems, which could hinder the realization of an insulating solid electrolyte for divalent working ions. $Mg^{2+}$ conductivity with an activation energy of 370 meV was reported in the selenospinel $MgSc_2Se_4$; however, the material was also electronically conductive. $Mg^{2+}$ conductivity has also been reported in the molecular solids $Mg(BH_4)(NH_2)$, $Mg(en)_3(BH_4)_2$, and $Mg(en)(BH_4)_2$ (en=ethylenediamine) but with significantly higher activation energies ranging from 900 to 1300 meV.

Regarding $M^{2+}$ conduction in solid electrical insulator materials, there do not appear to be known reports of solid-state divalent ion conduction, free of a liquid electrolyte/solvent to facilitate or enhance said ion conduction, at temperatures below 500° C. Conduction of $Pb^{2+}$ in the canonical $\beta''$-$Al_2O_3$ was reported at 40° C.; however, the conduction was later ascribed to mixed ionic and electronic contributions due to hydration. Ion exchange from $ZnCl_2$ in the canonical $\beta''$-$Al_2O_3$ was demonstrated at 500° C., suggesting $Zn^{2+}$ mobility within the lattice. $Zn^{2+}$ has been shown to conduct in $ZnZr_4(PO_4)_6$ at 900° C. with a conductivity of up to $1.20 \times 10^{-2}$ S cm$^{-1}$ and an activation energy between 500 and 750° C. as low as 930 meV.

There is thus a clear need in the art for solid-state electrolyte materials that are characterized by significant divalent ionic conductivity at room temperature and with a low activation energy, while also being electrically insulating, inexpensive, nontoxic, and electrochemically active.

SUMMARY OF THE INVENTION

Provided herein are electrochemical cells including solid-state electrolytes that address the above noted and other challenges in the art. For example, the solid-state electrolytes disclosed herein have divalent ion conductivity at or near room temperature while being electrically insulating. The solid-state electrolyte materials are a versatile class of materials—characterized by the formula $MPS_3$, where M is one or more metal cations, at least one of which is a divalent cation. The electrolyte composition can be tuned, for example by controlling the vacancy and divalent ion concentration to tune the divalent ion conductivity. This control over vacancy concentration and conductivity can be done via introducing trivalent ions, for example, into the electrolyte's composition. Tuning the metal cation concentration in the electrolyte material provides for tuning the divalent metal cation conductivity therein.

In an aspect, an electrochemical cell comprises: a positive electrode; a negative electrode; and a solid state electrolyte in ionic communication with the positive electrode and the negative electrode; wherein: the electrolyte is characterized by formula (FX1): $MPS_3$ (FX1); wherein M is one or more metal cations and optionally metal cation vacancies; and wherein at least one of said one or more metal cations is a divalent cation; the electrolyte is characterized by a divalent ion conductivity; and the electrolyte is electrically insulating. Preferably in some embodiments, the metal cation vacancies are vacancies of divalent metal cations. One of ordinary skill in the art should understand that, to account for the presence of optional vacancies of divalent metal cations in the electrolyte/material, an alternative representation of the formula $MPS_3$ is, for example, $M_{1-\delta}PS_3$, where $\delta$ corresponds to vacancies of metal cations in the electrolyte/material, such as, but not limited to, vacancies (or, absence of metal cations) at metal cation site(s) in the material's structure, such as, but not limited to, $Zn^{2+}$ vacancies. For example, in some embodiments, such as where M in FX1 includes at least one divalent metal cation and none of aliovalent metal cations, δ is optionally selected from the range of 0.00001 to 0.01, optionally selected from the range of 0.0001 to 0.01, optionally selected from the range of 0.001 to 0.01, optionally selected from the range of 0.00001 to 0.001, optionally selected from the range of 0.0001 to 0.001, optionally less than 0.01, and optionally less than 0.001. For example, in some embodiments, such as where M in FX1 includes at least one divalent metal cation as well as at least one aliovalent metal cation, such as at least one trivalent metal cation and/or at least one tetravalent cation, δ is optionally selected from the range of 0.01 to 0.4, optionally selected from the range of 0.01 to 0.3, optionally selected from the range of 0.02 to 0.3, optionally selected from the range of 0.03 to 0.3, optionally selected from the range of 0.05 to 0.3, preferably for some applications selected from the range of 0.07 to 0.3, and more preferably for some applications selected from the range of 0.075 to 0.3. The solid state electrolyte is optionally not an electrocatalyst material or does not function as an electrocatalyst in the electrochemical cell during operation (e.g., charging and/or discharging) of the electrochemical cell. The solid state electrolyte is optionally not an electrode or does not function as an electrode in the electrochemical cell during operation (e.g., charging and/or discharging) of the electrochemical cell.

Optionally, the at least one divalent cation is $Zn^{2+}$, $Mg^{2+}$, or a combination thereof. Optionally, the at least one divalent cation is $Zn^{2+}$, $Mg^{2+}$, $Ca^{2+}$, or a combination thereof. Optionally, the electrolyte is characterized by the formula $ZnPS_3$. Optionally, the electrolyte is characterized by the formula $MgPS_3$.

Also provided herein are electrolytes and materials where M in FX1 is more than one cation. Such electrolytes and materials are optionally characterized as solid solution materials, or the cation sites of said materials are characterized as solid solutions. Optionally, M (in FX1) comprises $Zn^{2+}$ and at least one of divalent ion vacancies, a divalent metal ion, and an aliovalent cation. Optionally, M (in FX1) comprises $Zn^{2+}$, divalent ion vacancies, and at least one of a divalent metal ion and an aliovalent cation. Optionally, M (in FX1) comprises $Zn^{2+}$, divalent ion vacancies, and at least one aliovalent cation. Optionally, the at least one aliovalent metal cation is selected from the group consisting of $Al^{3+}$, $Ga^{3+}$, $Ge^{4+}$, $In^{3+}$, $V^{3+}$, and any combination thereof. Optionally, the at least one divalent cation is selected from the group $Mg^{2+}$, $Ni^{2+}$, $Co^{2+}$, $Ca^{2+}$, $Fe^{2+}$, $Mn^{2+}$, and any combination thereof. Optionally, the electrolyte is characterized by formula (FX2), (FX3), (FX10), or (FX11):

$$Zn_{1-x}A^{2+}_xPS_3 \quad (FX2)$$

$$Zn_{1-1.5y}A^{3+}_yPS_3 \quad (FX3)$$

$$Zn_{1-n}A^{1+}_{2n}PS_3 \quad (FX10); \text{ or}$$

$$Zn_{1-2z}A^{4+}_zPS_3 \quad (FX11)$$

wherein: $A^{1+}$ is at least one monovalent metal cation; $A^{2+}$ is at least one divalent metal cation other than Zn; $A^{3+}$ is at least one trivalent metal cation; $A^{4+}$ is at least one tetravalent metal cation; x is greater than 0 and less than 1; y is greater than 0 and less than 0.67; n is greater than 0 and less than 0.5; and z is greater than 0 and less than 0.25. Optionally, y is greater than 0 and less than 0.5. Optionally, y is greater than 0 and less than 0.4. Optionally, y is greater than 0 and less than or equal to 0.3. Optionally, y is greater than 0 and less than 0.3. Optionally, y is greater than 0.01 and less than or equal to 0.3. Optionally, y is greater than 0.01 and less than 0.3. Optionally, a concentration of divalent ion vacancies in the material characterized by formula FX2 is less than or equal to $10^{-18}$/mol, optionally less than or equal to $10^{-19}$/mol, optionally less than or equal to $10^{-20}$/mol, optionally selected from the range of $10^{-18}$/mol to $10^{-22}$/mol, and optionally selected from the range of $10^{-19}$/mol to $10^{-21}$/mol. For example, generally, the electrolyte material, $MPS_3$, can have a metal cation vacancy concentration on the order of $10^{-20}$/mol (e.g., less than $10^{-19}$/mol and greater than $10^{-21}$/mol) wherein M is one or more divalent metal cations, but not aliovalent metal cation, such as the electrolyte according to formula FX2. Introduction of aliovalent (non-divalent) metal cation substituents, such as, but not limited to, in the case of the electrolyte according to formula FX3, introduces additional divalent metal cation vacancies. For example, substituting $Zn^{2+}$ with $Al^{3+}$ to a degree both adds $Al^{3+}$ on some $Zn^{2+}$ sites but also introduces $Zn^{2+}$ vacancies, such as due to charge balancing the electrolyte. Similarly, other aliovalent substituents, including but not limited to tetravalent metal cations, can be used to tune (e.g., increase) the vacancy concentration in the electrolyte, and thereby also tune the divalent ion conductivity thereof (while preferably having the electrolyte remain electrically insulating). Optionally, the electrolyte is characterized by formula (FX2). Optionally, the electrolyte is characterized by formula (FX3). Optionally, the electrolyte is characterized by formula (FX10). Optionally, the electrolyte is characterized by formula (FX11). Optionally, the electrolyte is characterized by formula (FX5) or (FX12):

$$Zn_{1-1.5y}A^{3+}_yE_{0.5y}PS_3 \quad (FX5); \text{ or}$$

$$Zn_{1-2z}A^{4+}_zE_zPS_3 \quad (FX12);$$

wherein: $A^{3+}$ is at least one trivalent metal cation; E is a divalent ion vacancy; x is greater than 0 and less than 1; y is greater than 0 and less than 0.67. For example, can be $Zn^{2+}$ ion vacancy in the structure of the solid electrolyte material. As in FX3, y is optionally greater than 0 and less than 0.5, y is optionally greater than 0 and less than 0.4, y is optionally greater than 0 and less than or equal to 0.3, and y is optionally greater than 0 and less than 0.3. Optionally, y is greater than 0.01 and less than or equal to 0.3. Optionally, y is greater than 0.01 and less than 0.3. Optionally, the electrolyte is characterized by formula (FX5). Optionally, the electrolyte is characterized by formula (FX12). Optionally, $A^{3+}$ is at least one trivalent metal cation. Optionally, $A^{3+}$ comprises at least one metal cation selected from the group consisting of $Al^{3+}$, $Ga^{3+}$, $Ge^{4+}$, $In^{3+}$, $V^{3+}$, and any combination thereof. Optionally, $A^{3+}$ comprises at least one metal cation selected from the group consisting of $Al^{3+}$, $Ga^{3+}$, $Ge^{4+}$, $In^{3+}$, and any combination thereof. Optionally, $A^{3+}$ comprises $Al^{3+}$. Optionally, $A^{2+}$ comprises at least one metal cation selected from the group consisting of $Mg^{2+}$, $Ni^{2+}$, $Co^{2+}$, $Ca^{2+}$, $Fe^{2+}$, $Mn^{2+}$, and any combination thereof. Optionally, $A^{4+}$ is $Ga^{4+}$. Optionally, $A^{2+}$ comprises the metal cation $Mg^{2+}$. Optionally, M in FX1 comprises $Zn_y$, wherein y is selected from the range of 0.925 to 0.70.

Preferably, the electrolyte is characterized by a divalent ion conductivity at a temperature less than 500° C. Preferably, the electrolyte is characterized by a divalent ion conductivity at a temperature selected from the range of 20° C. and 90° C. Preferably, the electrolyte is characterized by a divalent ion conductivity at room temperature. Optionally, the divalent ion conductivity is conductivity of $Zn^{2+}$ ions in said electrolyte. Optionally, the electrolyte is characterized by a divalent ion conductivity selected from the range of $10^{-8}$ to $10^{-6}$ S/cm at 60° C. Optionally, the electrolyte is characterized by a divalent ion conductivity of at least $10^{-8}$, preferably at least to $10^{-7}$ S/cm, and more preferably at least $10^{-6}$ S/cm at 60° C. Optionally, the electrolyte is characterized by an electrical conductivity of less than or equal to, preferably less than, $10^{-9}$ S/cm at 21° C. Optionally, the material is characterized by an electrical resistivity of at least $10^7$ Ωm, preferably at least $10^8$ Ωm, or optionally selected from the range of $10^7$ to $10^8$ Ωm. Optionally, the electrolyte is characterized by an electron band gap of at least 2 eV. Optionally, the electrolyte is characterized by a calculated indirect electron band gap of at least 2 eV. The electron band gap can be determined from optical absorption measurements, such as described in Brec, et al. ("Physical properties of lithium intercalation compounds of the layered transition-metal chalcogenophosphites," Inorg. Chem., 1979, 18, 7, 1814-1818). In some embodiments, the $MPS_3$ material has a band gap of 3.4 eV, as determined via from the optical absorption edge using optical absorption measurements. Optionally, the electrolyte's divalent ion conductivity (optionally, of $Zn^{2+}$ ions) is characterized by a bulk conductivity activation energy selected from the range of 100 to 600 meV, preferably for some applications 100 to 500 meV, more preferably for some applications 100 to 400 meV, and further more preferably for some applications 100 to 300 meV. Optionally, the electrolyte's divalent ion conductivity (optionally, of $Zn^{2+}$ ions) is characterized by a bulk conductivity activation energy selected from the range of 300 to 500 meV. Preferably, electrolyte's divalent ion conductivity (optionally, of $Zn^{2+}$ ions) is characterized by a bulk conductivity activation energy of less than 500 meV.

Optionally, a crystal structure of the electrolyte comprises a layered structure and a van der Waals gap between layers, the van der Waals gap being at least 3 Å, or optionally selected from the range of 3 to 4 Å. Optionally, a crystal structure of the electrolyte comprises $[P_2S_6]^{4-}$ polyanions. Optionally, the electrolyte's divalent ion conductivity is characterized by divalent ion vacancy-hopping and a polyanion distortion.

Optionally, the electrochemical cell is not a Li-ion cell and/or the electrolyte does not comprise Li ions during operation of the electrochemical cell. Optionally, the electrochemical cell is selected from the group consisting of a fuel cell, an air battery, all-solid state battery, and a hybrid electrolyte battery.

Preferably in some applications, wherein the solid state electrolyte characterized by formula FX1 is a first solid electrolyte; wherein the electrochemical cell comprises a hybrid electrolyte in ionic communication with the positive electrode and the negative electrode; and wherein the hybrid electrolyte comprises said first solid electrolyte and a second electrolyte. Optionally, the second electrolyte is a second solid electrolyte, a first liquid electrolyte, a first gel electrolyte, a first polymer electrolyte, or a combination thereof. Optionally, the hybrid electrolyte is in the form of a slurry or a paste. Optionally, the first solid electrolyte is in the form of particles or a powder. Optionally, the first solid electrolyte is porous; and wherein the first solid electrolyte has a plurality of pores comprising the second electrolyte therein.

Optionally, the solid state electrolyte does not comprise a metal oxide framework (MOF). Optionally, the solid state electrolyte is nonporous such that a liquid cannot flow therethrough. Optionally, the electrochemical cell does not comprise a liquid electrolyte.

Optionally, the solid state electrolyte characterized by formula FX1 is a first solid electrolyte; wherein the electrochemical cell further comprises a first liquid electrolyte. Optionally, the first solid electrolyte is porous; and wherein the first solid electrolyte has a plurality of pores comprising the first liquid electrolyte therein. Optionally, the cell further comprises a second solid electrolyte. The second solid electrolyte is optionally a metal oxide framework (MOF) material.

In another aspect, a material characterized by formula (FX6) or (FX7):

$$M^ZPS_3 \quad \text{(FX6); or}$$

$$M^MPS_3 \quad \text{(FX7);}$$

wherein: $M^Z$ is $Zn^{2+}$ and at least one metal cation other than $Zn^{2+}$, and optionally divalent ion vacancies; and $M^M$ is $Mg^{2+}$ and at least one metal cation other than $Mg^{2+}$, and optionally divalent ion vacancies. Optionally, the material is characterized by formula FX6. Optionally, the material is characterized by formula FX7. Optionally, $M^Z$ includes the $Zn^{2+}$ vacancies. Optionally, $M^M$ includes the $Mg^{2+}$ vacancies. Optionally, $M^Z$ includes the at least one metal cation other than $Zn^{2+}$ selected from the group consisting of $Mg^{2+}$, $Ni^{2+}$, $Co^{2+}$, $Ca^{2+}$, $Fe^{2+}$, $Mn^{2+}$, $Al^{3+}$, $Ga^{3+}$, $Ge^{4+}$, $In^{3+}$, $V^{3+}$, and any combination thereof. Optionally, $M^Z$ includes the at least one metal cation other than $Zn^{2+}$ selected from the group consisting of $Mg^{2+}$, $Ca^{2+}$, $Al^{3+}$, $Ga^{3+}$, $Ge^{4+}$, $In^{3+}$, and any combination thereof. Optionally, $M^Z$ includes the at least one metal cation other than $Zn^{2+}$ selected from the group consisting of $Mg^{2+}$, $Al^{3+}$, $Ga^{3+}$, $Ge^{4+}$, $In^{3+}$, and any combination thereof. Optionally, $M^M$ includes the at least one metal cation other than $Mg^{2+}$ selected from the group consisting of $Zn^{2+}$, $Ni^{2+}$, $Co^{2+}$, $Ca^{2+}$, $Fe^{2+}$, $Mn^{2+}$, $Al^{3+}$, $Ga^{3+}$, $Ge^{4+}$, $In^{3+}$, $V^{3+}$, and any combination thereof. Optionally, $M^M$ includes the at least one metal cation other than $Mg^{2+}$ selected from the group consisting of $Zn^{2+}$, $Ca^{2+}$, $Al^{3+}$, $Ga^{3+}$, $Ge^{4+}$, $In^{3+}$, and any combination thereof. Optionally, $M^M$ includes the at least one metal cation other than $Mg^{2+}$ selected from the group consisting of $Zn^{2+}$, $Al^{3+}$, $Ga^{3+}$, $Ge^{4+}$, $In^{3+}$, and any combination thereof. Optionally, $M^z$ is $Zn^{2+}$ and at least one divalent metal cation other than $Zn^{2+}$. Optionally, $M^z$ is $Zn^{2+}$ and at least one aliovalent metal ion other than $Zn^{2+}$ and divalent cation vacancies. Optionally, $M^M$ is $Mg^{2+}$ and at least one divalent metal cation other than $Mg^{2+}$. Optionally, $M^M$ is $Mg^{2+}$ and at least one aliovalent metal cation other than $Mg^{2+}$ and divalent ion vacancies. Optionally, the at least one metal cation other than $Zn^{2+}$ (of the material characterized by formula FX6) is at least one divalent metal cation and a concentration of divalent ion vacancies in the material is less than or equal to $10^{-18}$/mol, optionally less than or equal to $10^{-19}$/mol, optionally less than or equal to $10^{-20}$/mol, optionally selected from the range of $10^{-18}$/mol to $10^{-22}$/mol, and optionally selected from the range of $10^{-19}$/mol to $10^{-21}$/mol. Optionally, the at least one metal cation other than $Mg^{2+}$ (of the material characterized by formula FX7) is at least one divalent metal cation and a concentration of divalent ion vacancies in the material is less than or equal to $10^{-18}$/mol, optionally less than or equal to $10^{-19}$/mol, optionally less than or equal to $10^{-20}$/mol, optionally selected from the range of $10^{-18}$/mol to $10^{-22}$/mol, and optionally selected from the range of $10^{-19}$/mol to $10^{-21}$/mol. Optionally, the material is characterized by formula (FX2), (FX3), (FX10), or (FX11):

$$Zn_{1-x}A^{2+}{}_xPS_3 \quad \text{(FX2);}$$

$$Zn_{1-1.5y}A^{3+}{}_yPS_3 \quad \text{(FX3);}$$

$$Zn_{1-n}A^{1+}{}_{2n}PS_3 \quad \text{(FX10); or}$$

$$Zn_{1-2z}A^{4+}{}_zPS_3 \quad \text{(FX11);}$$

wherein: $A^{1+}$ is at least one monovalent metal cation; $A^{2+}$ is at least one divalent metal cation other than Zn; $A^{3+}$ is at least one trivalent metal cation; $A^{4+}$ is at least one tetravalent metal cation; x is greater than 0 and less than 1; y is greater than 0 and less than 0.67; n is greater than 0 and less than 0.5; and z is greater than 0 and less than 0.25. Optionally, y is greater than 0 and less than 0.5. Optionally, y is greater than 0 and less than 0.4. Optionally, y is greater than 0 and less than or equal to 0.3. Optionally, y is greater than 0 and less than 0.3. Optionally, y is greater than 0.01 and less than or equal to 0.3. Optionally, y is greater than 0.01 and less than 0.3. Optionally, a concentration of divalent ion vacancies in the material characterized by formula FX2 is less than or equal to $10^{-18}$/mol, optionally less than or equal to $10^{-19}$/mol, optionally less than or equal to $10^{-20}$/mol, optionally selected from the range of $10^{-18}$/mol to $10^{-22}$/mol, and optionally selected from the range of $10^{-19}$/mol to $10^{-21}$/mol. For example, generally, the material $M^Z PS_3$ and $M^M PS_3$ can have a metal cation vacancy concentration on the order of $10^{-20}$/mol (e.g., less than $10^{-19}$/mol and greater than $10^{-21}$/mol) wherein M is one or more divalent metal cations, but not aliovalent metal cation (i.e., wherein the at least one metal cation other than $Zn^{2+}$ or other than $Mg^{2+}$ is at least one divalent metal cation), such as the material according to formula FX2. Introduction of aliovalent (non-divalent) metal cation substituents, such as, but not limited to, in the case of the material according to formula FX3, introduces additional divalent metal cation vacancies. For example, substituting $Zn^{2+}$ with $Al^{3+}$ to a degree both adds $Al^{3+}$ on some $Zn^{2+}$ sites but also introduces $Zn^{2+}$ vacancies, such as due to charge balancing the material. Similarly, other aliovalent substituents, including but not limited to tetravalent metal cations, can be used to tune (e.g., increase) the vacancy concentration in the material, and thereby also tune the divalent ion conductivity thereof. Optionally, the material is characterized by formula (FX5) or (FX12):

  (FX5); or

  (FX12);

wherein: $A^{3+}$ is at least one trivalent metal cation; E is a divalent ion vacancy; x is greater than 0 and less than 1; y is greater than 0 and less than 0.67. For example, can be $Zn^{2+}$ ion vacancy in the structure of the solid electrolyte material. As in FX3, y is optionally greater than 0 and less than 0.5, y is optionally greater than 0 and less than 0.4, y is optionally greater than 0 and less than or equal to 0.3, and y is optionally greater than 0 and less than 0.3. Optionally, y is greater than 0.01 and less than or equal to 0.3. Optionally, y is greater than 0.01 and less than 0.3. Optionally, $A^{3+}$ is at least one trivalent metal cation. Optionally, $A^{3+}$ comprises at least one metal cation selected from the group consisting of $Al^{3+}$, $Ga^{3+}$, $Ge^{4+}$, $In^{3+}$, $V^{3+}$, and any combination thereof. Optionally, $A^{2+}$ comprises at least one metal cation selected from the group consisting of $Mg^{2+}$, $Ni^{2+}$, $Co^{2+}$, $Ca^{2+}$, $Fe^{2+}$, $Mn^{2+}$, and any combination thereof. Optionally, $A^{2+}$ comprises the metal cation $Mg^{2+}$. Optionally, $A^{4+}$ is $Ga^{4+}$. Optionally, the material is characterized by formula FX2. Optionally, the material is characterized by formula FX3. Optionally, the material is characterized by formula FX10. Optionally, the material is characterized by formula FX11. Optionally, the material is characterized by formula FX5. Optionally, the material is characterized by formula FX12.

One of ordinary skill in the art should understand that, to account for the presence of optional vacancies of divalent metal cations in the electrolyte/material, an alternative representation of the formula $M^Z PS_3$ is, for example, $M^Z_{1-\delta} PS_3$, and an alternative representation of the formula $M^M PS_3$ is, for example, $M^M_{1-\delta} PS_3$, where $\delta$ corresponds to vacancies of metal cations in the electrolyte/material, such as, but not limited to, vacancies (or, absence of metal cations) at metal cation site(s) in the material's structure, such as, but not limited to, $Zn^{2+}$ or $Mg^{2+}$ vacancies respectively. For example, in some embodiments, such as where M in FX1 includes at least one divalent metal cation and none of aliovalent metal cations, $\delta$ is optionally selected from the range of 0.00001 to 0.01, optionally selected from the range of 0.0001 to 0.01, optionally selected from the range of 0.001 to 0.01, optionally selected from the range of 0.00001 to 0.001, optionally selected from the range of 0.0001 to 0.001, optionally less than 0.01, and optionally less than 0.001. For example, in some embodiments, such as where M in FX1 includes at least one divalent metal cation as well as at least one aliovalent metal cation, such as at least one trivalent metal cation and/or at least one tetravalent cation, $\delta$ is optionally selected from the range of 0.01 to 0.4, optionally selected from the range of 0.01 to 0.3, optionally selected from the range of 0.02 to 0.3, optionally selected from the range of 0.03 to 0.3, optionally selected from the range of 0.05 to 0.3, preferably for some applications selected from the range of 0.07 to 0.3, and more preferably for some applications selected from the range of 0.075 to 0.3.

Optionally, the material is characterized by a divalent ion conductivity and wherein the electrolyte is electrically insulating. Optionally, the material is characterized by a divalent ion conductivity at a temperature less than 500° C. Optionally, the material is characterized by a divalent ion conductivity at room temperature. Optionally, the material's divalent ion conductivity is conductivity of $Zn^{2+}$ ions in said electrolyte. Optionally, the material is characterized by a divalent ion conductivity selected from the range of $10^{-8}$ to $10^{-6}$ S/cm at 60° C. Optionally, the material is characterized by an electrical conductivity of less than or equal to $10^{-9}$ S/cm at 21° C. Optionally, the electrolyte is characterized by a divalent ion conductivity selected from the range of $10^{-8}$ to $10^{-6}$ S/cm at 60° C. Optionally, the material is characterized by an electrical resistivity of at least $10^7$-$10^8$ Ωm. Optionally, the material is characterized by an electron band gap of at least 2 eV. Optionally, the material's divalent ion conductivity (optionally, of $Zn^{2+}$ ions) is characterized by a bulk conductivity activation energy selected from the range of 100 to 600 meV, preferably for some applications 100 to 500 meV, more preferably for some applications 100 to 400 meV, and further more preferably for some applications 100 to 300 meV. Optionally, the material's divalent ion conductivity (optionally, of $Zn^{2+}$ ions; optionally of $Mg^{2+}$ ions) is characterized by a bulk conductivity activation energy selected from the range of 300 to 500 meV.

Optionally, a crystal structure of the material comprises a layered structure and a van der Waals gap between layers, the van der Waals gap being at least 3 Å, or optionally selected from the range of 3 to 4 Å. Optionally, a crystal structure of the material comprises $[P_2S_6]^{4-}$ polyanions. Optionally, the material's divalent ion conductivity is characterized by divalent ion vacancy-hopping and a polyanion distortion.

Also disclosed herein are solid state electrolytes have any one or any combination of embodiments of solid state electrolytes and/or materials disclosed herein. Also disclosed herein are electrochemical cells having solid state electrolytes according to any one or any combination of embodiments of electrolytes and/or materials disclosed herein. Also disclosed herein are materials according to any one or any combination of embodiments of electrolytes and/or materials disclosed herein. Also disclosed herein are method of making and methods of using any of the electrochemical cells, solid state electrolytes, and materials disclosed herein.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 5A. Initial, relaxed structure shows two sites for nearest-neighbor Zn atoms around the vacancy ($V_{Zn}$): a less distorted Zn site (Zn') and a distorted Zn site (Zn"). The energy as a function of the Zn migration pathway for (FIG. 5B) Zn' diffusion directly through the edge, (FIG. 5C) Zn' diffusion through the face, and (FIG. 5D) Zn" diffusion through the face. The structures at each image are overlaid in their respective panels with increasing opacity to show the pathway and the structural changes as a function of diffusion. Minimal structural distortions are visible from this projection.

FIG. 6A. P—P—S bond angle, φ, in $[P_2S_6]$ in the initial structure is 106.5°. The distortion of the $[P_2S_6]^{4-}$ polyanion in the high-energy transition state structures is visualized by superimposing the $[P_2S_6]^{4-}$ polyanion in the transition state structure on the initial structure (shaded black). The P—P—S bond angle increases by (FIG. 6B) 2.1° in path a, (FIG. 6C) 4.7° in path b, and (FIG. 6D) 4.5° in path c. There are minimal ($\leq$0.03 Å) changes to the P—P and P—S bond length.

FIGS. 10A-10D. The four calculated Zn interstitial sites in the van der Waals gap of $ZnPS_3$. FIG. 10A. $Tet_1$ and (FIG. 10B) $tet_2$ are the most stable, with formation energies of 1.43 eV and 1.37 eV, respectively. FIG. 10C. $Tet_3$ and (FIG. 10D) oct are less stable, with formation energies of 1.81 eV and 2.20 eV, respectively.

FIG. 13C. The energy of the transition state is 456 meV. The dashed line is a guide to the eye.

FIG. 14C. The energy of the transition state is 424 meV. The dashed line is a guide to the eye.

FIG. 15C. The energy of the transition state is 316 meV. The dashed line is a guide to the eye.

STATEMENTS REGARDING CHEMICAL COMPOUNDS AND NOMENCLATURE

Figure 1A:
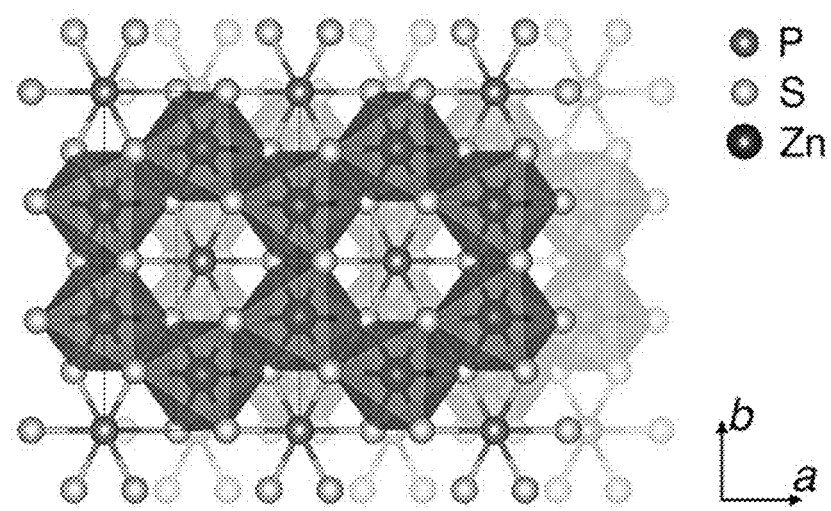
FIG. 1A. $ZnPS_3$ structure is composed of a distorted honeycomb network of octahedral $Zn^{2+}$ coordinated by $[P_2S_6]^{4-}$ polyanions.

In general, the terms and phrases used herein have their art-recognized meaning, which can be found by reference to standard texts, journal references and contexts known to those skilled in the art. The following definitions are provided to clarify their specific use in the context of the invention.

The term "electrochemical cell" refers to a device and/or device component(s) that convert chemical energy into electrical energy or electrical energy into chemical energy. Electrochemical cells have two or more electrodes (e.g., one or more positive electrodes and one or more negative electrodes) and one or more electrolytes. For example, an "electrolyte" may be a fluid electrolyte or a solid electrolyte, also referred to as a "solid-state" or "solid state" electrolyte. In some optional embodiments, an electrochemical cell has a hybrid electrolyte system, including a solid electrolyte and a liquid electrolyte, which together serve as a "hybrid" electrolyte in said electrochemical cell. Optionally, for example, the hybrid electrolyte include an inorganic solid electrolyte, such as one comprising $ZnPS_3$, and an organic liquid electrolyte. Reactions occurring at an electrode contribute to charge transfer processes in the electrochemical cell. Reactions at an electrode, of the electrochemical cell, can include, but are not limited to, a sorption and/or desorption of a chemical species. Reactions at an electrode, of the electrochemical cell, can include, but are not limited to, an oxidation or a reduction reaction. For example, during operation of the electrochemical cell, an oxidation reaction can occur at the positive electrode and a reduction reaction can occur at the negative electrode, or vice versa. Electrochemical cells include, but are not limited to, primary (non-rechargeable) batteries and secondary (rechargeable) batteries. In certain embodiments, the term electrochemical cell includes metal-air batteries, metal hydride batteries, fuel cells, supercapacitors, capacitors, flow batteries, solid-state batteries, hybrid electrolyte batteries, and catalysis or electrocatalytic cells.

The term "electrode" refers to an electrical conductor where ions and electrons are exchanged with the aid of an electrolyte and an external electrical circuit. Preferably, each electrode of an electrochemical cell is in ionic communication with an electrolyte in the electrochemical cell. Preferably, a positive electrode and a negative electrode are in ionic communication with each other inside the electrochemical cell (via an electrolyte) and are in electrical communication with each other via an electrical circuit that is external with respect to the electrochemical cell (an external electrical circuit). Preferably, but not necessarily, the term "negative electrode" refers to the electrode that is conventionally referred to as the anode during discharging of the electrochemical cell. Preferably, but not necessarily, during charging of the electrochemical cell, the negative electrode is one that is conventionally referred to as the cathode. An exemplary negative electrode material used in batteries, for example, includes, but is not limited to, a carbon allotrope such as graphite, graphitic carbon, or glassy carbon. Preferably, but not necessarily, the term "positive electrode" refers to the electrode that is conventionally referred to as the cathode during discharging of the electrochemical cell. Preferably, but not necessarily, during charging of the electrochemical cell, the positive electrode is one that is conventionally referred to as the anode.

"Electrolyte" refers to an ionic conductor which can be in the solid state, the liquid state (most common) or more rarely a gas (e.g., plasma). As used herein, terms "solid electrolyte," "solid-state electrolyte," and "solid state electrolyte" are interchangeable and intended to have an equivalent meaning. A solid state electrolyte is an electrolyte that comprises immobile ions (in contrast to a liquid or gel material) and that is substantially or entirely characterized as being in the solid state of matter. Preferably, the solid state electrolyte is entirely a solid material. Preferably a solid electrolyte is not an electrolyte conventionally characterized or art-known as a liquid electrolyte, a gel electrolyte, or a polymer electrolyte. Optionally, a solid electrolyte is a rigid material. Preferably, a solid electrolyte can conduct ions without requiring ions to conduct through a liquid, gel, or other soft material. Preferably, during operation of an electrochemical cell having said solid electrolyte, said solid electrolyte does conduct ions without requiring ions to conduct through a liquid, gel, or other soft material. Optionally, an electrochemical cell having a solid electrolyte does not comprise a liquid or gel electrolyte for conducting ions. Optionally, an electrochemical cell having a solid electrolyte further also comprises a liquid electrolyte (e.g., a hybrid electrolyte). Preferably, the ions that are being conducted by the solid electrolyte are a part of the structure and chemical composition of the solid electrolyte while the ions are conducting (e.g., hopping) in the solid electrolyte. Preferably, the solid electrolyte has divalent ion conductivity (e.g., $Zn^{2+}$). Preferably, but not necessarily, the solid electrolyte has divalent ion conductivity due to hopping, preferably vacancy-mediated hopping, of the divalent ion within the solid electrolyte. For example, the solid state ion conductivity of the solid electrolyte can occur via movement of ions via defects in a crystal structure of the solid electrolyte. Preferably, the composition of the solid electrolyte comprises divalent ion vacancies, which preferably facilitate divalent ion conductivity in the solid electrolyte. Optionally, the divalent ion conductivity (e.g., via hopping; e.g., via vacancy-mediated hopping) includes or is facilitated by deformation in a structure of the solid electrolyte, such as deformation of anions (e.g., polyanions) of the solid electrolyte. Preferably, divalent ions of the solid electrolyte (e.g., divalent ions in the formula or composition characterizing the solid electrolyte) participate in the divalent ion conductivity of said solid electrolyte. Preferably, a solid electrolyte is characterized by a crystal structure. Optionally, a solid electrolyte is characterized by a layered structure (e.g., $ZnPS_3$; e.g., $MgPS_3$). Optionally, a solid electrolyte is a two-dimensional material having a plurality of layers. Optionally, a solid electrolyte is characterized by a layered structure having a van der Waals gap between layers of the layered structure.

Preferably, but not necessarily, the solid electrolyte is at least partially crystalline (single or polycrystalline). For example, a solid electrolyte can be characterized by a degree of crystallinity selected from the range of 25% to 100%. Optionally, at least a fraction of the solid electrolyte has an amorphous structure. The solid electrolyte is optionally a polycrystalline material. Optionally, the solid electrolyte is nonporous. Optionally, the solid electrolyte is non-porous such that a liquid cannot flow through said solid electrolyte. Optionally, the solid electrolyte is porous. Optionally, the solid electrolyte comprises a plurality of pores, wherein each of the plurality of pores comprises a liquid electrolyte therein. An electrochemical cell can optionally have more than one solid electrolyte.

The term "hybrid electrolyte" refers to an electrolyte that comprises a plurality of electrolytes, each of the plurality of electrolytes being different from each other. The hybrid electrolyte can include electrolytes of a plurality of phases. For example, a hybrid electrolyte can include at least one solid electrolyte and at least one liquid. For example, a hybrid electrolyte can include at least one solid electrolyte and at least one gel electrolyte. For example, a hybrid electrolyte can include at least one solid electrolyte and at least one polymer electrolyte. For example, a hybrid electrolyte can include at least one solid electrolyte and at least one liquid electrolyte and/or at least one gel electrolyte and/or at least one polymer electrolyte. The hybrid electrolyte, or optionally a solid electrolyte thereof, can optionally be in the form of a slurry or a paste. The hybrid electrolyte, or optionally a solid electrolyte thereof, can optionally be in the form of a slurry or a paste during its deposition or formation. For example, a solid electrolyte and a liquid or gel electrolyte can together be in the form of a slurry or paste. The solid electrolyte of a hybrid electrolyte is optionally in the form of particles or powder. the hybrid electrolyte can comprise more than one solid electrolyte. A solid electrolyte of a hybrid electrolyte can be any electrolyte or any material according to embodiments disclosed herein. According to any embodiments disclosed herein, an electrochemical cell optionally comprises a hybrid electrolyte.

Generally, as used herein, the term M as used the formulas $MPS_3$, $M^MPS_3$, and $M^ZPS_3$ (e.g. in FX1, FX6, and FX7) includes one or more metal cations and optionally includes vacancies of one or more metal cations. A concentration of native, entropic, or intrinsic vacancies of metal cations in the $MPS_3$ materials disclosed herein when M does not include metal cation(s) other than divalent metal cations (i.e., when M is only divalent metal cations) can, for example, be on the order of $10^{-20}$/mol (e.g., less than $10^{-19}$/mol and greater than $10^{-21}$/mol). In some embodiments, native, entropic, or intrinsic vacancy concentration can vary with the method of deposition of the materials disclosed herein as well as with the quality, such as degree of crystallinity, of said materials. In some embodiments, the concentration of native, intrinsic, or entropic vacancies (of metal cations) in the materials and electrolytes disclosed herein is optionally selected from the range of $10^{-16}$/mol to $10^{-25}$/mol, optionally selected from the range of $10^{-17}$/mol to $10^{-24}$/mol, optionally selected from the range of $10^{-18}$/mol to $10^{-23}$/mol, optionally selected from the range of $10^{-18}$/mol to $10^{-25}$/mol, optionally selected from the range of $10^{-18}$/mol to $10^{-22}$/mol, optionally selected from the range of $10^{-19}$/mol to $10^{-23}$/mol, optionally selected from the range of $10^{-18}$/mol to $10^{-22}$/mol, optionally selected from the range of $10^{-19}$/mol to $10^{-22}$/mol, and optionally selected from the range of $10^{-19}$/mol to $10^{-21}$/mol. Introduction of aliovalent (non-divalent) metal cation substituents at the M sites of the material's structure, such as, but not limited to, in the case of the material according to formula FX3, introduces additional divalent metal cation vacancies. For example, substituting $Zn^{2+}$ in $ZnPS_3$ with $Al^{3+}$ to a degree (e.g., forming $Zn_{1-1.5y}Al_yPS_3$, where y is between 0 and 0.67) both adds $Al^{3+}$ on some $Zn^{2+}$ sites but also introduces $Zn^{2+}$ vacancies, such as due to charge balancing the material. Similarly, other aliovalent substituents, including but not limited to tetravalent metal cations, can be used to tune (e.g., increase with respect to native entropic vacancy concentration) the vacancy concentration in the material, and thereby also tune the divalent ion conductivity. One of ordinary skill in the art should understand that, to account for the presence of optional vacancies of divalent metal cations in the electrolyte/material, an alternative representation of the formula $MPS_3$ is, for example, $M_{1-\delta}PS_3$, where δ corresponds to vacancies of metal cations in the electrolyte/material, such as, but not limited to, vacancies (or, absence of metal cations) at metal cation site(s) in the material's structure, such as, but not limited to, $Zn^{2+}$ vacancies. For example, in some embodiments, such as where M in FX1 includes at least one divalent metal cation and none of aliovalent metal cations, δ is optionally selected from the range of 0.00001 to 0.01, optionally selected from the range of 0.0001 to 0.01, optionally selected from the range of 0.001 to 0.01, optionally selected from the range of 0.00001 to 0.001, optionally selected from the range of 0.0001 to 0.001, optionally less than 0.01, and optionally less than 0.001. For example, in some embodiments, such as where M in FX1 includes at least one divalent metal cation as well as at least one aliovalent metal cation, such as at least one trivalent metal cation and/or at least one tetravalent cation, δ is optionally selected from the range of 0.01 to 0.4, optionally selected from the range of 0.01 to 0.3, optionally selected from the range of 0.02 to 0.3, optionally selected from the range of 0.03 to 0.3, optionally selected from the range of 0.05 to 0.3, preferably for some applications selected from the range of 0.07 to 0.3, and more preferably for some applications selected from the range of 0.075 to 0.3.

The term "ionic communication" refers to the arrangement of one or more materials or objects such that ions, preferably positive ions, or cations, can efficiently conduct from one material or object to another material or object. Preferably, ionic communication refers to conductivity or transfer of positive ions, or cation. In some embodiments, objects or materials in ionic communication are in direct ionic communication, wherein ions (e.g., divalent cations) transfer (conduct) directly from one object or material to the other. For example, in an electrochemical cell, preferably, an electrode and a solid state electrolyte are in ionic communication. In some embodiments, objects or materials in ionic communication are in indirect ionic communication, wherein ions (e.g., divalent cations) transfer (conduct) from one object or material to the other via an intermediate object or material, such as other layer(s) or coatings in the electrochemical cell, which separate the objects or materials that are in said indirect ionic communication. For example, preferably, a positive electrode in in ionic communication with a negative electrode via the solid state electrolyte. An object or material that is characterized by ionic conductivity, such as divalent ion conductivity, can participate in ionic communication with another object or material. The term ion(ic) conductivity, such as divalent ion conductivity, preferably refers to conductivity of positive ions, or cations.

"Electrical contact," "electrical communication", "electronic contact" and "electronic communication" refer to the arrangement of one or more materials or objects such that an electric current efficiently flows from one object to another. Preferably, but not necessarily, two material objects having an electrical resistance between them less than 100Ω are considered in electrical communication with one. An electrical contact can also refer to a component of a device or object used for establishing electrical communication with external devices or circuits, for example an electrical interconnection. "Electrical communication" also refers to the ability of two or more materials and/or structures that are capable of transferring charge between them, preferably in the form of the transfer of electrons. In some embodiments, components in electrical communication are in direct electrical communication wherein an electronic signal or charge carrier(s), preferably electrons, is directly transferred from one component to another. In some embodiments, components in electrical communication are in indirect electrical communication wherein an electronic signal or charge carrier(s), preferably electrons, is indirectly transferred from one component to another via one or more intermediate structures, such as circuit elements, separating the components.

The term "electrically insulating" refers to a material or object characterized by an electrical resistivity greater than or equal to $10^7$ Ωm, such as an electrical resistivity selected from the range of $10^7$ to $10^8$ Ωm, and/or an electrical conductivity less than or equal to $10^{-9}$, such as an electrical conductivity selected from the range of $10^{-9}$ to $10^{-10}$ S/cm. In some embodiments, an electrically insulating material is characterized by an electrical resistivity greater than or equal to $10^8$ Ωm, optionally greater than or equal to $10^9$ Ωm, and/or an electrical conductivity less than or equal to $10^{-10}$, optionally less than or equal to $10^{-11}$ S/cm. Preferably, a material or object found or used in an electrochemical cell is electrically insulating if it is electrically insulating (e.g., electrical resistivity greater than or equal to $10^7$ Ωm and/or an electrical conductivity less than or equal to $10^{-9}$ S/cm) during operation (charging and discharging) of the electrochemical cell. Wang, et al. ("MgSc2Se4—a magnesium solid ionic conductor for all-solid-state Mg batteries?", ChemSusChem 10.1002/cssc.201900225) includes a discussion of conductivity in certain solid ion conductor materials.

The term "electronic band gap" is used interchangeably with "band gap" and "bandgap" and has the art-known meaning in the field of semiconductors and solid state physics. Generally, an electronic band gap refers to a material's energy range for which no electron states exist, generally found between the highest occupied molecular orbital or valence band and the lowest unoccupied molecular orbital or conduction band.

The term "divalent ion" refers to an ion, preferably a positive ion or cation, that has a valence or valency of two. A valence or valency of two refers to the atom or ion using two electrons in chemical bonding. Preferably, the term divalent ion refers to a divalent cation, or positive divalent ion. Preferably, the term divalent ion refers to a metal cation that is a divalent ion. A divalent metal ion, for example, has an oxidation number of +2 in a heteronuclear bond in an ionic compound. The term "trivalent ion" refers to an ion, preferably a positive ion or cation, that has a valence or valency of three. A valence or valency of three refers to the atom or ion using three electrons in chemical bonding. Preferably, the term trivalent ion refers to a trivalent cation, or positive trivalent ion. Preferably, the term trivalent ion refers to a metal cation that is a trivalent ion. A divalent metal ion, for example, has an oxidation number of +3 in a heteronuclear bond in an ionic compound. Generally, the terms "divalent ion" and "trivalent ion" have art-known meanings. As used herein, the term "isovalent ion" refers to a divalent ion and the term "aliovalent ion" refers to an ion that is not divalent, such as a monovalent or a trivalent ion. As used herein, a "divalent ion vacancy" is a vacancy, or absence, of a divalent ion in a structure of the material. For example, a vacancy at a site that would otherwise be occupied by a divalent ion is a divalent ion vacancy. For example, in $ZnPS_3$, an absence, or vacancy, of a $Zn^{2+}$ at what is otherwise a $Zn^{2+}$ site, in the structure of $ZnPS_3$, correspondence to a divalent ion vacancy.

The terms "metal ion" and "metal cation" refer to an ion of a metal or metalloid element or atom. The term "metal element" refers to a metal or metalloid element of the periodic table of elements. Preferably, a metal element, as used herein, is one that can participate in ionic bonding to form an ionic compound. An exemplary metalloid element includes, but is not limited to, Ge.

The term "metal alloy" refers to an alloy of two or more metals. For example, a metal alloy may be characterized as a solid solution of two or more metal elements (e.g., the metal elements being in the form of atoms or ions in the solid solution), a mixture of metallic phases, or an intermetallic compound. A metal alloy can be characterized as comprising metallic bonding. In certain embodiments, a metal, rather than a metal alloy, refers to a metallic material whose chemical formula has one metal element (i.e., its compositions has substantially or essentially one metal element).

The term "bulk conductivity activation energy" refers to an activation energy corresponding to bulk conductivity of a material. Bulk conductivity refers to the degree to which a solid material conducts of the of mobile carriers through the solid lattice. The carriers in a solid electrolyte are primarily ions. The activation energy refers to the energy needed to drive conductivity. In a solid electrolyte that facilitates bulk conductivity via hopping, the activation energy corresponds to the highest energy site through which the mobile ion traverses between hopping sites.

The term "open shell" refers to an atom, ion, molecule, or compound whose valence shell is not completely filled with electrons. The term "closed shell" refers to atom, ion, molecule, or compound whose valence shell is completely filled with electrons.

An "electrocatyst" is a catalyst that participates in electrochemical reactions.

The term "substantially" refers to a property that is within 10%, within 5%, within 1%, or is equivalent to a reference property. The term "substantially equal", "substantially equivalent", or "substantially unchanged", when used in conjunction with a reference value describing a property or condition, refers to a value that is within 10%, optionally within 5%, optionally within 1%, optionally within 0.1%, or optionally is equivalent to the provided reference value. For example, a ratio is substantially equal to 1 if it the value of the ratio is within 10%, optionally within 5%, optionally within 1%, or optionally equal to 1. The term "substantially greater", when used in conjunction with a reference value describing a property or condition, refers to a value that is at least 2%, optionally at least 5%, or optionally at least 10% greater than the provided reference value. The term "substantially less", when used in conjunction with a reference value describing a property or condition, refers to a value that is at least 2%, optionally at least 5%, or optionally at least 10% less than the provided reference value.

The term "normal temperature and pressure" or "NTP" refers to standard conditions defined as a temperature of 20° C. and an absolute pressure of 1 atm (14.696 psi, 101.325 kPa).

The terms "voltage" and "potential" are used interchangeably herein. Generally, the term "voltage" is more commonly used to describe the voltage, or potential, across the terminals of an electrochemical cell. Generally, the term "potential" is more commonly used to describe the voltage, or potential, at a single electrode.

"Active material" refers to the material in an electrode that takes part in electrochemical reactions which store and/or deliver energy in an electrochemical cell.

The term "average," when used in reference to a material or structure property, refers to a calculated arithmetic mean of at least two, or preferably at least three, identical measurements or calculations of said property. For example, an average density of a structure is the arithmetic mean of at least two measurements performed identically, of the density of said structure.

The term "cross-sectional physical dimension" refers to a physical dimension of a feature measured in a transverse or cross-sectional axis. In an embodiment, the transverse axis is perpendicular to a longitudinal axis of the feature. In an embodiment, a cross-sectional physical dimension corresponds to a width or a diameter of a feature, object, or region. In an embodiment, a longitudinal physical dimension is a dimension of a feature, object, or region along the longitudinal axis of the feature, object, or region, wherein the longitudinal axis is perpendicular to a cross-sectional axis.

The term "wt. %" refers to a weight percent by weight. The term "mol. %" refers to molar percent or percent by moles.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

The invention can be further understood by the following non-limiting examples.

Example 1: Solid State Divalent Ion Conduction in $ZnPS_3$

Next-generation batteries based on divalent working ions have the potential to both reduce the cost of energy storage devices and increase performance. Examples of promising divalent systems include those based on $Mg^{2+}$, $Ca^{2+}$, and $Zn^{2+}$ working ions. Development of such technologies is slow, however, in part due to the difficulty associated with divalent cation conduction in the solid state. Divalent ion conduction is especially challenging in insulating materials that would be useful as solid-state electrolytes or protecting layers on the surfaces of metal anodes. Furthermore, there are no reports of divalent cation conduction in insulating, inorganic materials at reasonable temperatures, prohibiting the development of structure-property relationships. Here, we report $Zn^{2+}$ conduction in insulating $ZnPS_3$, demonstrating divalent ionic conductivity in an ordered, inorganic lattice near room temperature. Importantly, the activation energy associated with the bulk conductivity is low, 351±99 meV, comparable to some $Li^+$ conductors such as LTTO, although not as low as the superionic $Li^+$ conductors. First-principles calculations suggest that the barrier corresponds to vacancy-mediated diffusion. Assessment of the structural distortions observed along the ion diffusion pathways suggests that an increase in the P—P—S bond angle in the $[P_2S_6]^{4-}$ moiety accommodates the $Zn^{2+}$ as it passes through the high-energy intermediate coordination environments. $ZnPS_3$ now represents a baseline material family to begin developing the structure-property relationships that control divalent ion diffusion and conduction in insulating solid-state hosts.

Divalent cations, $M^{2+}$, with relatively negative standard reduction potentials including $Mg^{2+}$, $Ca^{2+}$, and $Zn^{2+}$ are possible alternatives to Li-based battery chemistries.[1,2] The divalent nature of the cations enables two-electron redox processes for energy storage that help offset the gravimetric capacity loss incurred by the heavier atom. Additionally, reversible metal plating and stripping have been demonstrated with $Mg^{2+}$, $Ca^{2+}$, and $Zn^{2+}$, thereby significantly enhancing the volumetric and gravimetric capacities afforded by the anode compared to conventional Li-intercalated graphite anodes.[3-5] Although Li metal is the holy grail of anodes, reversible Li metal plating and stripping are yet to be realized due to the safety risks imposed by Li dendrites formed during repeated electrodeposition.[6]

Replacing monovalent $Li^+$ with $M^{2+}$ affects the redox and mass transfer processes during discharge and charge. Reversible redox and efficient charge transfer require an understanding of how these fundamental processes are affected by the high charge density of the divalent cation. For example, solid-state ionic conductivity of $M^{2+}$ is expected to be more difficult compared to that of $M^+$ due to the increase in both mass and charge density. Solid-state ion conduction is an essential process in rechargeable batteries as it occurs in both the active material when intercalation mechanisms are at play and, in some cases, the electrolyte in all-solid-state batteries. Furthermore, ion conduction is also required through solid-state layers formed at the interface of the active material and liquid electrolytes, the canonical example being Li⁺ diffusion through the solid electrolyte interphase on graphite. Monovalent Li⁺ conduction in the solid state is relatively facile due to its small size and low formal charge. Various strategies have been implemented to maximize the conductivity of Li⁺ in the solid state, such as metal substitution[7,8] and lattice softening.[9] However, although divalent ions exhibit a similar ionic radius to Li⁺ (r=0.76 Å in octahedral environments), compared to $Mg^{2+}$ and $Zn^{2+}$ with r=0.72 and 0.74 Å, respectively,[10,11] similar approaches may not be successful due to the difference in charge density between Li⁺ and $M^{2+}$, suggesting that new structure-property relationships need to be developed for $M^{2+}$.[12,13]

Understanding the design principles that influence $M^{2+}$ conductivity is therefore a key cornerstone to developing batteries based on multivalent working ions. To that end, $Mg^{2+}$-based systems have been the most studied divalent so far with a focus on intercalation materials as active cathodes. Notable intercalation cathodes include the Chevrel phase reported by Aurbach and co-workers[3] and the $TiS_2$ thiospinel reported by Nazar and co-workers.[14] Nazar and co-workers hypothesize that electronic conductivity facilitates $Mg^{2+}$ ion conduction in these systems, which could hinder the realization of an insulating solid electrolyte for divalent working ions.[15] $Mg^{2+}$ conductivity with an activation energy of 370 meV was reported in the selenospinel $MgSc_2Se_4$; however, the material was also electronically conductive.[16] $Mg^{2+}$ conductivity has also been reported in the molecular solids $Mg(BH_4)(NH_2)$,[17] $Mg(en)_3(BH_4)_2$, and $Mg(en)(BH_4)_2$ (en=ethylenediamine)[18] but with significantly higher activation energies ranging from 900 to 1300 meV.

Here, we target $Zn^{2+}$ conductivity in the solid state. Zn batteries are some of the oldest examples of divalent batteries with patents filed in the 19th century on primary cells.[19] Zn-based chemistries continue to make up a majority of the present-day single-use battery market in the form of alkaline batteries.[20] Zn is difficult to displace in this regard because of its low cost, nontoxicity, and electrochemical activity. The two-electron transfer $Zn \rightarrow Zn^{2+}+2e^-$ is a useful anodic reaction that has been paired with a variety of conversion cathodes, including air, MnO, and bromine.[21-23]

Reports of Zn solid-state conductivity are limited to a few examples of either intercalation cathodes with mixed ionic-electronic conduction or high-temperature ceramics. Intercalation of $Zn^{2+}$ in α-$MnO_2$ has been reported in aqueous electrolyte; however, $Zn^{2+}$ is coordinated by water in the discharged material.[24] Reversible intercalation of $Zn^{2+}$ in layered δ-$MnO_2$ even in an organic electrolyte requires bound structural water in the layers to facilitate the intercalation chemistry.[25] Although one cannot draw conclusions from these few examples, it is notable that the desolvation of $Zn^{2+}$ prior to intercalation is unfavorable, resulting in the intercalation of $Zn^{2+}$ with its solvation shell. Recently, however, Gewirth and co-workers reported metal substituted zinc cobaltate spinels ($ZnCo_{2-x}M_xO_4$, M=Al, Mn, Ni) as cathode materials for nonaqueous Zn batteries, using Zn triflate in acetonitrile as the electrolyte.[26,27]

Regarding $M^{2+}$ conduction in insulators, there are hereto no reports below 500° C. Conduction of $Pb^{2+}$ in the canonical β"-$Al_2O_3$ was reported at 40° C.;[28] however, the conduction was later ascribed to mixed ionic and electronic contributions due to hydration.[29] Ion exchange from $ZnCl_2$ in the canonical β"-$Al_2O_3$ was demonstrated at 500° C., suggesting $Zn^{2+}$ mobility within the lattice.[28] $Zn^{2+}$ has been shown to conduct in $ZnZr_4(PO_4)_6$ at 900° C. with a conductivity of up to $1.20 \times 10^{-2}$ S cm⁻¹ and an activation energy between 500 and 750° C. as low as 930 meV.[30]

Figure 1B:
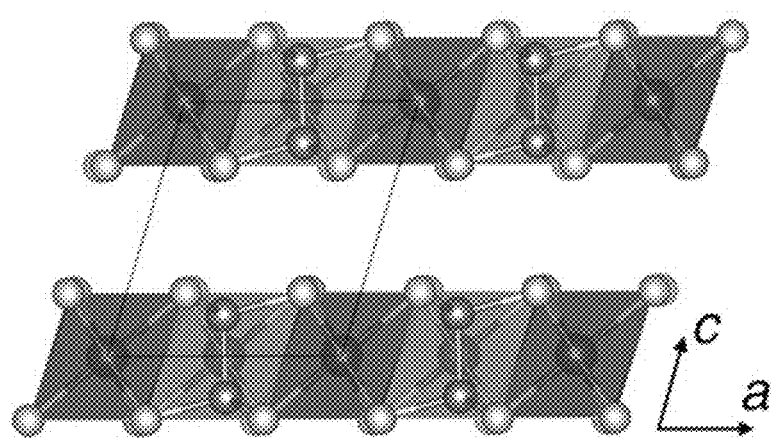
FIG. 1B. Layers in FIG. 1A stack in the c direction to form a layered structure with wide van der Waals gaps decorated by S.
Figure 1C:
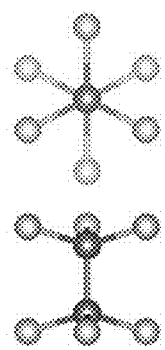
FIG. 1C. $[P_2S_6]^{4-}$ moiety is shown down the P-P dumbbell and rotated 90° to show the staggered configuration of the S.

The shortage of materials that support divalent ionic conductivity precludes studies aimed at understanding the mechanisms of divalent ionic conductivity and inhibits the development of design rules that would enable better and/or tailored divalent ion conductors. Here, we demonstrate $Zn^{2+}$ conductivity in insulating $ZnPS_3$, the structure of which is shown in FIGS. 1A-1C. $ZnPS_3$ has been studied previously with regard to its bonding environment with respect to other $MPS_3$ materials as well as the vibrational and magnetic interactions of organic and organometallic intercalants between $ZnPS_3$ layers.[31-34] $ZnPS_3$ crystallizes in layers composed of a slightly distorted hexagonal network of edge-sharing $Zn^{2+}$ octahedra. The hexagonal $Zn^{2+}$ sublattice is shown approximately perpendicular to the c-axis of the material in FIG. 1A. The $Zn^{2+}$ are coordinated by $[P_2S_6]^{4-}$ polyanions, as shown in FIG. 1C. The layers stack along the c-axis separated by a van der Waals gap of 3.38 Å, as shown in FIG. 1B. The $MPS_3$ system was chosen due to the polarizable lattice provided by the sulfide anions and the layered structure that could allow for ion conduction pathways. The P—P bond in the $[P_2S_6]^{4-}$ (FIG. 1C) can stretch to accommodate various sized $M^{2+}$ in the octahedral site,[35] which may help alleviate structural distortions incurred by $M^{2+}$ diffusion.

Results and Discussion

Figure 2A:
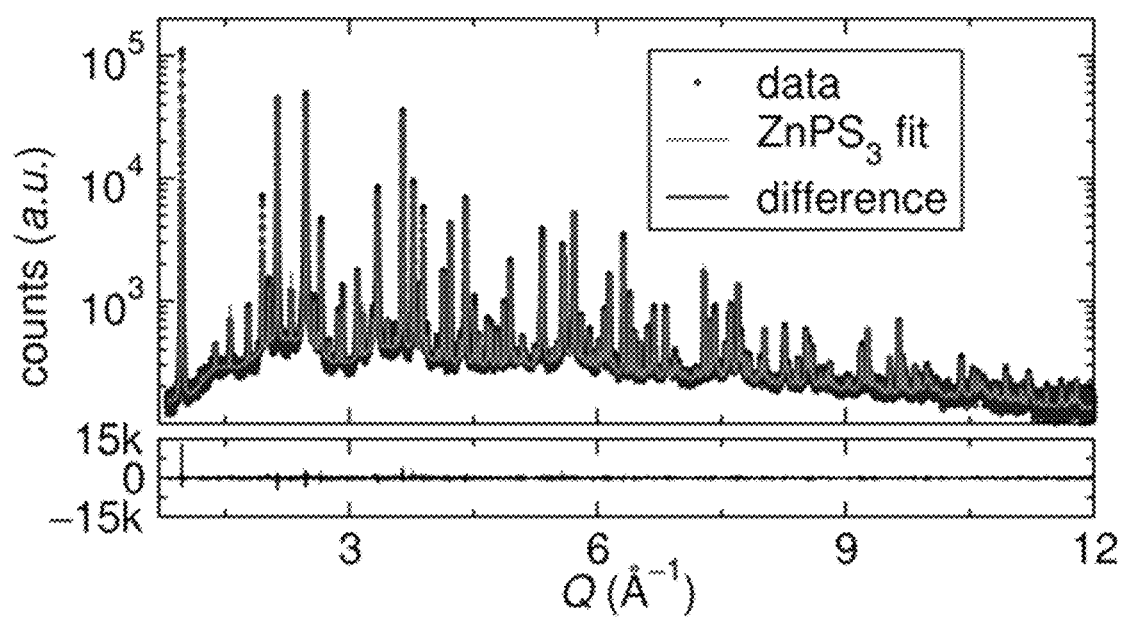
FIG. 2A. Rietveld refinement of the $ZnPS_3$ structure with synchrotron XRD ($\lambda$=0.4126820 Å).
Figure 7:
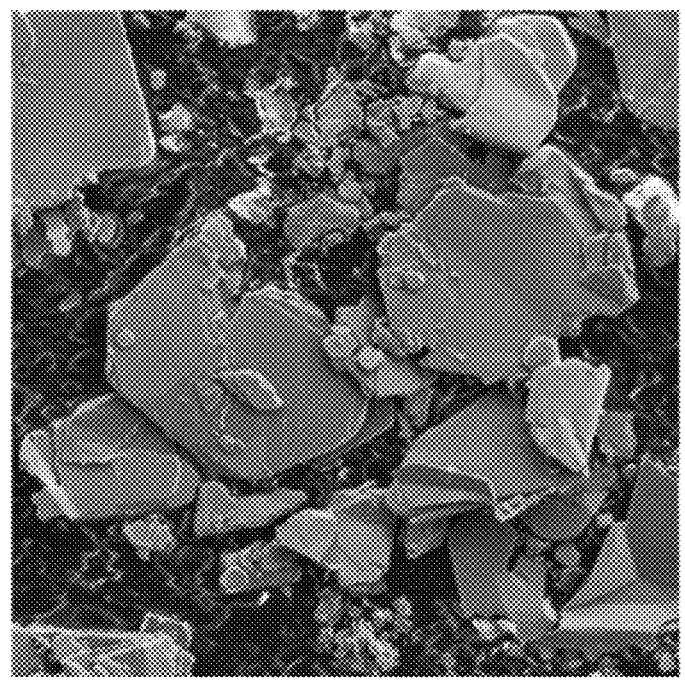
FIG. 7. SEM image of $ZnPS_3$ showing platelike morphology.

Preparation and Structural Characterization. $ZnPS_3$ was prepared from Zn, $P_2S_5$, and $S_8$ (mol/mol 2:1:1) heated in an evacuated vitreous glass ampoule at 400° C. for 24 h to yield a white powder. The phase purity of the prepared material was evaluated by powder X-ray diffraction (XRD), ³¹P NMR, and Raman spectroscopy. FIG. 2A shows synchrotron powder X-ray diffraction (XRD) collected at beamline 11-BM at the Advanced Photon Source.[36] The data were fit to the reported $ZnPS_3$ structure[37] using the Rietveld method. Site disorder between the Zn and P-P dimer is required to achieve a satisfactory fit. Site disorder within the layers is highly unlikely due to the inability of two $[P_2S_6]^{4-}$ moieties to occupy adjacent sites. We hypothesize that the apparent site disorder observed in the diffraction instead arises from stacking displacements, in which the layer slips resulting in P-P at the Zn site and vice versa. The site disorder required to obtain a good Rietveld fit indicates approximately 15% site mixing. The honeycomb $Zn^{2+}$ sublattice is slightly distorted with a shorter Zn—Zn distance along b of 3.40 Å, whereas the Zn—Zn distance 60° from the b-axis in the ab plane is 3.48 Å. Scanning electron microscope images, such as shown in FIG. 7, reveal a plate-like morphology indicative of the two-dimensional van der Waals layers formed perpendicular to the c-axis. The van der Waals gap between the layers is 3.38 Å. The Zn—S bond distances of the Zn octahedra are 2.54-2.59 Å. The P-P bond in the $[P_2S_6]^{4-}$ polyanion is 2.193 Å with P—S bond lengths of 2.007 Å.

Figure 2B:
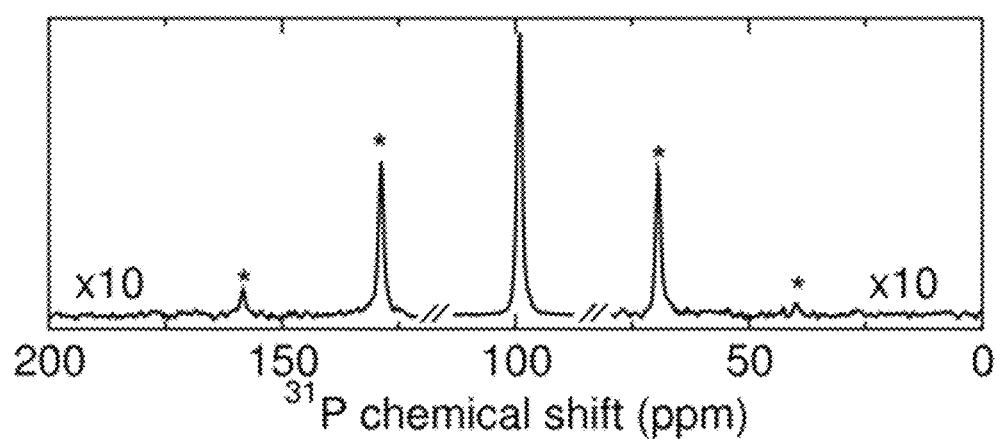
FIG. 2B. $^{31}P$ NMR reveals a single central transition at 99 ppm assigned to the single P Wyckoff site in $ZnPS_3$. No additional resonances are observed. The satellite transitions are marked with * and shown at 10× signal intensity.
Figure 8:
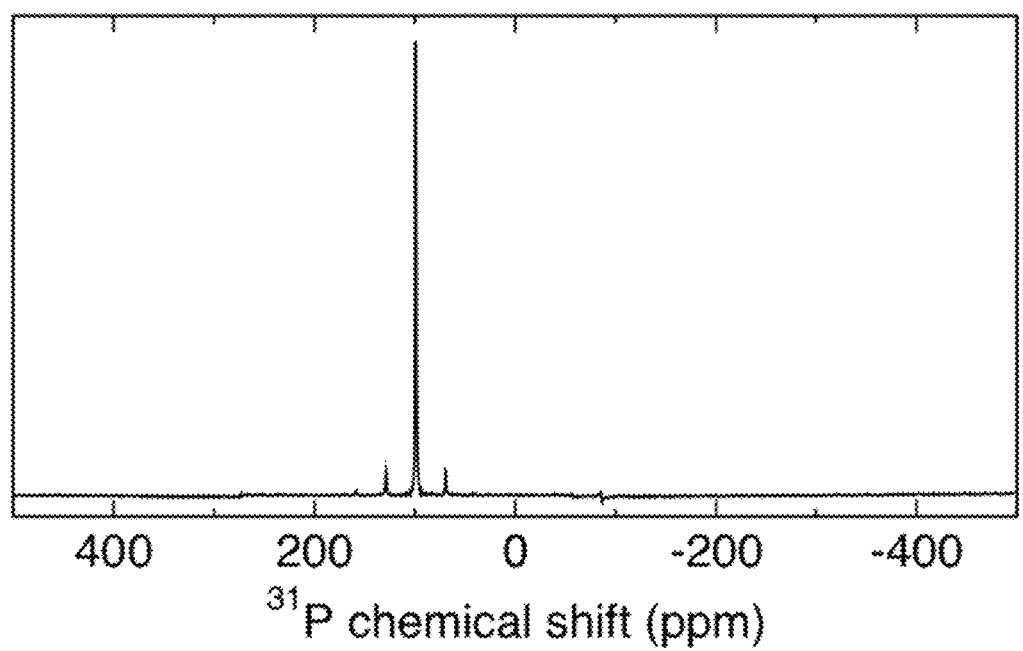
FIG. 8. $^{31}P$ NMR spectrum of $ZnPS_3$ from −500 to 500 ppm.

The ³¹P MAS NMR spectrum of the prepared $ZnPS_3$ is shown in FIG. 2B. A single, sharp resonance is observed at 99 ppm, indicating a single P site, as would be expected for the single Wyckoff site for P in $ZnPS_3$. The location of the resonance is close to that measured in other materials that contain $[P_2S_6]^{4-}$ moieties, including $Ag_4P_2S_6$, $Li_4P_2S_6$, and $CuInP_2S_6$ with ³¹P shifts of 103, 110, and 92.5 ppm, respectively.[38-40] The single resonance is clearly distinct from the ³¹P resonance of the $P_2S_5$ precursor (49.7 ppm) as well as other binary phosphorus sulfides that yield multiple resonances between 50 and 110 ppm.[41] The ³¹P NMR of binary zinc phosphides shows resonances significantly deshielded from the observed 99 ppm peak, between −50 and −150 ppm in $ZnP_2$ and −200 and −250 ppm in $Zn_3P_2$.[42,43] The full range of the ³¹P spectrum is shown in FIG. 8.

Figure 3A:
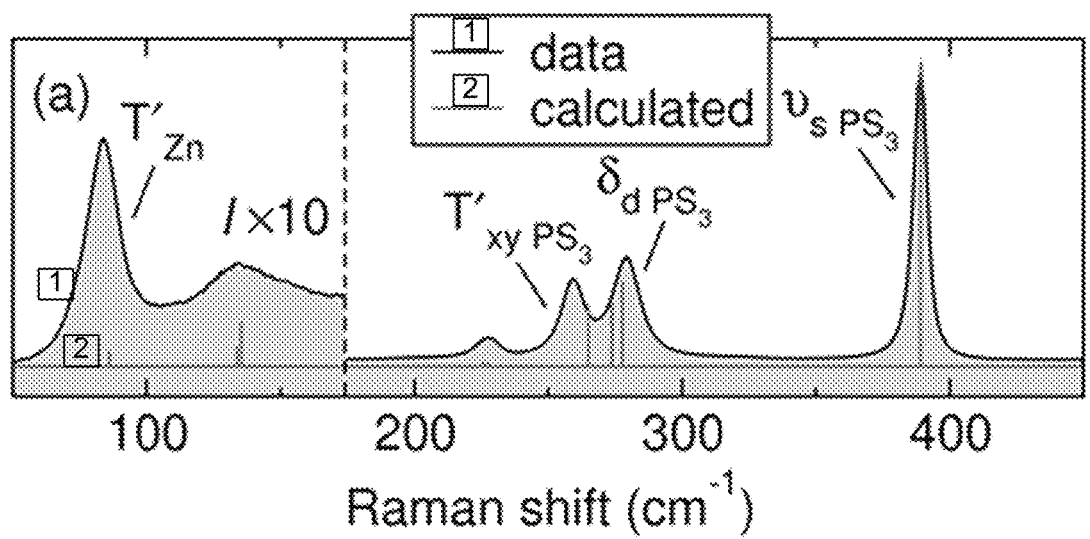
FIG. 3A. Experimentally measured Raman spectrum of $ZnPS_3$ superimposed with the calculated Raman spectrum. The calculated phonon frequencies were scaled by a factor of 4.2% for better visualization. Atomic vector displacements associated with the (FIG. 3B) $T'_{Zn}$, (FIG. 3C) $T_{xy\,PS3}$, (FIG. 3D) $\delta_{d\,PS3}$, and (FIG. 3E) $V_{s\,PS3}$ mode. The magnitude of the vectors is increased by a factor of 4 relative to the magnitude calculated at 0 K for clarity.
Figure 3B:
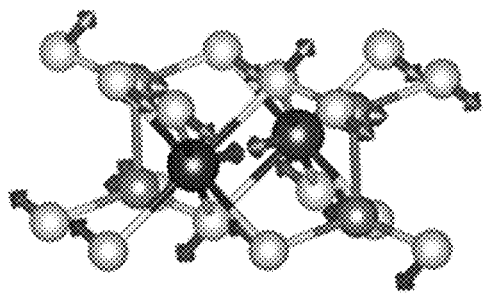
Figure 3C:
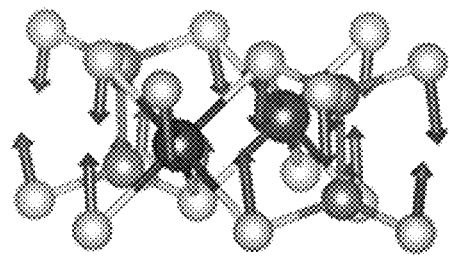
Figure 3D:
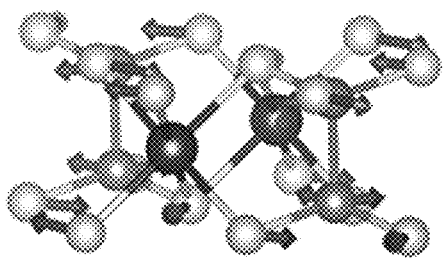
Figure 3E:
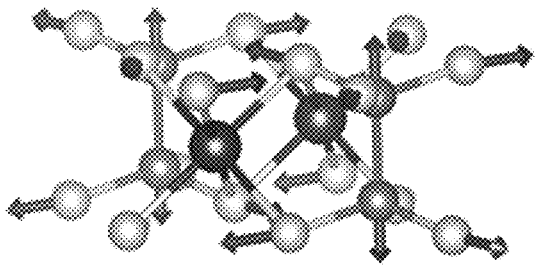
Figure 9:
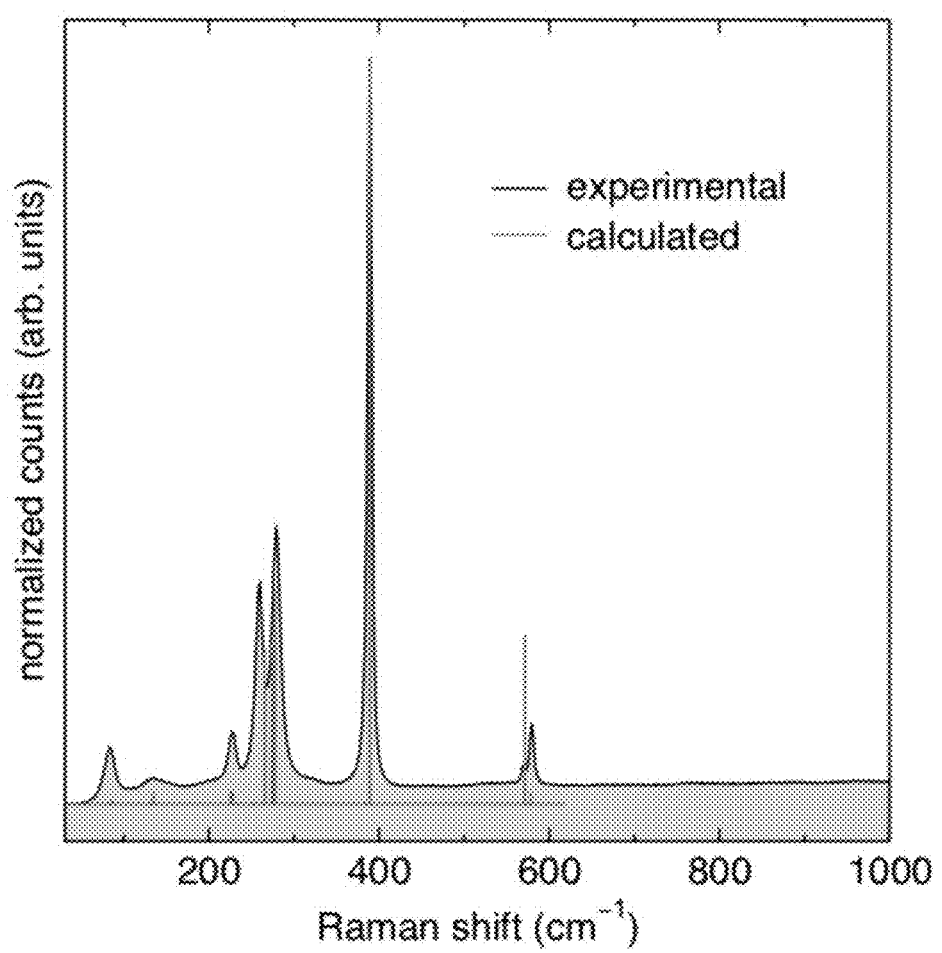
FIG. 9. Raman spectrum of $ZnPS_3$ from 30 $cm^{-1}$ to 1000 $cm^{-1}$. Calculated Raman modes have been stretched by a factor of 4.2% for clearer visualization.

The Raman spectrum of $ZnPS_3$ is shown in FIG. 3A. All observed modes are in good agreement with the previously reported Raman spectrum.[33,34] To visualize the vibrational modes and confirm mode assignments, the Raman spectrum of $ZnPS_3$ was calculated using density functional perturbation theory (see Materials and Methods). The calculated Raman is overlaid with the measured spectrum in FIGS. 3A-3E, and selected modes are visualized in FIGS. 3B-3E. The low-frequency acoustic mode, $T'_{Zn}$, shown in FIG. 3B is of note as it has the most Zn-related character. The $T'_{Zn}$ mode is measured at 84 $cm^{-1}$ (calculated: 82.4 $cm^{-1}$) and can be described by a breathing mode of $Zn_2(\mu-S)_2$ (i.e., two neighboring Zn and the two S at the shared edge of neighboring octahedra). All other observed major modes involve mainly the $P_2S_6$ moiety and are shown in FIGS. 3C-3E. The calculated modes exhibit systematically lower wave-numbers compared to the experimental data. The discrepancy is due to the use of the local density approximation (LDA) together with relaxed lattice geometry in our density functional theory (DFT) calculations (see Materials and Methods). It has been reported that the LDA produces softer phonon frequencies for oxides when used in conjunction with LDA-relaxed structures.[44] The measured and calculated mode positions, along with the assignments and descriptions, are summarized in Table 1. The full range of the Raman spectrum is shown in FIG. 9.

TABLE 1

Vibrational Mode Assignments of the Raman Spectrum of $ZnPS_3$ with Descriptions

| assignment from ref. 34 | raman shift ($cm^{-1}$) measured | raman shift ($cm^{-1}$) calculated | mode description |
|---|---|---|---|
| $T'_{Zn}$ | 84 | 82.4 | Zn translation, P—P wobble |
|  | 134 | 130 | Zn translation |
| $R'_{xy} PS_3$ | 227 | 216.9 | PS3 bend |
| $T_{xy} PS_3$ | 259 | 254.3 | P—S stretch |
| $\delta_d PS_3$ | 279 | 266.5 | P—P wobble |
| $v_s PS_3$ | 389 | 373.4 | P—P stretch, P—S bend |
| $v_d PS_3$ | 579 | 554.6 | P—S stretch |

Electrochemical Impedance Spectroscopy. The ionic conductivity of the $ZnPS_3$ was measured using electrochemical impedance spectroscopy (EIS). A small-amplitude oscillating voltage (50 mV) of varied frequency was applied across the material and the phase and amplitude shift of the current response was measured. In the simplest interpretation, the measured current is dependent on the resistance and capacitance of the cell components and interfaces. The contributions from various materials and interfaces within the cell can be deconvoluted by observing the response of the system over a range of frequencies. It is important to note that both ionic and electronic contributions are measured by EIS.

The preparation of the cell for EIS is of significant importance as varying degrees of reproducibilities are obtained with different cell fabrication methods (vide infra). Briefly, approx. 20 mg of $ZnPS_3$ was cold-pressed in a 0.25" diameter Swagelok cell with polished, nonblocking Zn contacts before sintering at 9 kN (approx. 280 MPa) and 120° C. for 24 h. EIS was collected from 1 MHz to 100 mHz under an applied force of approx. 2 kN (63 MPa). The applied pressure facilitates densification of the solid electrolyte and reduces interfacial resistances, resulting in more reproducible data from cell to cell. We do not expect any changes in the lattice parameters at these pressures because isostructural $FePS_3$ requires pressures of orders of magnitude >2 GPa to cause meaningful changes in lattice parameters.[45] Sequential spectra were collected until the Nyquist plots overlaid, indicating steady-state behavior. EIS was collected from 60 to 90° C. at 10° C. increments with equilibration steps at each temperature. To check the stability of the Zn—$ZnPS_3$ interface after EIS measurements at temperature, we characterized the disassembled metal surface with Raman spectroscopy and X-ray diffraction and observed no evidence of decomposition products (see FIGS. 18, 19, and 20A-20B).

Figures 4A, 4B:
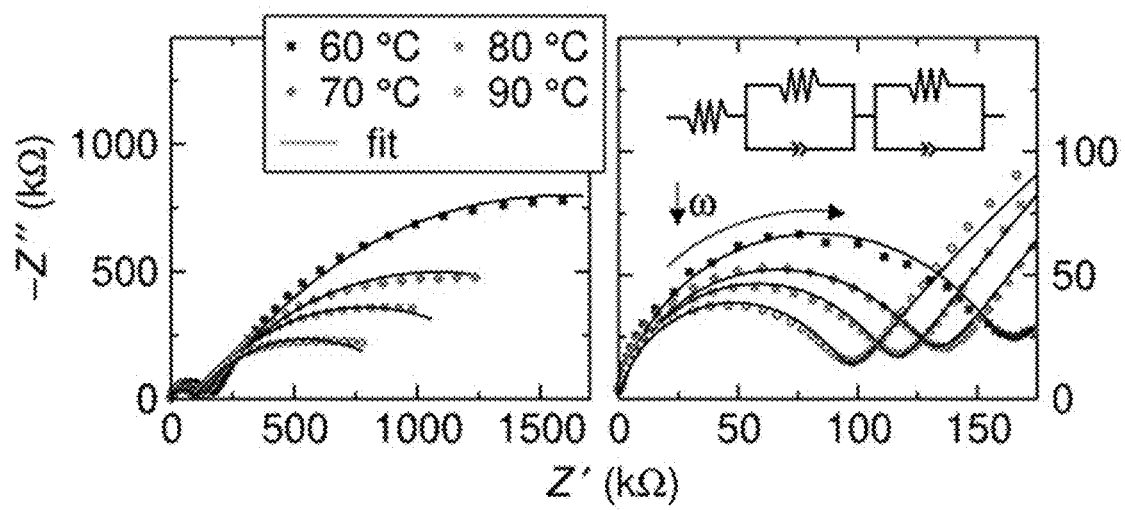
FIGS. 4A-4D. Nyquist plots showing the temperature-dependent EIS data (FIG. 4A) across the whole frequency ($\omega$) range and (FIG. 4B) in the high-frequency region. The corresponding fits to each trace using an equivalent circuit model are overlaid on the data. Arrhenius-type plot of the conductivities of five distinct cells for the (FIG. 4C) low-frequency and (FIG. 4D) high-frequency RC components along with the corresponding averaged activation energies.

Representative Nyquist plots at each temperature are shown in FIG. 4A. The Nyquist curves are fit with the equivalent circuit shown as an inset in FIG. 4B to extract the resistivity and capacitance of each feature. The constant phase element models the experimental data better than a capacitor due to the rough interfaces between the pressed $ZnPS_3$ powder and polished Zn. The data are well described by the model, as shown by the good agreement between the fits and data in FIG. 4A. The two RC features are expressed as two distinct semicircles in the Nyquist plot, one in the high-frequency region and the other at low frequencies. The high frequency feature (lower Z') is shown in greater detail in FIG. 4B.

Each feature of the Nyquist plot can be attributed to distinct ionic conduction pathways within the cell. As the cell is composed of $ZnPS_3$ pressed between two polished, non-blocking Zn electrodes, there are three possible pathways that would give rise to an RC element in the Nyquist plots: (1) $Zn^{2+}$ conduction through bulk $ZnPS_3$, (2) $Zn^{2+}$ conduction at $ZnPS_3$—$ZnPS_3$ grain boundaries, and (3) $Zn^{2+}$ conduction at the $ZnPS_3$—Zn interface. To assign the features in the Nyquist plots to physical processes, it is useful to rationalize the magnitude of the capacitance in the equivalent circuit.[46] The capacitance of the high-frequency RC feature is approximately $10^{-9}$ F, whereas the lower-frequency feature has a capacitance of approximately $10^{-7}$ F. Due to the low capacitance of the high-frequency feature, we ascribe this feature to the bulk ionic conductivity in $ZnPS_3$, which agrees well with interpretations of Nyquist plots obtained for $Li^+$ solid-state ion conductors.[47] The low-frequency feature is then attributed to either $ZnPS_3$—$ZnPS_3$ grain boundaries or $ZnPS_3$—Zn interface. Previous work on solid state $Li^+$ conductors attributes the lower-frequency feature to grain boundaries.[47]

Figures 4C, 4D:
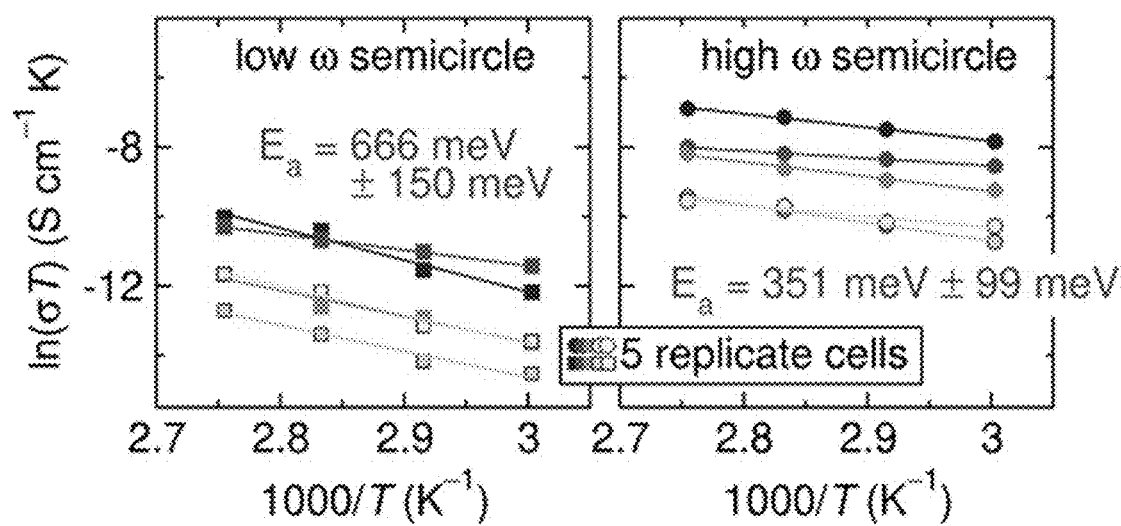

The conductivity measured for five replicate cells is plotted as $\ln(\sigma T)$ vs $T^{-1}$ in FIGS. 4C-4D. The conductivity values vary from cell to cell, with values at 60° C. ranging from $10^{-8}$ to $10^{-6}$ S $cm^{-1}$, likely due to microstructural differences at the Zn—$ZnPS_3$ interface and the possible anisotropic conduction pathways due to the layered crystal structure of $ZnPS_3$. A linear fit of the $\ln(\sigma T)$ vs $T^{-1}$ data, shown in FIG. 4B, allows for the activation energy to be calculated using the following Arrhenius-type relationship: $\ln(\sigma T) = -(E_a)/RT + \ln(A)$. The Arrhenius-type relationship includes the Meyer-Neldel compensation, which accounts for temperature-activated hopping of the mobile species in intrinsic ion conductors, manifested in the prefactor term.[48] Although the conductivity values vary from cell to cell, the $E_a$ obtained from the temperature dependent data is much more consistent since the systematic error is carried through the temperature series. The $E_a$ associated with the grain boundary/interface conductivity $E_a$ is 666±150 meV (FIG. 4C) and the $E_a$ associated with bulk conductivity is 351±99 meV (FIG. 4D). The $E_a$'s reported here are the averages of five replicate cells with the standard deviation representing the cell-to-cell error. We note that the variation observed from cell to cell highlights the need for replicate experiments to be reported along with the error.

Figure 17:
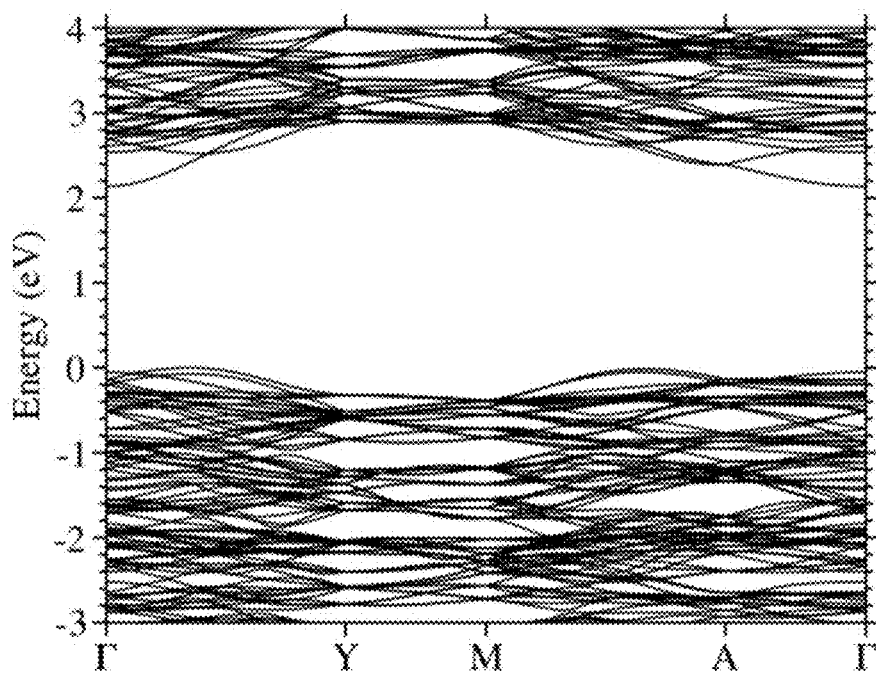
FIG. 17. DFT-PBE band structure of $ZnPS_3$ calculated for the PBE-D2 relaxed structure. The indirect band gap is approx. 2.13 eV.
Figure 18:
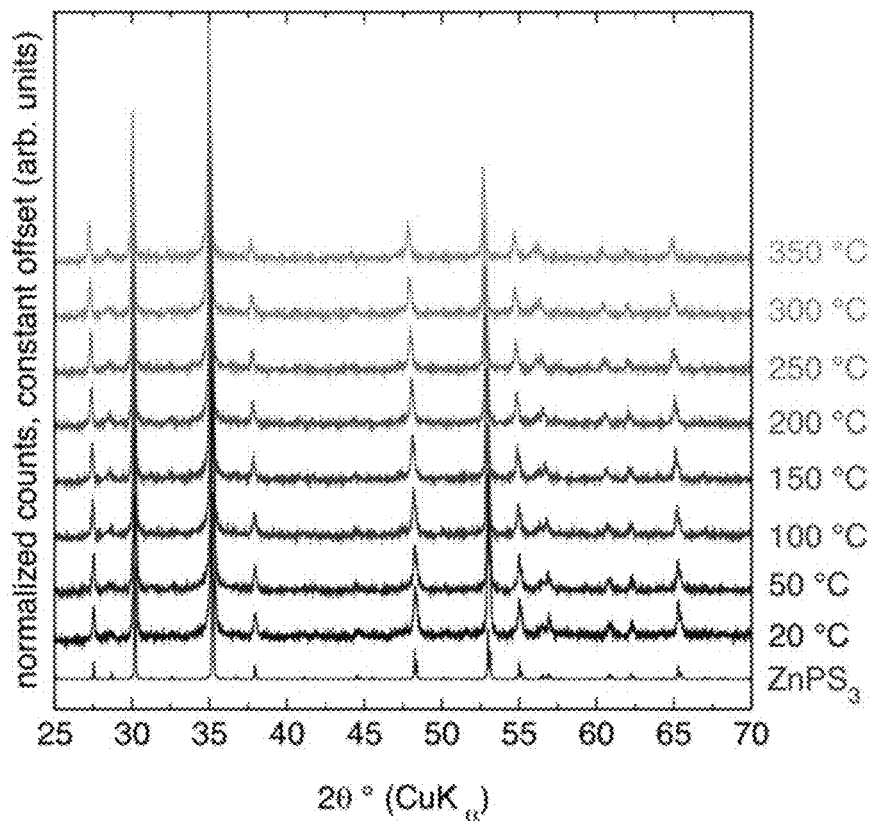
FIG. 18. Temperature dependent powder X-ray diffraction indicates no bulk structural changes or decomposition up to 350° C. A slight shift to lower 2θ is observed upon heating due to positive thermal expansion. The calculated diffraction pattern for $ZnPS_3$ is shown at the bottom for reference.
Figure 19:
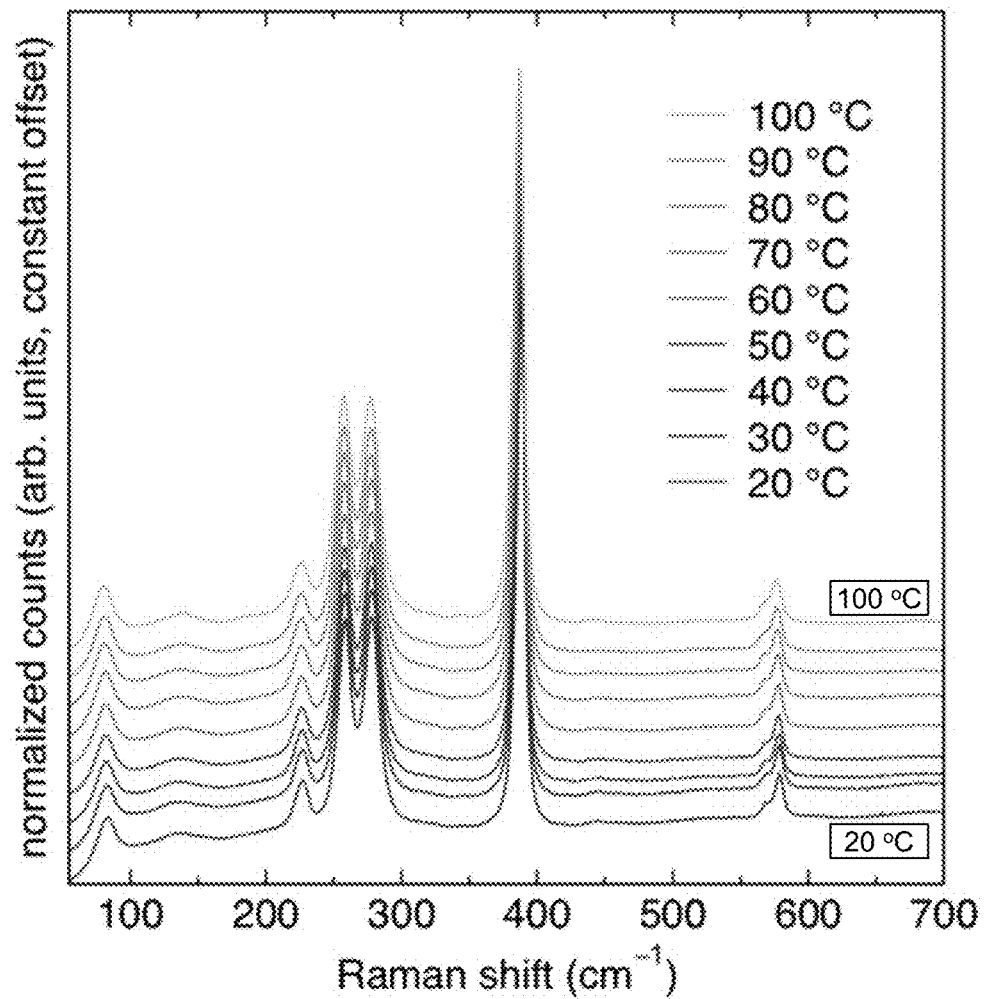
FIG. 19. Temperature dependent Raman spectroscopy shows no evolution of new modes upon heating, providing no evidence of sulfur loss or defect formation.
Figure 20A:
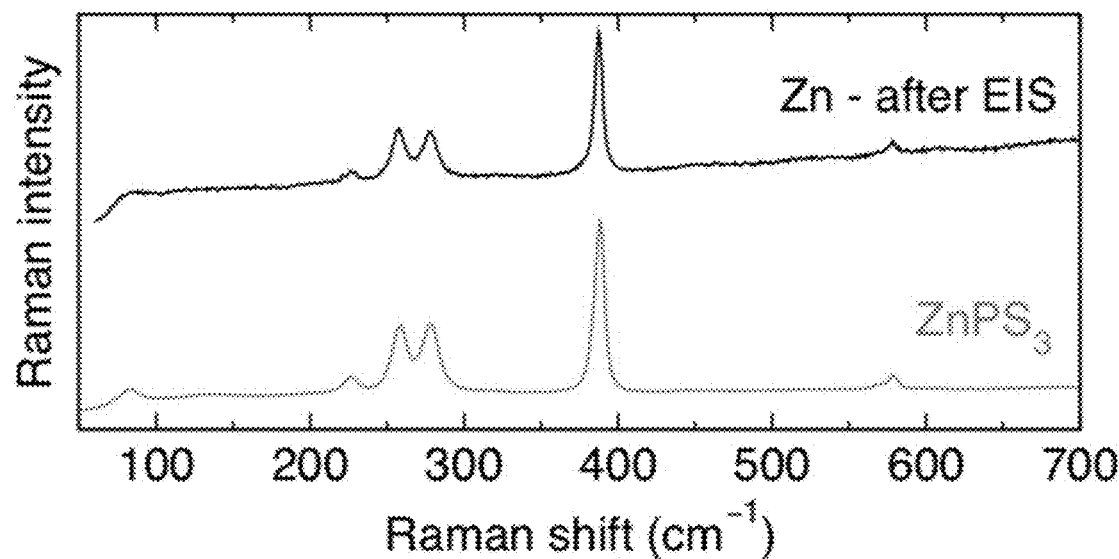
FIG. 20A. Raman spectroscopy of the Zn electrode after EIS measurements reveals no new modes, supporting the stability of $ZnPS_3$ against Zn metal electrodes. All modes arise from $ZnPS_3$ that has adhered to the electrode after sintering at elevated temperature and pressure. The spectrum of $ZnPS_3$ is shown for reference.
Figure 20B:
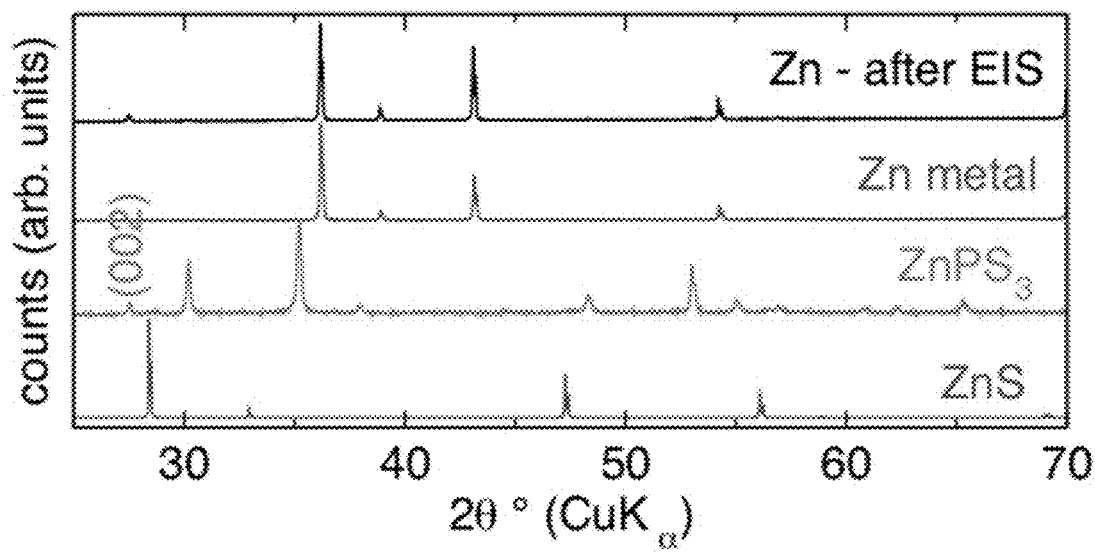
FIG. 20B. Powder X-ray diffraction of the Zn electrode after EIS measurements also the presence of $ZnPS_3$ and Zn metal. The $ZnPS_3$ on the Zn electrode shows preferred orientation along the (002) direction, corresponding to the 2D layers in the crystal structure, as evidenced by the reflection at approx. 27.4 2θ. The diffraction patterns of Zn, $ZnPS_3$, and ZnS are shown for comparison.

To determine the origin of conductivity, we first need to rule out electronic contributions. The band structure of $ZnPS_3$ calculated using the Perdew-Burke-Ernzerhof (PBE) functional to describe exchange and correlation gives a wide, indirect band gap of 2.13 eV (the band structure is shown in FIG. 17). We note that the actual band gap is likely wider as DFT-PBE underestimates band gaps. Additionally, the bulk electronic conductivity of $ZnPS_3$ was previously reported as <$10^{-9}$ S cm$^{-1}$.[49] We measured the electronic resistance of the pellet after annealing with a two-point probe to be >20 MΩ, suggesting that the electrolyte pellet itself remains electronically insulating. We note that the pellet is annealed at higher temperature and the same pressure as the EIS measurements to prevent any changes to the material during EIS, such as the introduction of defects. To further confirm that the temperature range at which EIS is measured does not affect the $ZnPS_3$ structure, we characterized the material by powder XRD and Raman spectroscopy as a function of temperature and observed no changes (see FIGS. 18, 19, and 20A-20B). Together, these observations lead us to rule out any contributions from electronic conductivity. Therefore, the conductivity measured from impedance is ionic. Although highly unlikely, any contribution to conductivity from P can easily be measured by determining the spin-lattice relaxation $T_1$ with $^{31}$P NMR. Indeed, the $T_1$ for P measured by an inversion recovery NMR experiment is 1000 s, ruling out any mobility of the P nuclei in the material. Ideally, we would like to measure $^{67}$Zn NMR to obtain nuclei-specific information about the $Zn^{2+}$ mobility, but $^{67}$Zn is a low γ, quadrupolar nucleus, making it very difficult to obtain information specific to mobility. However, the electronically insulating nature of $ZnPS_3$ coupled with the knowledge that P is immobile and S anions are not regarded as mobile suggests that the ionic conductivity arises from mobile $Zn^{2+}$.

The bulk $E_a$ value is comparable to various garnet-structured lithium ion conductors such as $Li_7GaLa_3Zr_2O_{12}$ (320 meV).[50,51] The value is also comparable to the Mg ion conductor $MgSc_2Se_4$[16] (375 meV) and is substantially lower than the reported value for $Zn^{2+}$ conduction in $ZnZr_4(PO_4)_6$[30] (1300 meV), as well as other Zn conductors proposed theoretically.[16] A comprehensive table of activation energies either measured or calculated for divalent ions is shown able 3.

First-Principles Study of the Ionic Conductivity Mechanisms. Nudged elastic band (NEB) calculations based on DFT provide supplementary evidence of $Zn^{2+}$ mobility in $ZnPS_3$ and give insights into the conduction mechanism. NEB calculations provide access to the energy barriers associated with ionic diffusion by placing the atom along a predefined path and relaxing the structure at intermediate locations ("images") along the path, under the constraint of bands between the images. DFT-PBE over-estimates the c lattice parameter associated with the van der Waals gap of $ZnPS_3$. Here, the PBE-D2 exchange-correlation functional was used to account for van der Waals forces, which reflects experimental data for the c lattice parameter more accurately. A comparison of the experimental and calculated lattice parameters is shown in Table 4.

Because of the layered nature of $ZnPS_3$, we investigate two possible classes of $Zn^{2+}$ conduction: (1) interlayer conduction of $Zn^{2+}$ interstitial defects in the van der Waals gap and (2) hopping between Zn vacancies within the layers, which we refer to as intralayer diffusion pathways. We first discuss the diffusion of $Zn^{2+}$ interstitial defects in the van der Waals gap (interlayer). Evaluation of possible charge neutral tetrahedral and octahedral interstitial sites yields four stable sites. Three of the interstitial sites are distorted tetrahedra. The two most stable sites are nearly identical, with very similar formation energies under Zn-rich conditions of 1.43 and 1.37 eV and thus we only consider the most stable site. The other tetrahedral site has a formation energy of 1.81 eV. The last site is octahedral with a formation energy of 2.20 eV. Details on the coordination environment and formation energies can be found in FIGS. 10A-10D.

Figure 11A:
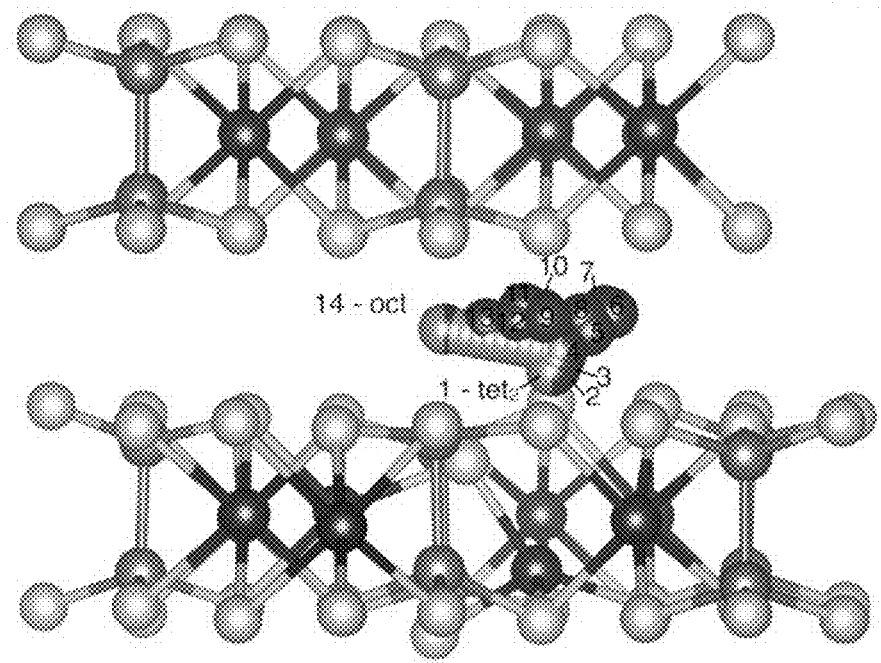
FIG. 11A. Zn migration pathway between $tet_2$ and oct interstitial sites in the van der Waals gap of $ZnPS_3$. The initial position of the Zn interstitial before relaxation for each image are orange. Significant deviations occur in images after the transition state.
Figure 11B:
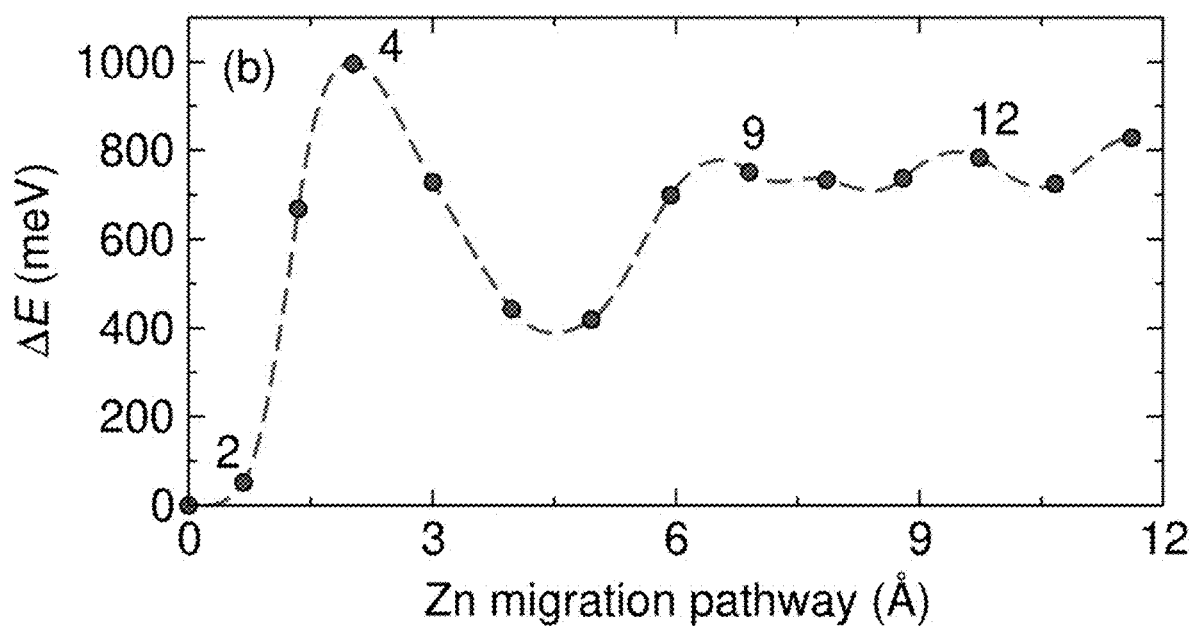
FIG. 11B. The energy barrier is due to the initial displacement of the Zn from the $tet_2$, with a corresponding barrier of 1000 meV.
Figure 12A:
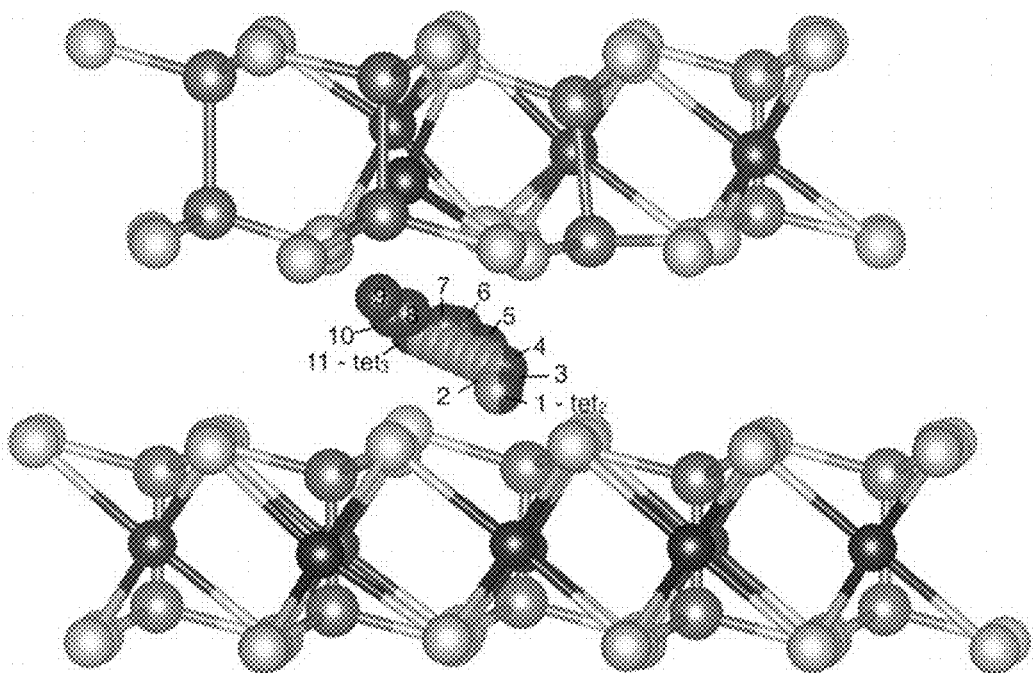
FIG. 12A. Zn migration pathway between $tet_2$ and $tet_3$ interstitial sites in the van der Waals gap of $ZnPS_3$. The initial position of the Zn interstitial before relaxation for each image are orange. Significant deviations occur in images after near the $tet_3$ interstitial site.
Figure 12B:
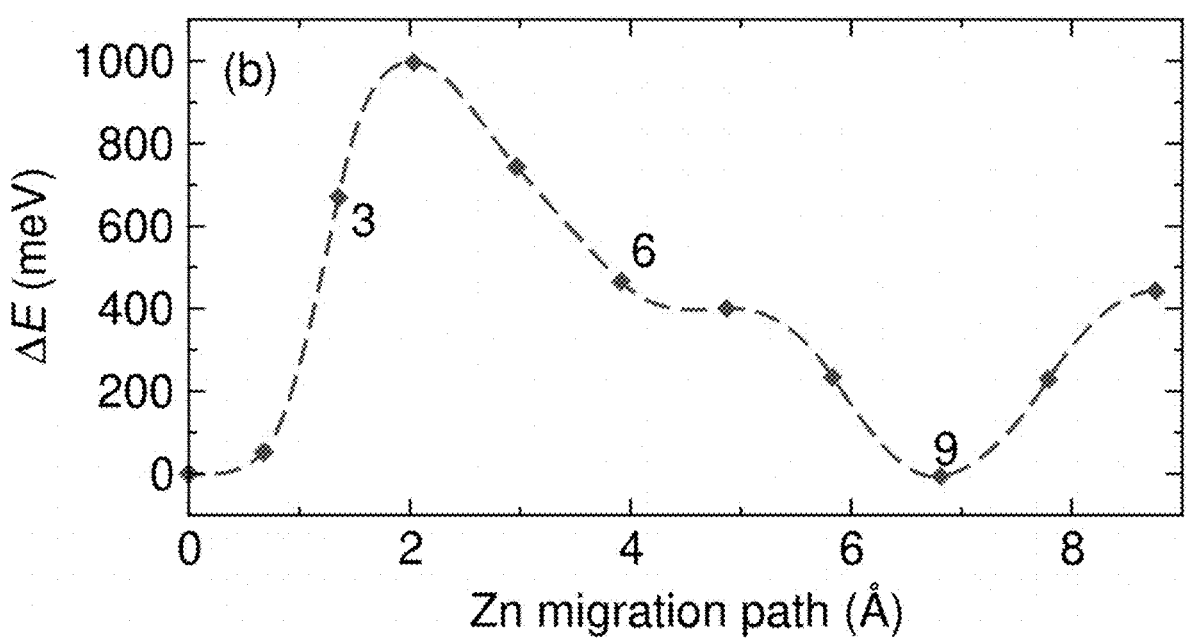
FIG. 12B. The energy barrier is due to the movement of the Zn into the $tet_2$, with a corresponding barrier of 1000 meV.
Figure 13A:
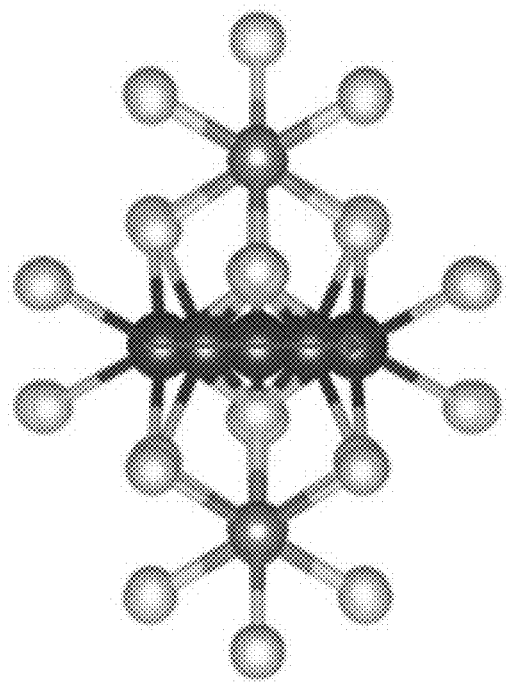
FIGS. 13A-13C. Migration path a calculated using NEB shown (FIG. 13A) orthogonal and (FIG. 13B) parallel to the two-dimensional layer. The red arrow in FIG. 13A indicates the motion of the Zn atom.
Figure 13B:
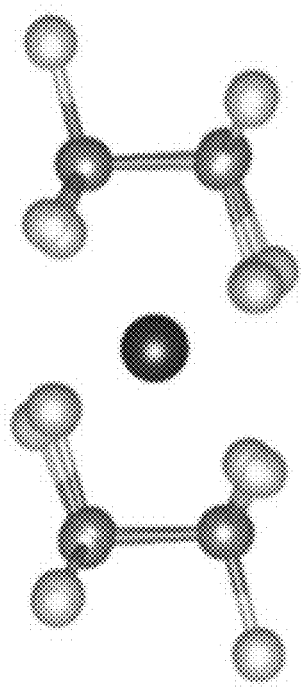
Figure 13C:
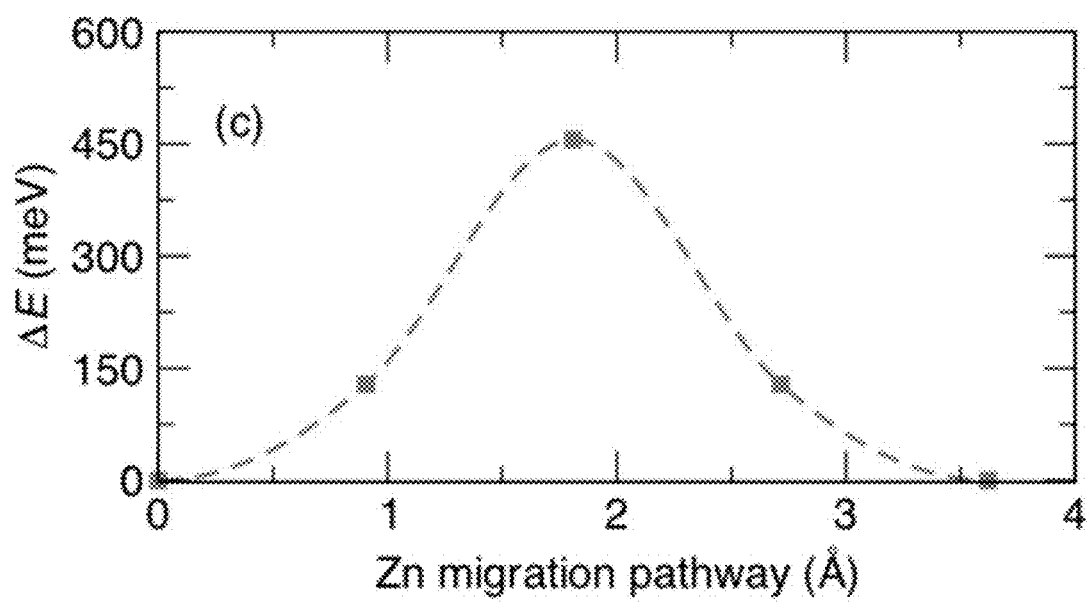
Figure 14A:
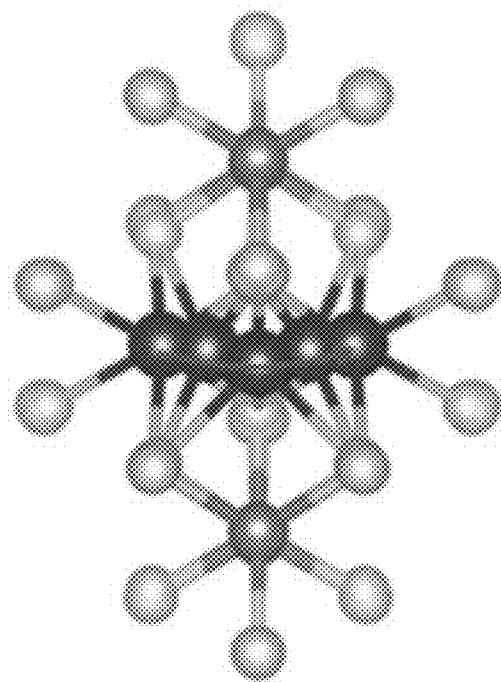
FIGS. 14A-14C. Migration path b calculated using NEB shown (FIG. 14A) orthogonal and (FIG. 14B) parallel to the two-dimensional layer. The red arrow in FIG. 14A indicates the motion of the Zn atom.
Figure 14B:
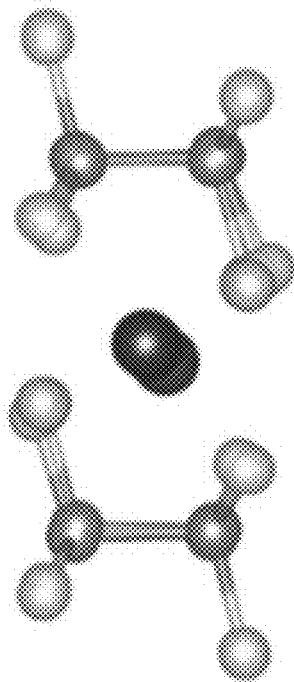
Figure 14C:
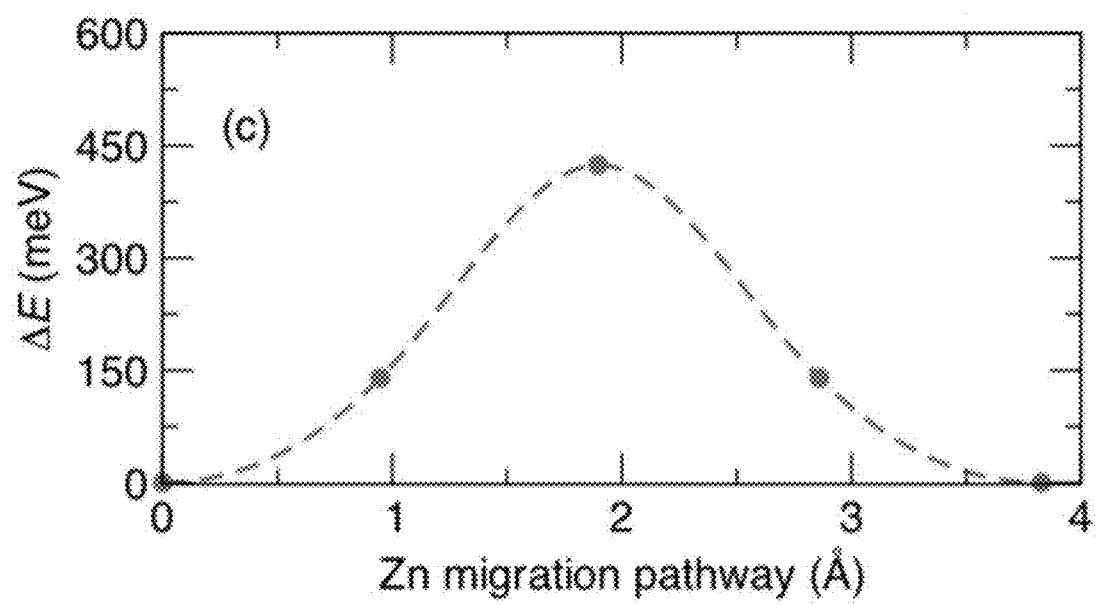
Figure 15A:
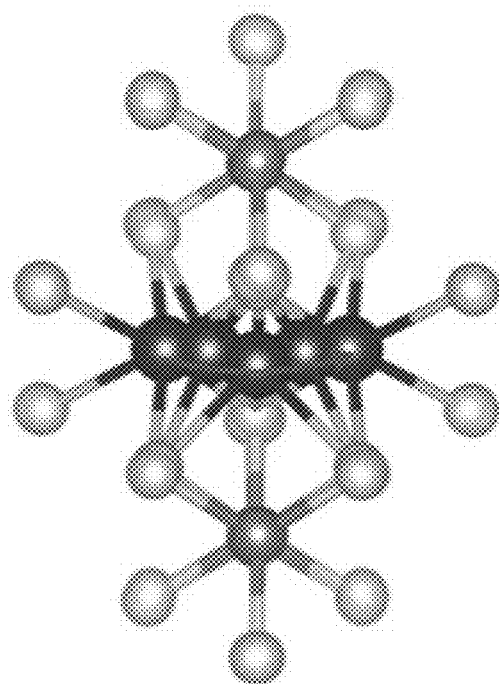
FIGS. 15A-15C. Migration path c calculated using NEB shown (FIG. 15A) orthogonal and (FIG. 15B) parallel to the two-dimensional layer. The red arrow in FIG. 15A indicates the motion of the Zn atom.
Figure 15B:
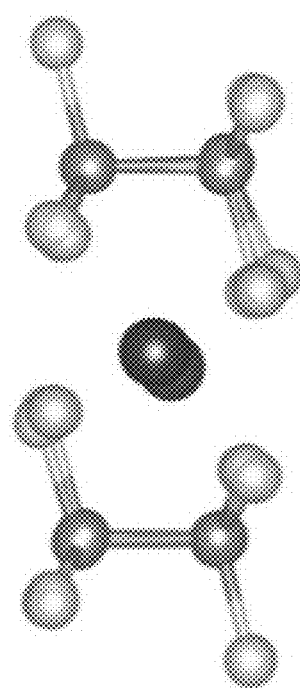
Figure 15C:
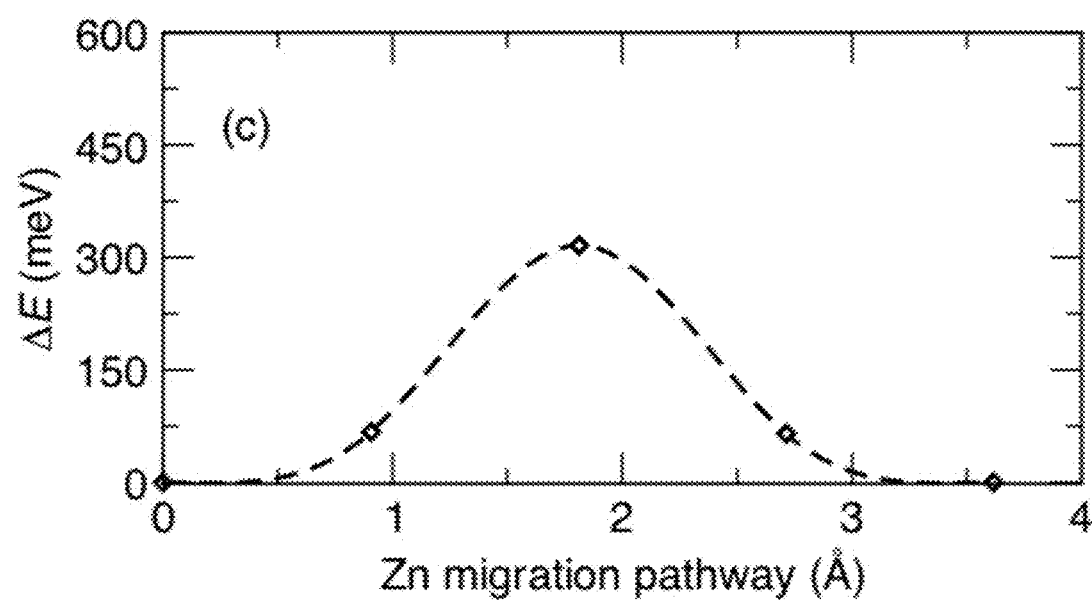

The energy barriers incurred upon migration between the interlayer interstitial sites were evaluated with NEB. Because of the connectivity of the interstitial sites, two pathways define the migration between the three sites. The energy barrier associated with both pathways is defined by a similar transition state encountered upon the diffusion of Zn from a tetrahedral interstitial. The energy barrier is approx. 1 eV in both cases, much larger than the experimentally measured activation energy of 351±99 meV. Due to the high barrier, it is unlikely that interlayer diffusion is the mechanism for Zn conduction. Further discussion surrounding the interlayer migration pathways and the associated energy barriers can be found in FIGS. 11 and 12.

Figures 5A, 5B, 5C, 5D:
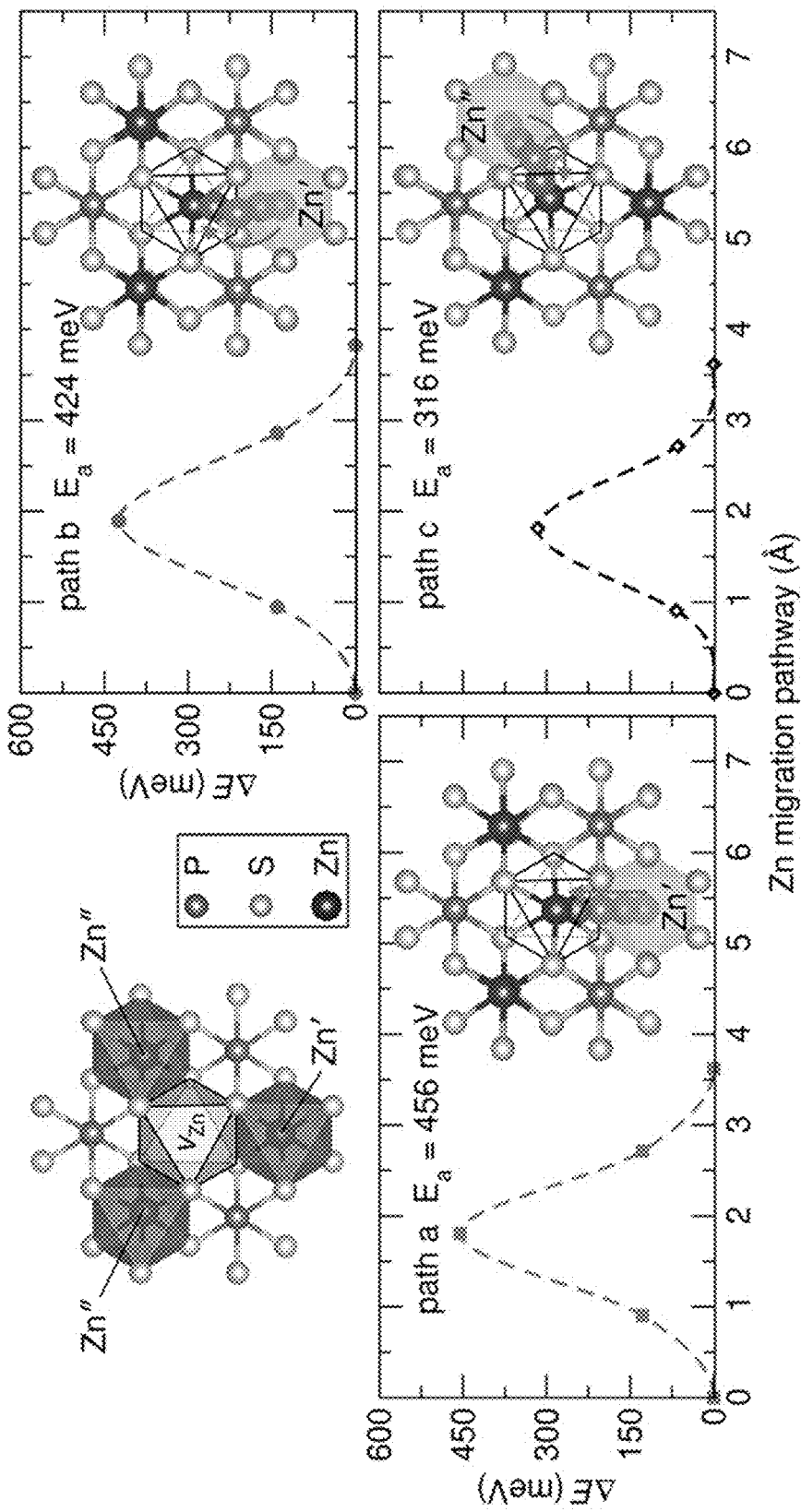
FIGS. 5A-5D. Free energy at 0 K calculated by NEB associated with three possible $Zn^{2+}$ migration paths assuming a vacancy-hopping mechanism within the metal layer.
Figure 6A:
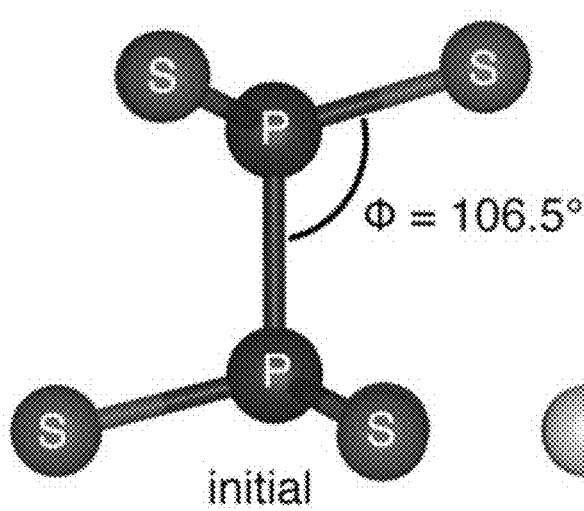
FIGS. 6A-6D. Most significant structural distortion predicted by the NEB calculations along the diffusion path of $Zn^{2+}$ is an increase in the P—P—S bond angle in the $[P_2S_6]^{4-}$ polyanion.
Figure 6B:
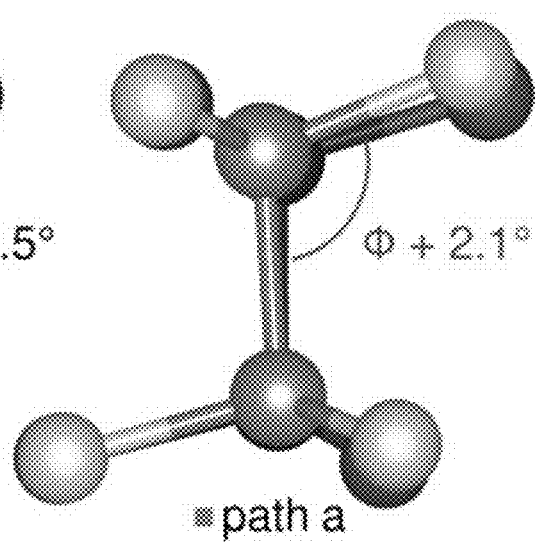
Figure 6C:
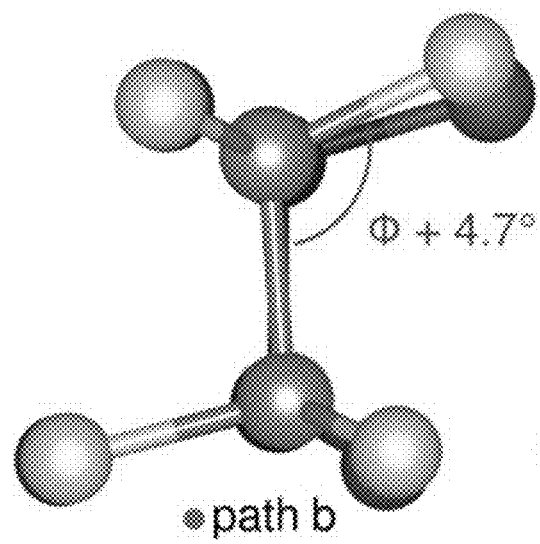
Figure 6D:
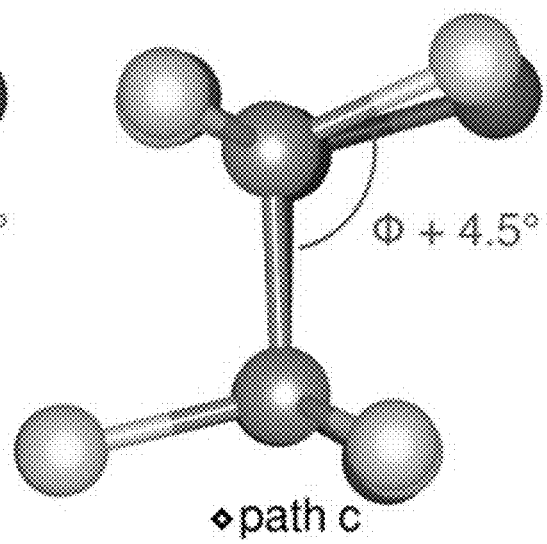

Next, we study Zn diffusion within the layer via vacancy hopping. The structure is first relaxed with the inclusion of a charge neutral Zn vacancy ($V_{Zn}$) to obtain the initial structural parameters, and the result is shown in FIG. 5A. The monoclinic structure of the material results in a distortion of the hexagonal Zn sublattice, resulting in two unique Zn sites nearest to the vacancy. Two neighboring Zn sites are distorted more significantly toward the vacancy (labeled Zn" in FIGS. 5A-5D), whereas the third Zn site remains less distorted (labeled Zn' in FIGS. 5A-5D). The coordination of Zn" is slightly off-centered in the octahedron toward the vacancy, resulting in two longer Zn—S contacts (2.70 and 2.73 Å), compared to the longest Zn—S contact of 2.62 Å at the Zn' site.

With the initial structure in hand, we can now predict possible Zn diffusion pathways and calculate the associated energy barriers with NEB. The calculated energy barriers along with the associated diffusion paths are shown in FIGS. 5B-5D. All intralayer diffusion pathways involve Zn diffusion to a neighboring edge-shared octahedron including (1) diffusion directly through the edge (path a) and/or (2) diffusion through the faces of the octahedra (path b and path c). FIG. 5B shows the diffusion pathway for Zn' traversing directly through the edge. The coordination of Zn in the transition state of the path (at the edge) is an extremely distorted octahedron with two short (2.255 Å) and four long (2.956 Å) Zn—S contacts and significant bond angle distortion ranging from 68 to 112°. The bond lengths and bond angles are tabulated in Table 2. The energy of the transition state in path a is 456 meV. The direct pathway was also calculated for Zn" but it relaxed to a path through the faces of the octahedra (vide infra).

TABLE 2

Structural Parameters of the Different Transition States of $ZnPS_3$ Calculated Using NEB

| | bond lengths and angles at the transition state | | | |
|---|---|---|---|---|
| | initial | path a | path b | path c |
| Zn—S (Å) | 2.541 (2x) | 2.255 (2x) | 2.246 | 2.262 |
| | 2.565 (2x) | 2.956 (4x) | 2.279 | 2.292 |
| | 2.579 (2x) | | 2.631 | 2.624 |
| | | | 2.639 | 2.659 |
| P—S (Å) | 2.005 | 2.034 | 2.032 | 2.033 |
| P—P (Å) | 2.216 | 2.229 | 2.227 | 2.225 |
| ∠SPP | 106.5 | 108.6 | 111.2 | 111 |
| Ea (meV) | | 456 | 424 | 316 |

Figures 16A, 16B, 16C, 16D, 16E:
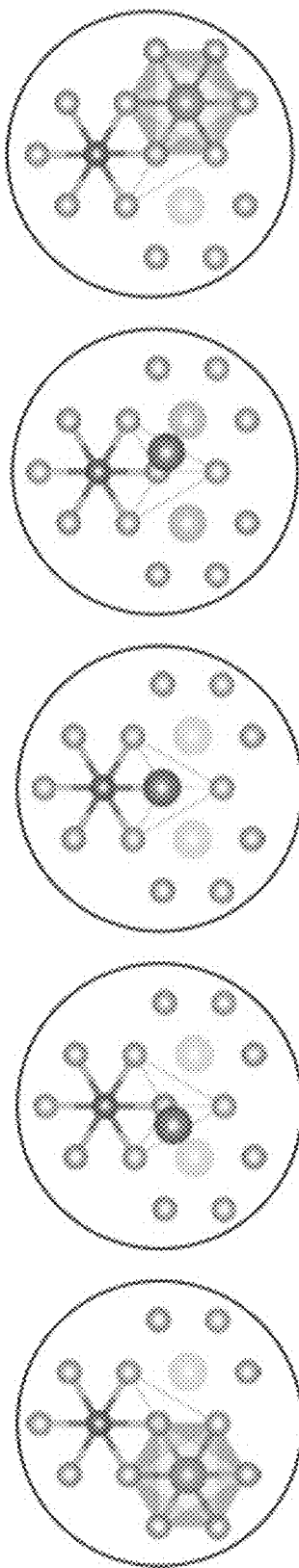
FIGS. 16A-16E. Schematic diagram of the transition states between edge sharing octahedra. The atom begins in an octahedral site adjacent to a vacancy (FIG. 16A). The atom traverses the octahedral face (FIG. 16B) before entering a tetrahedral intermediate site (FIG. 16C). To fill the vacancy, the atom moves through another three-coordinate octahedral face (FIG. 16D) and then fills the vacancy (FIG. 16E).

Next, we examine diffusion through the faces of the edge-sharing octahedra. Movement of an ion between two edge-sharing octahedra is suggested to occur through the faces in the case of Li$^+$ conductors,[52] Na$^+$ intercalation cathodes,[53] and Mg$^{2+}$ intercalation cathodes.[54] In the ZnPS$_3$ structure, a simple approximation of the aforementioned pathway would result in three intermediate coordination geometries shown pictorially in FIG. 16: (1) three coordinate Zn (squeezing through the face), (2) four coordinate Zn (between both faces), and (3) a final three coordinate Zn (squeezing through the face of the adjacent octahedron). The energy barriers associated with diffusion through the face of the octahedra were calculated by NEB for both Zn' and Zn", path b and path c, respectively, and are shown in FIGS. 5C-5D. The coordination geometries of Zn in the transition states are extremely distorted tetrahedra. In path b, the coordination around the Zn at the transition state is made up of two short Zn—S bonds (2.246, 2.279 Å) and two long Zn—S bonds (2.631, 2.639 Å). The coordination around the Zn at the transition state in path c is similar to slightly longer Zn—S contacts (2.262, 2.292, 2.624, and 2.659 Å). The structural parameters of the three transition states are summarized in Table 2. For reference, the Zn—S contacts in sphalerite and wurtzite ZnS are approx. 2.34 Å (tetrahedral) and are 2.5-2.6 Å in ZnPS$_3$ (octahedral). The bond angles in the distorted tetrahedral transition state range from 77 to 160° in path b and 76 to 162° in path c. The energy of the transition state is 424 and 316 meV above the ground state for path b (Zn') and path c (Zn"), respectively. The diffusion of Zn" results in a lower energy barrier compared to that of Zn'. The energy barrier is lower for Zn", likely because the S—S distance at the shared octahedral edge is larger compared to that for Zn' (3.95 Å for Zn↑ compared to 3.88 Å for Zn').

Bulk Zn$^{2+}$ diffusion in polycrystalline ZnPS$_3$ involves all possible pathways but is dominated by the lowest energy pathway, as statistical thermodynamics suggests that pathways with lower energy barriers are more easily overcome compared to those with higher barriers. Within a single grain, we thus expect Zn$^{2+}$ to diffuse predominately along path c, with a barrier of 316 meV. Indeed, the calculated barrier of 316 meV compares well with the experimentally measured value of 351±99 meV. Furthermore, for single crystalline ZnPS$_3$, we would expect the measured activation energy to be direction-dependent since path c only allows for diffusion along the x-direction in FIGS. 5A-5D.

Both the calculated and measured energy barriers associated with Zn$^{2+}$ diffusion are very low for divalent ion diffusion. To understand why the ZnPS$_3$ structure supports such a low activation energy, we evaluated the structural distortions associated with the three pathways of Zn$^{2+}$ diffusion via vacancy hopping within the layer. Although the coordination around the Zn atom changes significantly along the pathway as discussed above, changes to the coordination of the nearest neighboring Zn$^{2+}$ and [P$_2$S$_6$]$^{4-}$ polyanions are relatively small. The P—P bond, which one may intuitively expect to stretch as the Zn$^{2+}$ moves within the layer, only increases by approx. 0.02 Å. Additionally, the P—S bonds lengthen by approx. 0.02 Å as the Zn$^{2+}$ moves into the transition state directly between two adjacent polyanions. The S—P—P bond angle, however, clearly increases from 106.5 to 108-111° when Zn$^{2+}$ is in the transition state in the various pathways. The relative changes to the [P$_2$S$_6$]$^{4-}$ polyanion from the static structure to the transition state (highest energy state) for all three paths are shown in FIGS. 6A-6D. The bond angle distortion is enabled by the covalent nature of the polyanion within the layer and lack of charge density in the neighboring van der Waals gap, easily accommodating the impingement of S. Interestingly, the displacement of S into the interlayer space concomitant with Zn motion is reflected in the low-frequency Raman mode shown in FIG. 3B. The relationship between ionic mobility and phonons was recently studied with respect to lattice dynamics and phonons in Li$_3$XQ$_4$ (X=P, Ge, Sn; Q=O, S), indicating clear correlations between Li vibrational energies and ionic mobility.

Conclusions: ZnPS$_3$ was prepared through traditional solid-state means and structurally and spectroscopically characterized to evaluate its properties as a solid-state divalent cation conductor. The activation energy of Zn$^{2+}$ conduction in the bulk is very low for a divalent cation, 351±99 meV, which is on par with various garnet-based Li$^+$ ion conductors[51] and significantly lower than the reported Zn$^{2+}$ conductors measured at >500° C.[30] First-principles calculations indicate that the ionic conductivity of the Zn$^{2+}$ occurs via a vacancy-hopping mechanism mediated by the flexibility of the [P$_2$S$_6$]$^{4-}$ polyanion. The [P$_2$S$_6$]$^{4-}$ distorts into the interlayer van der Waals gap without hindrance from the adjacent layer to accommodate transition states during Zn$^{2+}$ diffusion. The apparent need for structural flexibility may provide a functional design principle on which to base future solid-state divalent cation conductors for batteries based on metals beyond Li$^+$, such as Mg$^{2+}$ and Zn$^{2+}$. Future work will focus on the chemically tunable nature of this family of materials to enhance the ionic conduction properties, considering both the anion polarizability and local and defect structure surrounding the mobile cation.

Materials and Methods:

Material Preparation. Synthesis. ZnPS$_3$ was prepared using traditional solid-state methods from Zn metal powder (Alfa Aesar, 99.9%), P$_2$S$_5$ (Acros Organics, >98%), and elemental sulfur (Acros Organics, >99.5%) in an Ar-filled glovebox without further purification. The Zn, P$_2$S$_5$, and S$_8$ were combined in a 2:1:1 molar ratio and ground thoroughly using a mortar and pestle. The reactants were then densified into pellets and sealed in a vitreous silica ampoule under vacuum (<10 mtorr). The reaction vessel was then placed in a box furnace, heated to 400° C. at a rate of 2° C. min$^{-1}$, and allowed to react at 400° C. for 24 h, at which point the furnace was allowed to cool to ambient temperature and yield an off-white product. All further manipulations of the material were executed under an inert Ar atmosphere to prevent hydrolysis of the ZnPS$_3$ over time.

Material Characterization. Powder X-ray Diffraction. ZnPS$_3$ was sealed in a glass capillary (Hampton Research, 0.7 mm o.d.) to prevent hydrolysis upon exposure to the atmosphere. The silica capillary was placed in a polyimide capillary to collect high-resolution synchrotron powder X-ray diffraction data. The diffraction data were collected on beam line 11-BM-B ($\lambda$=0.4126820 Å) of the Advanced Photon Source at Argonne National Lab.[36] The data were quantitatively fit with the Rietveld method using EXPGUI/GSAS.[56,57] The crystal structure was visualized using Vesta.[58] Temperature-dependent PXRD was collected using a PANalytical X'Pert Pro diffractometer outfitted with an Anton Parr high-temperature stage under a flowing N$_2$ gas.

Solid-State Magic Angle Spinning Nuclear Magnetic Resonance Spectroscopy. $^{31}$P MAS ssNMR spectra were acquired using a Bruker DSX-500 spectrometer at 202.4 MHz in a 4 mm ZrO rotor. The spectra were referenced to an external 85% H$_3$PO$_4$ standard at 0 ppm. A spinning speed of 8 kHz was used, and the spectra were gathered after applying a 1.6 µs to 90° pulse. T$_1$ was measured with an inversion recovery experiment. The sample was spun at 8 kHz, and the contact time was varied from 1 to 2000 s. ln(1−I/I$_0$) was plotted against contact time, and the data were fit with a least-square regression line, where the slope equals 1/T$_1$.

Raman Spectroscopy. Raman spectroscopy was measured using a Horiba Instruments XplorRA PLUS Raman Spectrometer equipped with 532 nm laser. The sample was mounted on a glass microscope slide and covered with a polyimide tape; the spectra were obtained through the glass slide. The signal was averaged over 200 acquisitions lasting 1 s each with a 50 µm slit and 500 µm hole. The power of the laser was kept between 1 and 10% to prevent local heating and sample degradation. Temperature-dependent Raman spectroscopy was measured using a copper-heating mantle on an IKA hot plate with an integrated thermocouple. The sample was sealed in a tube during the measurements to prevent reactions with air and water.

Electrochemical Impedance Spectroscopy. EIS measurements were collected using a Bio-Logic VMP3 multichannel potentiostat. Symmetric cells were assembled in 0.25" i.d. stainless steel Swagelok cells in an Ar-filled glovebox. The stainless steel plungers and nonblocking Zn electrodes were insulated from the barrel of the cell using a 0.005"-thick polyimide film and nylon ferrules. Zn electrodes were polished with 9, 3, and 1 µm diamond suspensions. Approximately 20 mg of $ZnPS_3$ was added directly to the Swagelok cell on top of the Zn electrode. The second Zn electrode was then carefully positioned in the cell. The cell was then sealed with the other stainless steel plunger and nut. The assembled symmetric cells were sintered under 9 kN of force as measured by an in-line load cell at 120° C. for 24 h in a convection oven. The force applied to the cells was then decreased to 2 kN, and EIS was measured at different temperatures in a convection oven, allowing the measured signal to equilibrate at each temperature. The EIS spectra were collected using a sinusoidal voltage amplitude of 50 mV in a frequency range of 1 MHz to 100 mHz and averaged over 20 measurements. The data were fit to an equivalent circuit using ZFit in the EC-Lab software.

Theoretical Methods. Lattice Vibrations and Raman Calculations. We carried out density functional theory (DFT) calculations using Quantum ESPRESSO (QE) code.[59] We used the local density approximation (LDA),[60] together with norm-conserving pseudopotentials generated from the ONCVPSP code.[61] A plane-wave basis with a kinetic energy cutoff of 80 Ry and a 6×6×6 Monkhorst-Pack k-point grid are employed. The structure of the primitive cell, including its lattice parameters and atomic positions, is relaxed until the force on each atom is less than 10 meV $A^{-1}$. The detailed values of the experimental and computed lattice constants are as follows: $a_{exp}$=5.97065 Å, $a_{calc}$=5.84453 Å; $b_{exp}$=10.34012 Å, $b_{calc}$=10.13356 Å; $c_{exp}$=6.75508 Å, $c_{calc}$=6.57075 Å; $\beta_{exp}$=107.12 Å, $\beta_{calc}$=105.42.

The Raman frequencies of the vibration modes at the r point are computed from density functional perturbation theory[62] using a 3×3×3 k-point grid. Nonresonant Raman cross sections are computed from Raman tensors, which are obtained from the second derivative of the electronic density with respect to a uniform electric field.[63] Both the Raman frequencies and tensors are computed using the QE PHonon package.[59] Compared to the experimental data, the computed Raman frequencies are underestimated due to the fact that we use the LDA together with relaxed (as opposed to experimental) lattice parameters. For the visualization, all of the ab initio Raman frequencies are scaled by 4.2%, a scaling factor determined by matching the computed and experimental frequencies of the strongest peak observed in the experimental spectrum (389 $cm^{-1}$). The Raman modes are visualized using Jmol.[64]

Nudged Elastic Band Calculations. The migration barrier is calculated using the climbing-image NEB method,[65,66] as implemented based on the VASP code.[67,68] Total forces are converged to within 5 meV $Å^{-1}$ in the climbing-image NEB calculations. The total forces for the end images are equivalent to Hellman-Feynman forces. The total forces for intermediate images are a combination of projected Hellman-Feynman forces and string forces. The total forces for the image of highest energy correspond to Hellman-Feynman forces with the component along the tangent inverted.[65] Kohn-Sham states are expanded into a plane-wave basis with a cutoff of 600 eV, and the generalized gradient approximation by Perdew, Burke, and Ernzerhof is used to describe exchange and correlation, with dispersion correction by Grimme et al.[69,70] The Brillouin zone is sampled with a uniform 4×4×4 Monkhorst-Pack mesh, and the electron-ion interaction is described by the projector-augmented wave technique.[71] For the 80 atom cell used here, no further relaxation is observed for larger plane-wave cutoff energy or denser k-point mesh. The number of images is chosen to ensure convergence of the climbing-image NEB calculation. Zn diffusing within the metal layer is subject to a simpler potential energy surface, and, therefore, a smaller number of images are sufficient. All simulations for the defect system are performed for a neutral cell.

REFERENCES CORRESPONDING TO EXAMPLE 1

(1) Muldoon, J.; Bucur, C. B.; Gregory, T. Quest for Nonaqueous Multivalent Secondary Batteries: Magnesium and Beyond. Chem. Rev. 2014, 114, 11683-11720.

(2) Canepa, P.; Sai Gautam, G.; Hannah, D. C.; Malik, R.; Liu, M.; Gallagher, K. G.; Persson, K. A.; Ceder, G. Odyssey of Multivalent Cathode Materials: Open Questions and Future Challenges. Chem. Rev. 2017, 117, 4287-4341.

(3) Aurbach, D.; Lu, Z.; Schechter, A.; Gofer, Y.; Gizbar, H.; Turgeman, R.; Cohen, Y.; Moshkovich, M.; Levi, E. Prototype systems for rechargeable magnesium batteries. Nature 2000, 407, 724-727.

(4) Wang, D.; Gao, X.; Chen, Y.; Jin, L.; Kuss, C.; Bruce, P. G. Plating and stripping calcium in an organic electrolyte. Nat. Mater. 2018, 17, 16.

(5) Han, S.-D.; Rajput, N. N.; Qu, X.; Pan, B.; He, M.; Ferrandon, M. S.; Liao, C.; Persson, K. A.; Burrell, A. K. Origin of Electrochemical, Structural, and Transport Properties in Nonaqueous Zinc Electrolytes. ACS Appl. Mater. Interfaces 2016, 8, 3021-3031.

(6) Ren, Y.; Shen, Y.; Lin, Y.; Nan, C.-W. Direct observation of lithium dendrites inside garnet-type lithium-ion solid electrolyte. Electrochem. Commun. 2015, 57, 27-30.

(7) Buannic, L.; Orayech, B.; LopezDelAmo, J.-M.; Carrasco, J.; Katcho, N. A.; Aguesse, F.; Manalastas, W.; Zhang, W.; Kilner, J.; Llordeş, A. Dual substitution strategy to enhance $Li^+$ ionic conductivity in $Li_7La_3Zr_2O_{12}$ solid electrolyte. Chem. Mater. 2017, 29, 1769-1778.

(8) Krauskopf, T.; Culver, S. P.; Zeier, W. G. Bottleneck of Diffusion and Inductive Effects in $Li_{10}Ge_{1-x}Sn_xP_2S_{12}$. Chem. Mater. 2018, 30, 1791-1798.

(9) Culver, S. P.; Koerver, R.; Krauskopf, T.; Zeier, W. G. Designing ionic conductors: the interplay between structural phenomena and interfaces in thiophosphate-based solid-state batteries. Chem. Mater. 2018, 30, 4179-4192.

(10) Shannon, R. D.; Prewitt, C. T. Effective ionic radii in oxides and fluorides. Acta Crystallogr., Sect. B: Struct. Crystallogr. Cryst. Chem. 1969, 25, 925-946.

(11) Shannon, R. D. Revised effective ionic radii and systematic studies of interatomic distances in halides and chalcogenides. Acta Crystallogr., Sect. A: Cryst. Phys., Diffr., Theor. Gen. Crystallogr. 1976, 32, 751-767.

(12) Rong, Z.; Malik, R.; Canepa, P.; Sai Gautam, G.; Liu, M.; Jain, A.; Persson, K.; Ceder, G. Materials design rules for multivalent ion mobility in intercalation structures. Chem. Mater. 2015, 27, 6016-6021.

(13) Sai Gautam, G.; Canepa, P.; Urban, A.; Bo, S.-H.; Ceder, G. Influence of inversion on Mg mobility and electrochemistry in spinels. Chem. Mater. 2017, 29, 7918-7930.

(14) Sun, X.; Bonnick, P.; Duffort, V.; Liu, M.; Rong, Z.; Persson, K. A.; Ceder, G.; Nazar, L. F. A high capacity thiospinel cathode for Mg batteries. Energy Environ. Sci. 2016, 9, 2273-2277.

(15) Bonnick, P.; Blanc, L.; Vajargah, S. H.; Lee, C.-W.; Sun, X.; Balasubramanian, M.; Nazar, L. F. Insights into $Mg^{2+}$ Intercalation in a Zero-Strain Material: Thiospinel $Mg_xZr_2S_4$. Chem. Mater. 2018, 30, 4683-4693.

(16) Canepa, P.; Bo, S.-H.; Gautam, G. S.; Key, B.; Richards, W. D.; Shi, T.; Tian, Y.; Wang, Y.; Li, J.; Ceder, G. High magnesium mobility in ternary spinel chalcogenides. Nat. Commun. 2017, 8, No. 1759.

(17) Higashi, S.; Miwa, K.; Aoki, M.; Takechi, K. A novel inorganic solid state ion conductor for rechargeable Mg batteries. Chem. Commun. 2014, 50, 1320-1322.

(18) Roedern, E.; KUhnel, R.-S.; Remhof, A.; Battaglia, C. Magnesium Ethylenediamine Borohydride as Solid-State Electrolyte for Magnesium Batteries. Sci. Rep. 2017, 7, No. 46189.

(19) Li, Y.; Dai, H. Recent advances in zinc-air batteries. Chem. Soc. Rev. 2014, 43, 5257-5275.

(20) Brodd, R. J. Recent developments in batteries for portable consumer electronics applications. Interface. 1999, 8, 20-23.

(21) Lee, J.-S.; Tai Kim, S.; Cao, R.; Choi, N.-S.; Liu, M.; Lee, K. T.; Cho, J. Metal-air batteries with high energy density: Li-air versus Zn-air. Adv. Energy Mater. 2011, 1, 34-50.

(22) Donne, S. W.; Lawrance, G. A.; Swinkels, D. A. Redox Processes at the Manganese Dioxide Electrode II. Slow-Scan Cyclic Voltammetry. J. Electrochem. Soc. 1997, 144, 2954-2961.

(23) Lim, H.; Lackner, A.; Knechtli, R. Zinc-bromine secondary battery. J. Electrochem. Soc. 1977, 124, 1154-1157.

(24) Xu, C.; Li, B.; Du, H.; Kang, F. Energetic Zinc Ion Chemistry: the Rechargeable Zinc Ion Battery. Angew. Chem. 2012, 124, 957-959.

(25) Han, S.-D.; et al. Mechanism of Zn insertion into nano-structured δ-$MnO_2$: a nonaqueous rechargeable Zn metal battery. Chem. Mater. 2017, 29, 4874-4884.

(26) Pan, C.; Nuzzo, R. G.; Gewirth, A. A. $ZnAl_xCo_{2-x}O_4$ Spinels as Cathode Materials for Non-Aqueous Zn Batteries with an Open Circuit Voltage of ≤2 V. Chem. Mater. 2017, 29, 9351-9359.

(27) Pan, C.; Zhang, R.; Nuzzo, R. G.; Gewirth, A. A. $ZnNi_xMn_xCo_{2-2x}O_4$ Spinel as a High-Voltage and High-Capacity Cathode Material for Nonaqueous Zn-Ion Batteries. Adv. Energy Mater. 2018, 8, No. 1800589.

(28) Farrington, G.; Dunn, B. Divalent Beta"-Aluminas: High Conductivity Solid Electrolytes for Divalent Cations. Solid State Ionics 1982, 7, 267-281.

(29) Rohrer, G.; Farrington, G. Electrical conductivity in Pb (II)- and Na (I)-Pb (II)-β"-alumina. J. Solid State Chem. 1990, 85, 299-314.

(30) Ikeda, S.; Kanbayashi, Y.; Nomura, K.; Kasai, A.; Ito, K. Solid electrolytes with multivalent cation conduction (2) zinc ion conduction in Zn—Zr—$PO_4$ system. Solid State Ionics 1990, 40-41, 79-82.

(31) Klingen, W.; Eulenberger, G.; Hahn, H. Über Hexachalkogeno-hypodiphosphate vom Typ $M_2P2X_6$. Naturwissenschaften 1970, 57, 88.

(32) Boucher, F.; Evain, M.; Brec, R. Second-order Jahn-Teller effect in $CdPS_3$ and $ZnPS_3$ demonstrated by a non-harmonic behaviour of $Cd^{2+}$ and $Zn^{2+}$ $d^{10}$ ions. J. Alloy Compd. 1994, 215, 63-70.

(33) Mathey, Y.; Clement, R.; Sourisseau, C.; Lucazeau, G. Vibrational study of layered $MPX_3$ compounds and of some intercalates with $Co(\eta^5-C_5H_5)_2^+$ or $Cr(\eta^6-C_6H_6)_2^+$. Inorg. Chem. 1980, 19, 2773-2779.

(34) Sourisseau, C.; Forgerit, J.; Mathey, Y. Vibrational study of layered $ZnPS_3$ compounds intercalated with [Co $(\eta^5-(C_5H_5)_2)^+$] and [Cr $(\eta^6-(C_6H_6)_2)^+$] Cations. J. Phys. Chem. Solids 1983, 44, 119-124.

(35) Brec, R. Review on Structural and Chemical Properties of Transition Metal Phosphorous Trisulfides $MPS_3$. Solid State Ionics 1986, 22, 3-30.

(36) Wang, J.; Toby, B. H.; Lee, P. L.; Ribaud, L.; Antao, S. M.; Kurtz, C.; Ramanathan, M.; Von Dreele, R. B.; Beno, M. A. A dedicated powder diffraction beamline at the Advanced Photon Source: Commissioning and early operational results. Rev. Sci. Instrum. 2008, 79, No. 085105.

(37) Prouzet, E.; Ouvrard, G.; Brec, R. Structure determination of $ZnPS_3$. Mater. Res. Bull. 1986, 21, 195-200.

(38) Zhang, Z.; Kennedy, J. H.; Eckert, H. Glass formation and structure in non-oxide chalcogenide systems. The short range order of silver sulfide ($Ag_2S$)-phosphorus sulfide ($P_2S_5$) glasses studied by phosphorus-31 MAS-NMR and dipolar NMR techniques. J. Am. Chem. Soc. 1992, 114, 5775-5784.

(39) Dietrich, C.; Sadowski, M.; Sicolo, S.; Weber, D. A.; Sedlmaier, S. J.; Weldert, K. S.; Indris, S.; Albe, K.; Janek, J.; Zeier, W. G. Local Structural Investigations, Defect Formation, and Ionic Conductivity of the Lithium Ionic Conductor $Li_4P_2S_6$. Chem. Mater. 2016, 28, 8764-8773.

(40) Bourdon, X.; Grimmer, A.-R.; Cajipe, V. $^{31}P$ MAS NMR Study of the Ferrielectric-Paraelectric Transition in Layered $CuInP_2S_6$. Chem. Mater. 1999, 11, 2680-2686.

(41) Eckert, H.; Liang, C. S.; Stucky, G. D. Phosphorus-31 magic angle spinning NMR of crystalline phosphorus sulfides: correlation of phosphorus-31 chemical shielding tensors with local environments. J. Phys. Chem. 1989, 93, 452-457.

(42) Adolphi, N. L.; Stoddard, R. D.; Goel, S. C.; Buhro, W. E.; Gibbons, P. C.; Conradi, M. S. The $^{31}P$ NMR spectra of $Cd_3P_2$ and $Zn_3P_2$. J. Phys. Chem. Solids 1992, 53, 1275-1278.

(43) Lock, H.; Xiong, J.; Wen, Y.-C.; Parkinson, B. A.; Maciel, G. E. Solid-state $^{29}Si$, $^{113}Cd$, $^{119}Sn$, and $^{31}P$ NMR Studies of II-IV-$P_2$ Semiconductors. Solid State Nucl. Magn. Reson. 2001, 20, 118-129.

(44) Wahl, R.; Vogtenhuber, D.; Kresse, G. $SrTiO_3$ and $BaTiO_3$ revisited using the projector augmented wave method: Performance of hybrid and semilocal functionals. Phys. Rev. B 2008, 78, No. 104116.

(45) Haines, C. R. S.; Coak, M. J.; Wildes, A. R.; Lampronti, G. I.; Liu, C.; Nahai-Williamson, P.; Hamidov, H.; Daisenberger, D.; Saxena, S. S. Pressure-Induced Electronic and Structural Phase Evolution in the van der Waals Compound $FePS_3$. Phys. Rev. Lett. 2018, 121, No. 266801.

(46) Irvine, J. T.; Sinclair, D. C.; West, A. R. Electroceramics: characterization by impedance spectroscopy. Adv. Mater. 1990, 2, 132-138.

(47) Hodge, I.; Ingram, M.; West, A. Impedance and modulus spectroscopy of polycrystalline solid electrolytes. J. Electroanal. Chem. Interfacial Electrochem. 1976, 74, 125-143.

(48) Yelon, A.; Movaghar, B. Microscopic explanation of the compensation (Meyer-Neldel) rule. Phys. Rev. Lett. 1990, 65, 618.

(49) Ichimura, K.; Sano, M. Electrical conductivity of layered transition-metal phosphorus trisulfide crystals. Synth. Met. 1991, 45, 203-211.

(50) El Shinawi, H.; Janek, J. Stabilization of cubic lithium-stuffed garnets of the type "$Li_7La_3Zr_2O_{12}$" by addition of gallium. J. Power Sources 2013, 225, 13-19.

(51) Wu, J.-F.; Chen, E.-Y.; Yu, Y.; Liu, L.; Wu, Y.; Pang, W. K.; Peterson, V. K.; Guo, X. Gallium-Doped $Li_7La_3Zr_2O_{12}$ Garnet-Type Electrolytes with High Lithium-Ion Conductivity. ACS Appl. Mater. Interfaces 2017, 9, 1542-1552.

(52) Cussen, E. J. The structure of lithium garnets: cation disorder and clustering in a new family of fast $Li^+$ conductors. Chem. Commun. 2006, 412-413.

(53) VinckeviūuMte, J; Radin, M. D.; VanDerVen, A. Stacking Sequence Changes and Na Ordering in Layered Intercalation Materials. Chem. Mater. 2016, 28, 8640-8650.

(54) Gautam, G. S.; Sun, X.; Duffort, V.; Nazar, L. F.; Ceder, G. Impacts of intermediate sites on bulk diffusion barriers: Mg intercalation in $Mg_2Mo_3O_8$. J. Mater. Chem. A 2016, 4, 17643-17648.

(55) Muy, S.; Bachman, J. C.; Giordano, L.; Chang, H.-H.; Abernathy, D. L.; Bansal, D.; Delaire, O.; Hori, S.; Kanno, R.; Maglia, F.; Lupart, S.; Lamp, P.; Shao-Horn, Y. Tuning mobility and stability of lithium ion conductors based on lattice dynamics. Energy Environ. Sci. 2018, 11, 850-859.

(56) Toby, B. H. EXPGUI, a graphical user interface for GSAS. J. Appl. Crystallogr. 2001, 34, 210-213.

(57) Larson, A.; Von Dreele, R. General Structure Analysis System (GSAS), Report LAUR 86-748; Los Alamos National Laboratory, 2000. https://11bm.xray.aps.anl.gov/documents/GSASManual.pdf (accessed Oct. 20, 2018).

(58) Momma, K.; Izumi, F. VESTA 3 for three-dimensional visualization of crystal, volumetric and morphology data. J. Appl. Crystallogr. 2011, 44, 1272-1276.

(59) Giannozzi, P.; et al. QUANTUM ESPRESSO: a modular and open-source software project for quantum simulations of materials. J. Phys.: Condens. Matter 2009, 21, No. 395502.

(60) Perdew, J. P.; Zunger, A. Self-interaction correction to density-functional approximations for many-electron systems. Phys. Rev. B 1981, 23, 5048-5079.

(61) Hamann, D. R. Optimized norm-conserving Vanderbilt pseudopotentials. Phys. Rev. B 2013, 88, No. 085117.

(62) Baroni, S.; de Gironcoli, S.; Dal Corso, A.; Giannozzi, P. Phonons and related crystal properties from density-functional perturbation theory. Rev. Mod. Phys. 2001, 73, 515-562.

(63) Lazzeri, M.; Mauri, F. First-Principles Calculation of Vibrational Raman Spectra in Large Systems: Signature of Small Rings in Crystalline $SiO_2$. Phys. Rev. Lett. 2003, 90, No. 036401.

(64) Jmol: An Open-Source Java Viewer for Chemical Structures in 3D. http://www.jmol.org/ (accessed Aug. 3, 2018).

(65) Henkelman, G.; Uberuaga, B. P.; Jońsson, H. Climbing image nudged elastic band method for finding saddle points and minimum energy paths. J. Chem. Phys. 2000, 113, 9901-9904.

(66) Henkelman, G.; Jońsson, H. Improved tangent estimate in the nudged elastic band method for finding minimum energy paths and saddle points. J. Chem. Phys. 2000, 113, 9978-9985.

(67) Kresse, G.; Joubert, D. From ultrasoft pseudopotentials to the projector augmented-wave method. Phys. Rev. B 1999, 59, 1758.

(68) Kresse, G.; Furthmüller, J. Efficient iterative schemes for ab initio total-energy calculations using a plane-wave basis set. Phys. Rev. B 1996, 54, No. 11169.

(69) Perdew, J. P.; Burke, K.; Ernzerhof, M. Generalized Gradient Approximation Made Simple. Phys. Rev. Lett. 1996, 77, 3865-3868.

(70) Grimme, S. Semiempirical GGA-type density functional constructed with a long-range dispersion correction. J. Comput. Chem. 2006, 27, 1787-1799.

(71) Blöchl, P. E. Projector augmented-wave method. Phys. Rev. B 1994, 50, No. 17953.

Supplemental Materials to Example 1:

Description of interlayer sites and migration pathways: To evaluate the possibility of $Zn^{2+}$ conduction within the van der Waals gap of $ZnPS_3$, we must first determine the stable interstitial sites from which the $Zn^{2+}$ diffuses. Four stable interstitial sites exist in the interlayer space, three of which are distorted tetrahedra. Such tetrahedral interstitials can occur in two unique configurations, each face sharing with an adjacent layer ($tet_1$ and $tet_2$). The third tetrahedral site ($tet_3$) shares edges with both layers and the Zn is more centered within the van der Waals gap. The final interlayer interstitial site is octahedral (oct), sharing edges with both the $P_2S_6$ polyanion and Zn octahedron within the layer. Of the four interstitial sites, $tet_1$ and $tet_2$ are the most energetically favorable with formation energies of 1.43 eV and 1.37 eV, respectively. $Tet_3$ and oct are higher in energy, with formation energies of 1.81 eV and 2.20 eV, respectively. The four interstitial coordination environments are shown in FIGS. 10A-10D.

The expected, simple pathway between $tet_1$ and $tet_2$ is indirect, such that $tet_3$ and oct lie along the migration pathway between them. Thus, four direct migration pathways exist between stable interstitial sites: $tet_1$-$tet_3$, $tet_1$-oct, $tet_2$-$tet_3$ and $tet_2$-oct. Because the coordination geometry of $tet_1$ and $tet_2$ are very similar and the formation energies are comparable, we only consider the $tet_2$-$tet_3$ and $tet_2$-oct direct pathways.

The energy barrier associated with both $tet_2$-$tet_3$ and $tet_2$-oct is defined by a similar transition state encountered upon diffusion of Zn from the $tet_2$ interstitial in images 1-4 in FIGS. 11A-11B and FIGS. 12A-12B. The images along the path leading to the transition state converge to structures similar to the initial guesses (the initial guesses are shown in orange in FIGS. 11A-11B and FIGS. 12A-12B). To obtain the initial guesses we used relaxed configurations from a more coarse NEB calculation between initial and transition state, and linear interpolation for images between transition and final state. The energy barrier is approx. 1 eV in both cases, much larger than the experimentally measured activation energy of 350 meV±99 meV. Due to the high barrier, it is unlikely that interlayer diffusion is mechanism for Zn conduction.

We note that the diffusion path becomes implausible after the transition state, with the converged structures relaxing far from the initial guess yielding meandering pathways across the complex inter-layer potential energy landscape. For example, along the path between $tet_2$ and oct, Zn diffuses away from the final images before it curves back to it (images 5-8 in FIGS. 11A-11B). We attribute this to the large structural changes in the surrounding P and S atoms as Zn diffuses, which complicates the energy landscape surrounding the interstitial Zn atom. Additionally, the large changes in the structure and motion of the Zn atom away from the initial image make the convergence of the NEB calculation difficult, requiring many intermediate images. For this, we converge the maximum force on atoms near the peak of the energy barrier, i.e. the transition state, to within 10 meV/Å. We allow forces of up to 50 meV/Å for images past the transition state, where the energy landscape is complicated. This is still accurate enough, but reduces the computational cost for these slowly converging configurations. These simulations were carried out using a uniform 2×2×2 Monkhorst-Pack mesh to sample the Brillouin zone, which is justified by the very small difference from results of 4×4×4 mesh for initial and end images (<1 meV/atom for total energy and <10-4 Å for maximum atomic displacement).

We also note that two different functionals had to be used for the Raman calculation and NEB calculations, LDA and PBE-D2, respectively. We employed the LDA functional for the Raman calculation because Quantum Espresso (QE) does not support Raman spectrum calculations using PBE-D2 functionals. Comparison of vibrational frequencies computed with both functionals yields comparable results, thus supporting the accuracy of the Raman calculation from the LDA functional.

TABLE 3

Summary of Selected Zn and Mg cation conductors

| material | mobile ion | Ea (meV) | Temperature range (K) | technique | Ref. |
|---|---|---|---|---|---|
| ZnPS3 | Zn2+ | 350 ± 99 | 333-363 | EIS | this work |
|  | Zn2+ | 316-456 |  | NEB | this work |
| ZnSc2S4 | Zn2+ | 789 |  | NEB | 1 |
| ZnY2S4 | Zn2+ | 901 |  | NEB | 1 |
| ZnIn2S4 | Zn2+ | 827 |  | NEB | 1 |
| ZnSc2Se4 | Zn2+ | 715 |  | NEB | 1 |
| ZnY2Se4 | Zn2+ | 791 |  | NEB | 1 |
| ZnIn2Se4 | Zn2+ | 714 |  | NEB | 1 |
| ZnZr4(PO4)6 | Zn2+ | 1389 | 773-1023 | EIS | 2 |
| ZnZr4(PO4)6 | Zn2+ | 933 | 1053-1273 | EIS | 2 |
| ZnZr(PO4)2 | Zn2+ | 1316-1482 | 773-1023 | EIS | 2 |
| Zn4Zr(PO4)4 | Zn2+ | 1316-1482 | 773-1023 | EIS | 2 |
| Zn5Zr2(PO4)6 | Zn2+ | 1316-1482 | 773-1023 | EIS | 2 |
| La0.55Li0.0037Zn0.15TiO2.98 | Li+? | 470 | 285-500 | EIS | 3 |
| MgSc2S4 | Mg2+ | 415 |  | NEB | 1 |
| MgY2S4 | Mg2+ | 360 |  | NEB | 1 |
| MgIn2S4 | Mg2+ | 488 |  | NEB | 1 |
|  | Mg2+ | 375 |  | NEB | 1 |
| MgSc2Se4 | Mg2+ | 380 | 600-1800 | AIMD | 1 |
|  | Mg2+ | 370 ± 90 | 250-475 | 25Mg NMR | 1 |
| MgY2Se4 | Mg2+ | 361 |  | NEB | 1 |
|  | Mg2+ | 326 | 600-1800 | AIMD | 1 |
| MgIn2Se4 | Mg2+ | 532 |  | NEB | 1 |
| MgSc2Te4 | Mg2+ | 414 |  | NEB | 1 |
| MgY2Te4 | Mg2+ | 379 |  | NEB | 1 |
| Mg(BH4)(NH2) | Mg2+ | 1310 | 385-425 | EIS | 4 |
| MgZr(PO4)2 | Mg2+ | 953 | 650-1400 | EIS | 5 |
| MgZr4(PO4)6 | Mg2+ | 872 | 550-1400 | EIS | 5 |
|  | Mg2+ | 1470 | 900-1500 | 31P NMR | 6 |
| MgZr7(PO4)10 | Mg2+ | 960 | 650-1400 | EIS | 5 |
| Mg2Zr5(PO4)8 | Mg2+ | 900 | 550-1400 | EIS | 5 |
| Mg4Zr(PO4)4 | Mg2+ | 1230 | 900-1400 | EIS | 5 |
| Mg5Zr2(PO4)6 | Mg2+ | 1090 | 650-1400 | EIS | 5 |
| Mg7Zr(PO4)6 | Mg2+ | 2005 | 1100-1400 | EIS | 5 |
| Mg0.7(Zr0.85Nb0.15)4P6O24 | Mg2+ | 950 | 800-1500 | 31P NMR | 6 |
| Mg1.4Zr4P6O24 + 0.4Zr2O(PO4)2 | Mg2+ | 1410 | 800-1500 | 31P NMR | 6 |
| Mg1.1(Zr0.85Nb0.15)4P6O24 + 0.4Zr2O(PO4)2 | Mg2+ | 1280 | 800-1500 | 31P NMR | 6 |
| La0.56Li0.02Mg0.16TiO3.01 | Li+ | 450 | 285-500 | EIS | 3 |
| La0.55Li0.35TiO3 | Li+ | 350 | 285-500 | EIS | 3 |
| Mg0.55Ti2S4 | Mg2+ | 850 | 333 | GAP | 7 |
| Li0.54Ti2S4 | Li+ | 270 | 333 | GAP | 7 |
| Ti2S4 | Mg2+ | 615 |  | NEB | 8 |
| Ti2S4 | Zn2+ | 900 |  | NEB | 8 |
| Mn2S4 | Mg2+ | 515 |  | NEB | 8 |
| Mn2S4 | Zn2+ | 800 |  | NEB | 8 |

TABLE 4

Comparison of calculated values from PBE and
PBE-D2 functionals with experimental results

|  | PBE | PBE-D2 | experimental |
|---|---|---|---|
| a (Å) | 6.014 | 5.953 | 5.971 |
| b (Å) | 10.411 | 10.314 | 10.34 |
| c (Å) | 7.701 | 6.804 | 6.755 |
| Eg (meV) | 1.96 | 2.13 | — |
| Ea a (meV) |  | 456 |  |
| Ea b (meV) |  | 424 |  |
| Ea c (meV) |  | 316 |  |
| Ea measured (meV) |  |  | 350 ± 99 |

REFERENCES CORRESPONDING TO
EXAMPLE 1—SUPPLEMENTAL MATERIAL (1) Canepa, P.; Bo, S.-H.; Gautam, G. S.; Key, B.; Richards, W. D.; Shi, T.; Tian, Y.; Wang, Y.; Li, J.; Ceder, G. High magnesium mobility in ternary spinel chalcogenides. *Nat. Commun.* 2017, 8, 1759.

(2) Ikeda, S.; Kanbayashi, Y.; Nomura, K.; Kasai, A.; Ito, K. Solid electrolytes with multivalent cation conduction (2) zinc ion conduction in Zn—Zr—$PO_4$ system. *Solid State Ionics* 1990, 40, 79-82.

(3) Inaguma, Y.; Mashiko, W.; Watanabe, M.; Atsumi, Y.; Okuyama, N.; Katsumata, T.; Ohba, T. $M/Li^+$ ($M=Mg^{2+}$, $Zn^{2+}$, and $Mn^{2+}$) ion-exchange on lithium ion-conducting perovskite-type oxides and their properties. *Solid State Ionics* 2006, 177, 2705-2709.

(4) Higashi, S.; Miwa, K.; Aoki, M.; Takechi, K. A novel inorganic solid state ion conductor for rechargeable Mg batteries. *Chem. Commun.* 2014, 50, 1320-1322.

(5) Ikeda, S.; Takahashi, M.; Ishikawa, J.; Ito, K. Solid electrolytes with multivalent cation conduction. 1. Conducting species in Mg—Zr—$PO_4$ system. *Solid State Ionics* 1987, 23, 125-129.

(6) Kawamura, J.; Morota, K.; Kuwata, N.; Nakamura, Y.; Maekawa, H.; Hattori, T.; Imanaka, N.; Okazaki, Y.; Adachi, G.-y. High temperature $^{31}P$ NMR study on $Mg^{2+}$ ion conductors. *Solid State Commun.* 2001, 120, 295-298.

(7) Bonnick, P.; Sun, X.; Lau, K.-C.; Liao, C.; Nazar, L. F. Monovalent versus Divalent Cation Diffusion in Thiospinel $Ti_2S_4$. *J. Phys. Chem. Lett.* 2017, 8, 2253-2257.

(8) Liu, M.; Jain, A.; Rong, Z.; Qu, X.; Canepa, P.; Malik, R.; Ceder, G.; Persson, K. A. Evaluation of sulfur spinel compounds for multivalent battery cathode applications. *Energy Environ. Sci.* 2016, 9, 3201-3209.

Example 2: Design Principles for $ZnPS_3$ and
Substituted Materials

Experimental design rules for electronically insulating, divalent ion conductors do not exist yet. When attempting to study divalent ion conductivity in an electronic insulator, however, there is strong evidence from the divalent cathode literature that divalent ion conductivity in oxides is difficult due to the strong interaction between the $M^{2+}$ and the anion lattice. Most oxides either show irreversible capacity or convert to MgO rather than intercalate $Mg^{2+}$. We therefore began looking at sulfides. The most simple sulfide would be the binary sulfide, ZnS, for example, but it is unlikely with the close packed anion lattice in ZnS that $Zn^{2+}$ conductivity would be achieved. The conductivity of $Mg^{2+}$ in MgS, for example, is predicted by theory to be very difficult due to high energetic barriers to ion diffusion. We therefore turned to ternaries and found the $MPS_3$ family of materials. The electronic conductivity of $ZnPS_3$ was already reported and fit the requirement of an electronic insulator. Furthermore, both the structural flexibility of the $[P_2S_6]^{4-}$ and the native vacancies available due to the van der Waals gap were anticipated to be beneficial structural features. The van der Waals structure was thought to provide multiple possible ionic conduction pathways in the material, either within the metal-containing layer or through the van der Waals gap. Thiophosphates have exhibited high ionic conductivity for Li-containing materials, which is often attributed to the polarizable nature of the soft, sulfide anions. The chemically tunable nature of the $MPS_3$ family (as evidenced by the previous section) allows for a wide range of structurally related materials to be formed, with the goal of developing structure-property relationships for divalent ion conductors.

A concentration of native, entropic, or intrinsic vacancies of metal cations in the $MPS_3$ materials disclosed herein when M does not include metal cation(s) other than divalent metal cations (i.e., when M is only divalent metal cations) can, for example, be on the order of $10^{-20}$/mol (e.g., less than $10^{-19}$/mol and greater than $10^{-21}$/mol). In some embodiments, native, entropic, or intrinsic vacancy concentration can vary with the method of deposition of the materials disclosed herein as well as with the quality, such as degree of crystallinity, of said materials. In some embodiments, the concentration of native, intrinsic, or entropic vacancies (of metal cations) in the materials and electrolytes disclosed herein is optionally selected from the range of $10^{-16}$/mol to $10^{-25}$/mol, optionally selected from the range of $10^{-17}$/mol to $10^{-24}$/mol, optionally selected from the range of $10^{-18}$/mol to $10^{-23}$/mol, optionally selected from the range of $10^{-18}$/mol to $10^{-25}$/mol, optionally selected from the range of $10^{-18}$/mol to $10^{-22}$/mol, optionally selected from the range of $10^{-19}$/mol to $10^{-23}$/mol, optionally selected from the range of $10^{-18}$/mol to $10^{-22}$/mol, optionally selected from the range of $10^{-19}$/mol to $10^{-22}$/mol, and optionally selected from the range of $10^{-19}$/mol to $10^{-21}$/mol. Introduction of aliovalent (non-divalent) metal cation substituents at the M sites of the material's structure, such as, but not limited to, in the case of the material according to formula FX3, introduces additional divalent metal cation vacancies. For example, substituting $Zn^{2+}$ in $ZnPS_3$ with $Al^{3+}$ to a degree (e.g., forming $Zn_{1-1.5y}Al_yPS_3$, where y is between 0 and 0.67) both adds $Al^{3+}$ on some $Zn^{2+}$ sites but also introduces $Zn^{2+}$ vacancies, such as due to charge balancing the material. Similarly, other aliovalent substituents, including but not limited to tetravalent metal cations, can be used to tune (e.g., increase with respect to native entropic vacancy concentration) the vacancy concentration in the material.

In introducing vacancies into $ZnPS_3$, we aimed to increase the available number of vacancy sites to which we attribute ionic conduction via hopping. Increasing the number of vacancies can increase the bulk ionic conductivity of the material. In this example, we sought to introduce vacancies without introducing electronic carriers by using trivalent cations with closed shell electronic configurations, such as $Al^{3+}$, $Ga^{3+}$, and $In^{3+}$. While vacancies can increase the ionic conductivity, the $Zn^{2+}$ concentration in the material also needs to be relatively high so to not become carrier-limited at any interfaces or in the bulk. Thus, substituent concentrations were kept between 5% and 20%, corresponding to Zn concentrations ranging from 92.5% and 70%.

We have identified $ZnPS_3$ as an insulating, solid-state ion conductor. $ZnPS_3$ supports $Zn^{2+}$ ion diffusion with relatively low activation energies, such as between 300 meV and 500 meV. Solid-state ion conductors are useful for a host of technologies including batteries and fuel cells, to name a few. Insulating solid-state ion conductors are candidates for solid electrolytes that bypass the safety limitations imposed by conventional, flammable, liquid, organic electrolytes. A demonstration of an insulating divalent ion conductor at or slightly above room temperature has not yet been reported.

$ZnPS_3$ and related materials can support ion diffusion at room temperature.

We prepare a host of new materials of the form $Zn_{1-x}M_xPS_3$ and $Zn_{1-0.5x}M_xPS_3$ to enhance the conductivity and possibly lower the activation energy. Likewise, substituted and unsubstituted $MgPS_3$ is can be a $Mg^{2+}$ cation conductor.

Relevant literature on other reported divalent ion conductors:

Magnesium Borohydride Based Materials $Mg(BH_4)(NH_2)$: Magnesium borohydride amide exhibits $Mg^{2+}$ ionic conduction with a high activation barrier of 1.31 eV. [Higashi, et al, 2013, dx.doi.org/10.1039/C3CC47097K]

$Mg(en)_x(BH_4)_y$: Magnesium ethylene diamine borohydrides with varied anion stoichiometries are reported, with activation barriers of 0.9 eV-1.6 eV. [Roedern, et al, 2017, dx.doi.org/10.1038/srep46189]

Zirconium Phosphate Materials $MgZr_4(PO_4)_6$: Magnesium zirconium phosphate exhibits $Mg^{2+}$ ionic conduction at elevated temperature (300-1000° C.) with a high activation barrier of 0.87 eV. A number of other materials in the Mg—Zr—$PO_4$ family are also reported with higher activation barriers to ionic conduction. [Ikeda, et al, 1987, dx.doi.org/10.1016/0167-2738(87)90091-9]

$ZnZr_4(PO_4)_6$: The material shows the highest conductivity out of a range of materials in the Zn—Zr—$PO_4$ family with various stoichiometries, with an ionic conductivity of approx. 0.001 S cm$^{-1}$ at 900° C. The activation barrier for Zn conduction is approx. 1.3 eV. [Ikeda, et al, 1990, dx.doi.org/10.1016/0167-2738(90)90291-X]

Metal Organic Frameworks $Mg_2$(dobdc) and $Mg_2$(dobpdc): The metal organic frameworks magnesium 2,5-dioxidobenzene-1,4-dicarboxylate ($Mg_2$(dobdc)) and magnesium 4,4'-dioxidobiphenyl-3,3'-dicarboxylate ($Mg_2$(dobpdc)) exhibit tunable cation conductivity up to 0.25 mS cm$^{-1}$ based on the introduced counteranion. Depending on the anion, the activation barrier ranges from 0.1-0.19 eV. However, no strong evidence is shown to support that the observed ionic mobility is due to the Mg ions rather than coadsorbed solvent molecules or the anions present. [Aubrey, et al, 2013, dx.doi.org/10.1039/C3EE43143F]

MIT-20-Mg: $Mg_{0.5}$[Cu2Cl2BrBTDD].8(PC) (BTDD=1,2,3-triazolo[4,5-b], [4',5'-i])dibenzo-[1,4]dioxin, PC=propylene carbonate) exhibits modest ionic conductivity with an activation barrier of 0.37 eV. The Li analog exhibits mixed Li and anion conduction as indicated by a transference number of 0.66, while no strong evidence to indicate that the Mg ions are the mobile species in the noted compound. [Park et al, 2017, dx.doi.org/10.1021/jacs.7b06197]

Polymers $PEO_n$:$Mg(ClO_4)_2$ and $PEO_n$:$Zn(ClO_4)_2$: Polyethylene oxide (PEO) loaded with Mg or Zn perchlorate and cast from methanol exhibit divalent ionic conductivity on the order of 10$^{-7}$ S/cm at 30° C. [Patrick et al, 1986, dx.doi.org/doi.org/10.1016/0167-2738(86)90309-7]

PVA/PAN:$Mg(ClO_4)_2$: Various levels of magnesium perchlorate with a of 92.5% polyvinyl alcohol and 7.5% polyacrylonitrile polymer yield ionic conductivity values at 30° C. ranging from 10$^{-8}$ to 10$^{-4}$ S/cm, with activation barriers between 0.2 and 0.8 eV depending on the magnesium salt loading. [Manjuladevi, et al., 2017, dx.doi.org/10.1016/j.ssi.2017.06.002]

Example 3: Deposition and Stripping of Zn Using $ZnPS_3$ as a Solid Electrolyte

Figure 21:
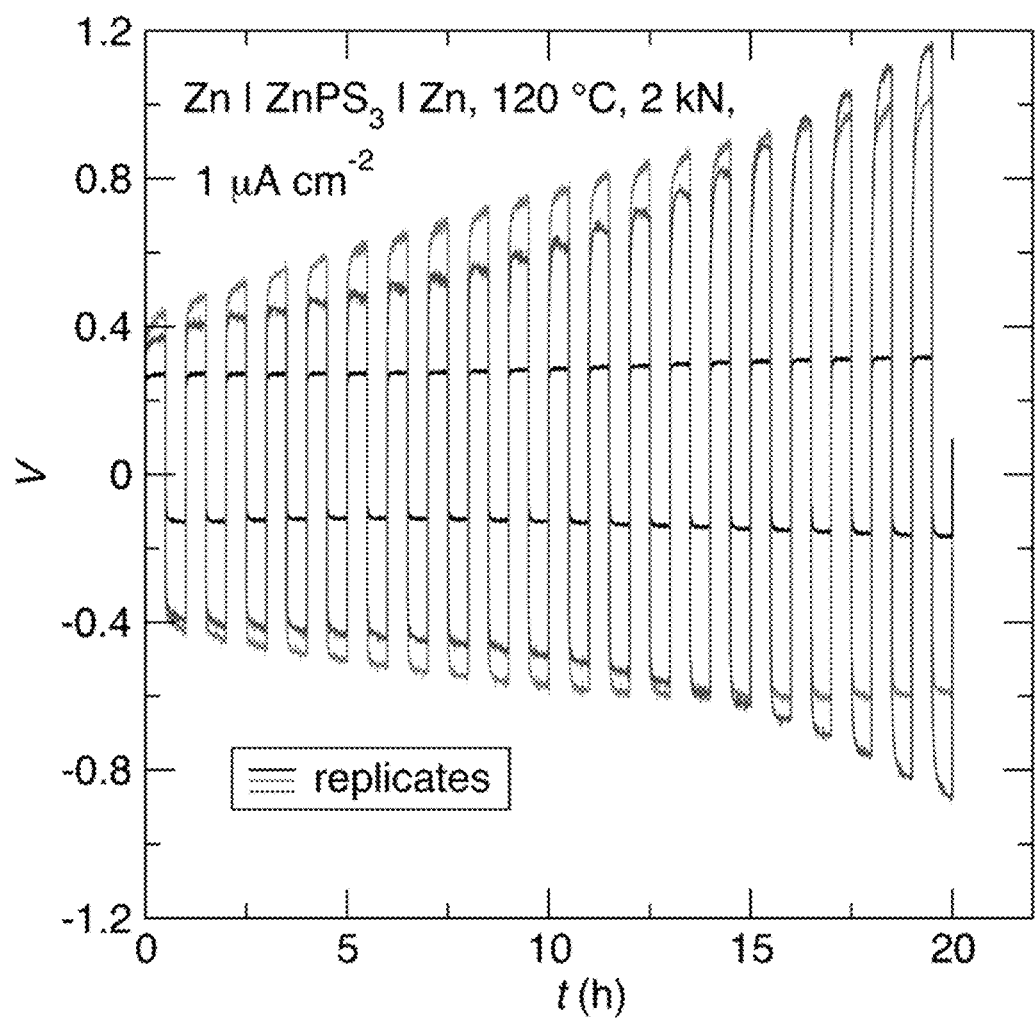
FIG. 21. Galvanostatic Zn deposition and stripping collected in a symmetric cell Zn|$ZnPS_3$|Zn at 120° C. under 2 kN of applied force. Initial overpotentials were between 300 and 500 mV with an applied current of 1 $\mu A/cm^{-2}$, which steadily increased upon cycling.

Zn metal can be reversibly deposited and stripped onto a Zn substrate using $ZnPS_3$ as a solid electrolyte. $ZnPS_3$ powder was assembled into symmetric cells with Zn electrodes. 2 kN of force was applied uniaxially to the cells, and the cells were heated to 120° C. A current density of 1 pA/cm$^{-2}$ was passed for 30 minutes in one direction then reversed to study the deposition and stripping characteristics of the cells. Initial deposition and stripping overpotentials range from 300-500 mV, with some cell-to-cell variation (FIG. 21). The overpotential increases as the cells cycle at the same current density.

Example 4: Substitution of Zn with Divalent and Trivalent Cations in $ZnPS_3$

Figure 22:
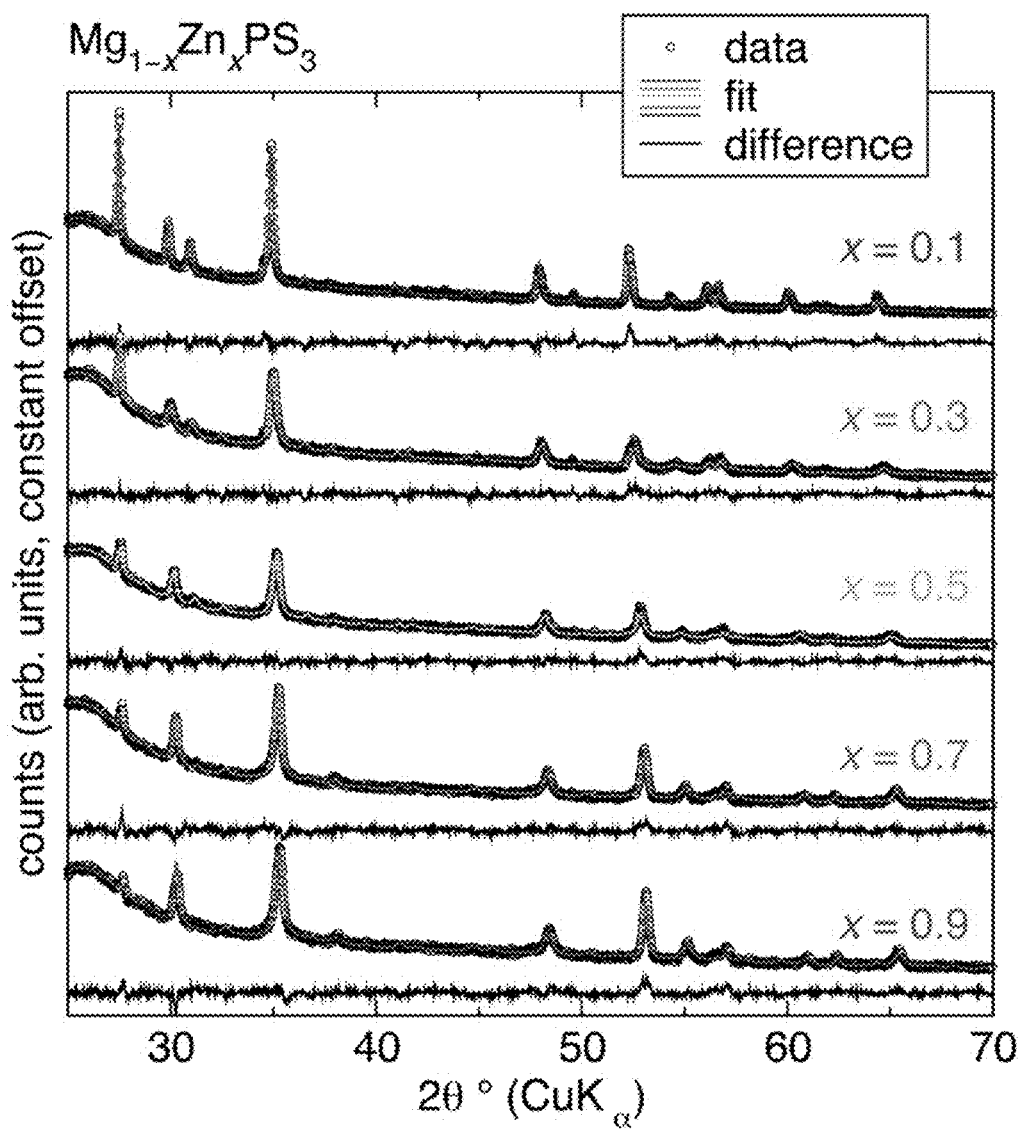
FIG. 22. Powder X-ray diffraction patterns and corresponding Rietveld refinements of $Mg_{1-x}Zn_xPS_3$. The reflections shift to higher 2Θ with increasing zinc concentration, indicating a contraction of the unit cell.

The $MPS_3$ structure is amenable to a range of metal substitutions. In $ZnPS_3$, substitution of the alkaline earth element Mg can be achieved across the entire range of metal concentrations (FIG. 22). The reflections shift to higher 20 with increasing Zn concentration, corresponding to a contraction of the unit cell and structure. Substitution of Zn for Mg allows for tunable ionic carriers as well as tunable conduction pathways through the alteration of the lattice.

Figure 23:
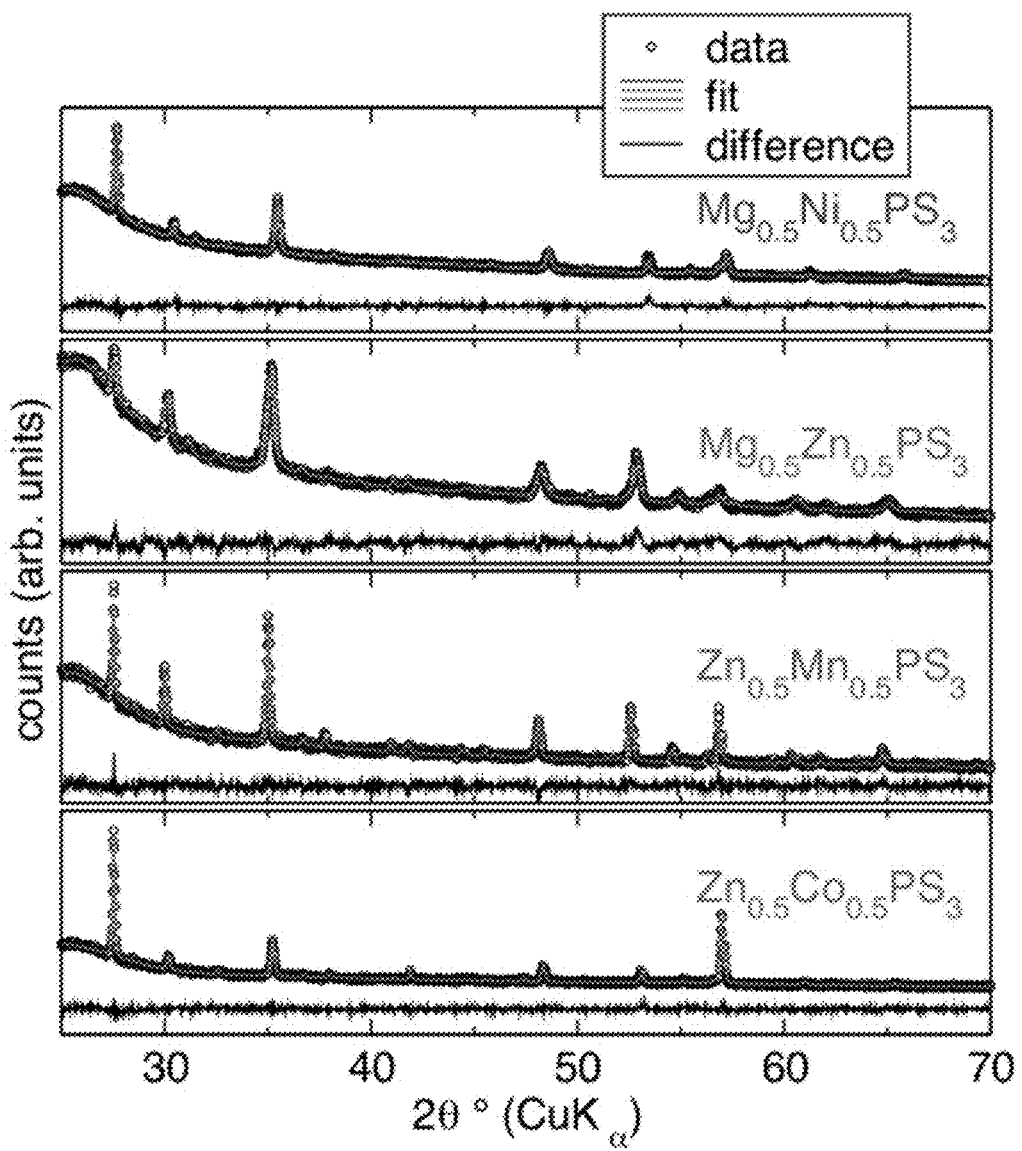
FIG. 23. Powder X-ray diffraction patterns and corresponding Rietveld refinements of various metal substituted $MPS_3$ phases.

Phases with redox active, divalent cations such as the transition metals can be prepared while maintaining the $MPS_3$ lattice. Powder X-ray diffraction patterns of various mixed metal $MPS_3$ phases are shown in FIG. 23. Transition metals such as Co and Ni can be introduced into $MgPS_3$ and $ZnPS_3$ in order to provide redox-active metal centers to accommodate oxidation and reduction upon divalent cation deintercalation and intercalation, respectively. The materials maintain the $MPS_3$ structure with all substitutions.

Figure 24:
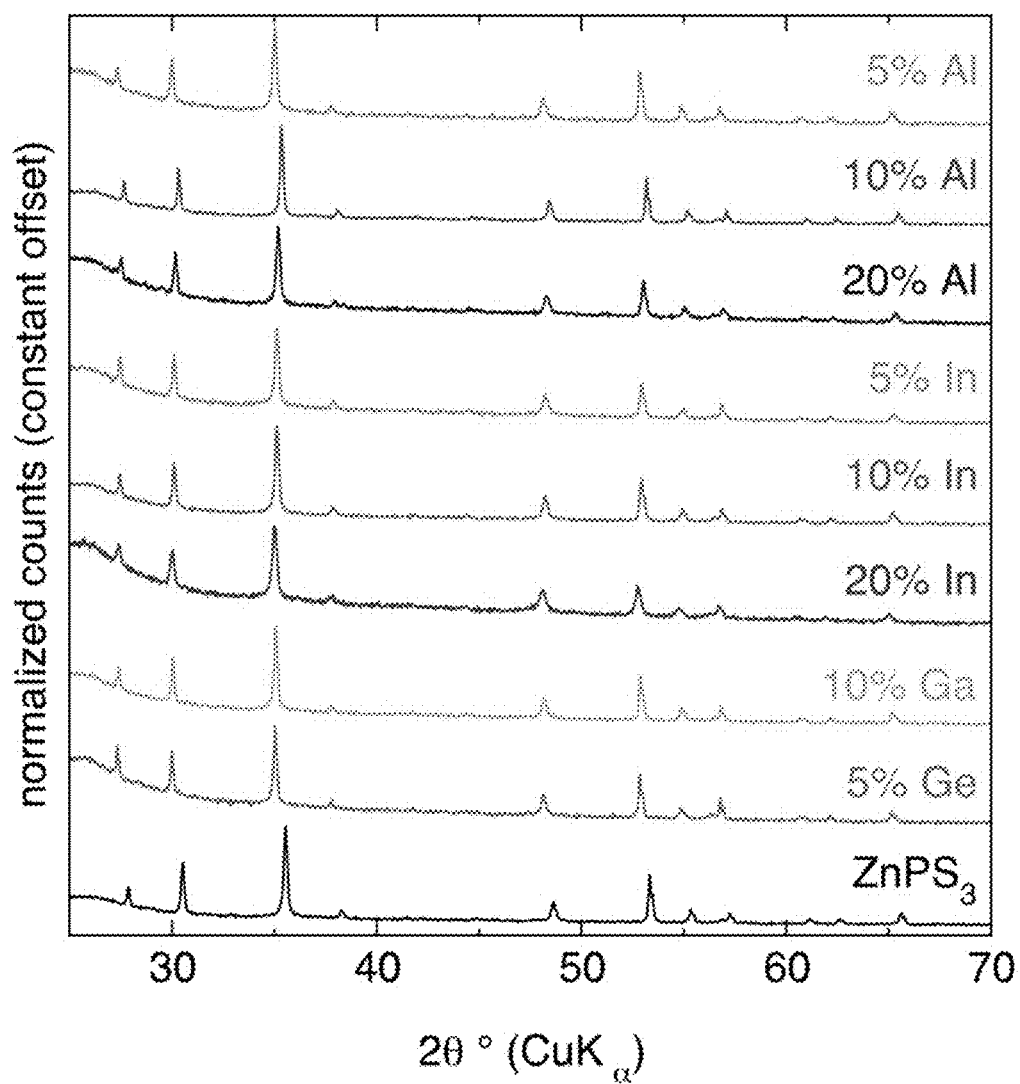
FIG. 24. Powder X-ray diffraction patterns of aliovalent substituted $ZnPS_3$ materials. All materials maintain the crystal structure of the parent material.
Figure 25:
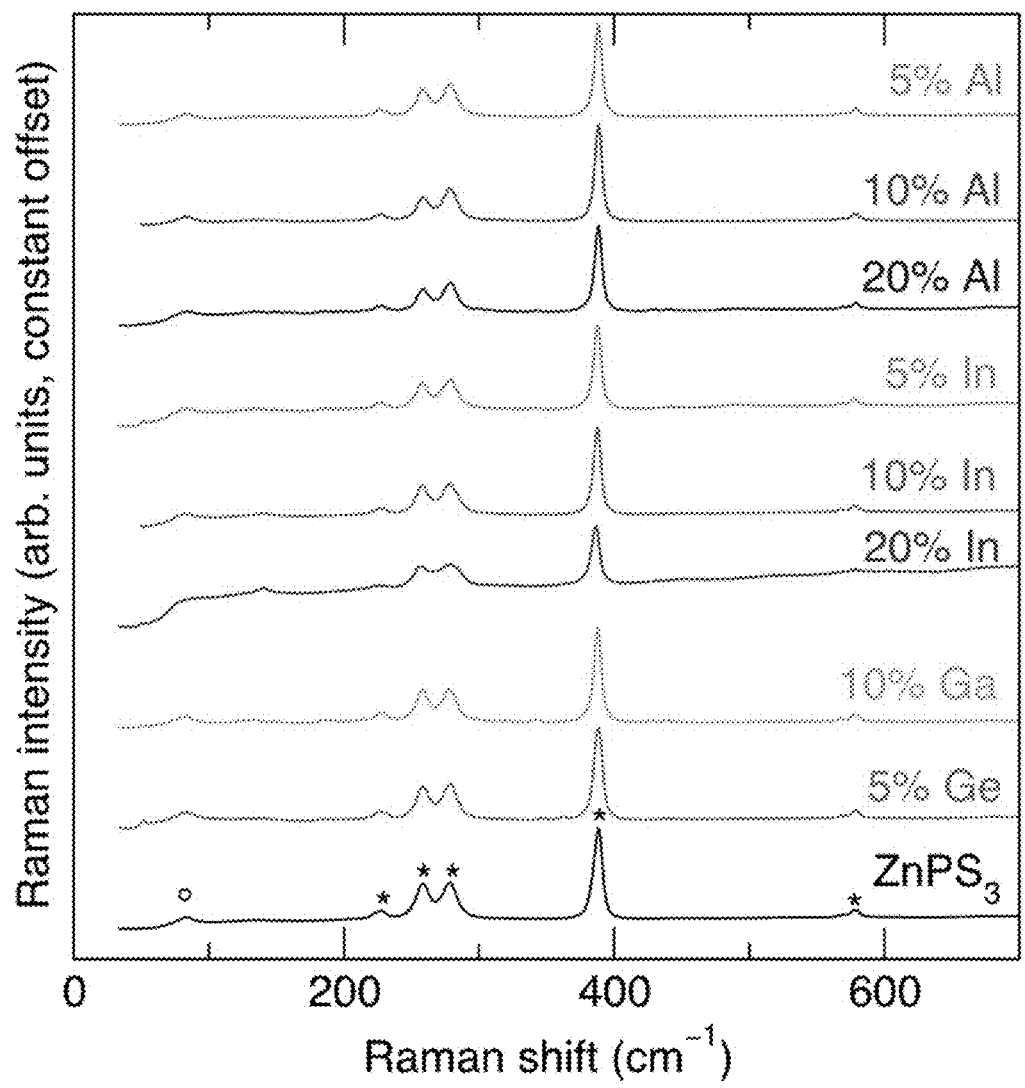
FIG. 25. Raman spectra of $ZnPS_3$ with various levels of aliovalent substitution. The $ZnPS_3$ modes remain upon substitution and no new modes are observed. For reference, the Raman spectrum of $ZnPS_3$ is shown at the bottom. The Zn translational mode is marked with a circle, while modes related to the $[P_2S_6]^{4-}$ polyanion are marked with an asterisk.

To introduce vacancies into $ZnPS_3$, aliovalent cations were substituted onto the Zn site in small quantities. For example, substitution of 1 equivalent of a trivalent cation will correspond to removal of 1.5 equivalents of divalent zinc ion in order to maintain charge neutrality. Thus, the substitution of closed shell, trivalent metals such as Al, Ga, and In was explored in order to also maintain the electronically insulating nature of $ZnPS_3$. Powder X-ray diffraction patterns of a range of trivalent substituted materials is shown in FIG. 24. The patterns are compared to the experimentally observed pattern of $ZnPS_3$; no new Bragg reflections are observed that would correspond to the formation of crystalline impurities. Raman spectroscopy of the aliovalent substituted materials supports the formation of materials with the $ZnPS_3$ structure, as no new modes are observed (FIG. 25). Additionally, the substitution of various metals for Zn in $ZnPS_3$ does not change the position of the Zn translational modes or those corresponding to various vibrations of the $[P_2S_6]^{4-}$ polyanion.

Example 5: Substitutions

The primary, or mobile, divalent metal cation (e.g., $Zn^{2+}$ in $ZnPS_3$; e.g., $Mg^{2+}$ in $MgPS_3$, etc.) can be substituted with one or more monovalent metal cations. For example, such a substitution can form a material according to formula FX10:

$Zn_{1-n}A^{1+}{}_{2n}PS_3$ (FX10), wherein n is greater than 0 and less than 0.5 and $A^{1+}$ is at least one monovalent metal cation. In the case of monovalent ($A^{1+}$) substitution, generally no extra vacancies are introduced, since two monovalent cations will replace a single divalent cation. The first monovalent cation will replace the substituted Zn, and the second monovalent cation will go into the van der Waals gap of the material. The concentration of vacancies will remain dependent on entropy.

The primary, or mobile, divalent metal cation (e.g., $Zn^{2+}$ in $ZnPS_3$; e.g., $Mg^{2+}$ in $MgPS_3$, etc.) can be substituted with one or more divalent metal cations. For example, such a substitution can form a material according to formula FX2: $Zn_{1-x}A^{2+}{}_xPS_3$ (FX2), wherein x is greater than 0 and less than 1 and $A^{2+}$ is at least one divalent metal cation other than Zn. In the case of divalent ($A^{2+}$) substitution, generally no extra vacancies are introduced. The divalent substituent will replace the substituted Zn. The concentration of vacancies will remain dependent on entropy.

The primary, or mobile, divalent metal cation (e.g., $Zn^{2+}$ in $ZnPS_3$; e.g., $Mg^{2+}$ in $MgPS_3$, etc.) can be substituted with one or more trivalent metal cations. For example, such a substitution can form a material according to formula FX3: $Zn_{1-1.5y}A^{3+}{}_yPS_3$ (FX3), wherein y is greater than 0 and less than 0.67 and $A^{3+}$ is at least one trivalent metal cation. In the case of trivalent ($A^{3+}$) substitution, generally 0.5 equivalents of vacancies are introduced for every one equivalent of trivalent substituent. The vacancies and the trivalent cations will replace $Zn^{2+}$ in the metal layer. To explicitly define the vacancies, the equation can be stated as FX5: $Zn_{1-1.5y}A^{3+}{}_yE_{0.5y}PS_3$ (FX5), wherein E is a vacancy.

The primary, or mobile, divalent metal cation (e.g., $Zn^{2+}$ in $ZnPS_3$; e.g., $Mg^{2+}$ in $MgPS_3$, etc.) can be substituted with one or more tetravalent metal cations. For example, such a substitution can form a material according to formula FX11: $Zn_{1-2z}A^{4+}{}_zPS_3$ (FX11), wherein z is greater than 0 and less than 0.25 and $A^{4+}$ is at least one tetravalent metal cation. In the case of tetravalent ($A^{4+}$) substitution, generally one equivalent of vacancies are introduced for every one equivalent of tetravalent substituent. The vacancies and the tetravalent cations will replace Zn in the metal layer. To explicitly define the vacancies, the equation can be stated as formula FX12: $Zn_{1-2z}A^{4+}{}_zE_zPS_3$ (FX12), wherein E is a vacancy.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every cell, electrolyte, material, device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. An electrochemical cell comprising:
    a positive electrode;
    a negative electrode; and
    a solid state electrolyte in ionic communication with the positive electrode and the negative electrode; wherein:
    the solid state electrolyte is characterized by formula (FX1):

$$MPS_3 \quad (FX1);$$

wherein M is one or more divalent metal cations and optionally metal cation vacancies; and
    wherein at least one of said one or more metal cations is a divalent metal cation;
    the electrolyte comprises a dicationic charge carrier characterized by a divalent ion conductivity selected from the range of $10^{-8}$ to $10^{-6}$ S/cm at 60° C.; and
    the electrolyte is electrically insulating.

2. The electrochemical cell of claim 1, wherein the at least one divalent cation is $Zn^{2+}$, $Mg^{2+}$, $Ca^{2+}$, or a combination thereof.

3. The electrochemical cell of claim 2, wherein the electrolyte is characterized by the formula $ZnPS_3$ or the formula $MgPS_3$.

4. The electrochemical cell of claim 2, wherein M comprises $Zn^{2+}$ and at least one of divalent ion vacancies, a divalent metal ion, and an aliovalent cation.

5. The electrochemical cell of claim 2, wherein the electrolyte is characterized by formula (FX2), (FX3), (FX10), or (FX11):

$$Zn_{1-x}A^{2+}{}_xPS_3 \quad (FX2);$$

$$Zn_{1-1.5y}A^{3+}{}_yPS_3 \quad (FX3);$$

$$Zn_{1-n}A^{1+}{}_{2n}PS_3 \quad (FX10); \text{ or}$$

$$Zn_{1-2z}A^{4+}{}_zPS_3 \quad (FX11);$$

wherein:
    $A^{1+}$ is at least one monovalent metal cation;
    $A^{2+}$ is at least one divalent metal cation other than Zn;
    $A^{3+}$ is at least one trivalent metal cation;
    $A^{4+}$ is at least one tetravalent metal cation;
    x is greater than 0 and less than 1;
    y is greater than 0 and less than 0.67;
    n is greater than 0 and less than 0.5; and
    z is greater than 0 and less than 0.25.

6. The electrochemical cell of claim 5, wherein the electrolyte is characterized by formula (FX5) or (FX12):

$$Zn_{1-1.5y}A^{3+}{}_yE_{0.5y}PS_3 \quad (FX5); \text{ or}$$

$$Zn_{1-2z}A^{4+}{}_zE_zPS_3 \quad (FX12);$$

wherein:
    E is a divalent ion vacancy.

7. The electrochemical cell of claim 5, wherein y is greater than 0 and less than 0.3.

8. The electrochemical cell of claim 5, wherein $A^{3+}$ is at least one trivalent metal cation.

9. The electrochemical cell of claim 5, wherein: $A^{3+}$ comprises at least one metal cation selected from the group consisting of $Al^{3+}$, $Ga^{3+}$, $In^{3+}$, $V^{3+}$, and any combination thereof; and wherein $A^{2+}$ comprises at least one metal cation selected from the group consisting of $Mg^{2+}$, $Ni^{2+}$, $Co^{2+}$, $Ca^{2+}$, $Fe^{2+}$, $Mn^{2+}$, and any combination thereof.

10. The electrochemical cell of claim 1, wherein the electrolyte is characterized by a divalent ion conductivity at a temperature less than 500° C.

11. The electrochemical cell of claim 1, wherein the divalent ion conductivity is conductivity of $Zn^{2+}$ ions in said electrolyte.

12. The electrochemical cell of claim 1, wherein the electrolyte is characterized by an electrical conductivity of less than or equal to $10^{-9}$ S/cm at 21° C.

13. The electrochemical cell of claim 1, wherein the electrolyte is characterized by an electron band gap of at least 2 eV.

14. The electrochemical cell of claim 1, wherein the electrolyte's divalent ion conductivity is characterized by a bulk conductivity activation energy selected from the range of 100 to 600 meV.

15. The electrochemical cell of claim 1, wherein a crystal structure of the electrolyte comprises a layered structure and a van der Waals gap between layers, the van der Waals gap being at least 3 Å.

16. The electrochemical cell of claim 1, wherein a crystal structure of the electrolyte comprises $[P_2S_6]^{4-}$ polyanions.

17. The electrochemical cell of claim 1, wherein the electrochemical cell is not a Li-ion cell and/or the electrolyte does not comprise Li ions during operation of the electrochemical cell.

18. The electrochemical cell of claim 1, wherein the electrochemical cell is selected from the group consisting of a fuel cell, an air battery, all-solid state battery, and a hybrid electrolyte battery.

19. The electrochemical cell of claim 1, wherein the solid state electrolyte characterized by formula FX1 is a first solid electrolyte; wherein the electrochemical cell comprises a hybrid electrolyte in ionic communication with the positive electrode and the negative electrode; and wherein the hybrid electrolyte comprises said first solid electrolyte and a second electrolyte.

20. The electrochemical cell of claim 1, wherein the solid state electrolyte is nonporous such that a liquid cannot flow therethrough.

21. The electrochemical cell of claim 1, wherein the electrochemical cell does not comprise a liquid electrolyte.

* * * * *